United States Patent [19]

Peters et al.

[11] Patent Number: 5,668,993

[45] Date of Patent: Sep. 16, 1997

[54] MULTITHREADED BATCH PROCESSING SYSTEM

[75] Inventors: Michael S. Peters; Clayton Walter Holt, both of Greensboro; David J. Arnold, Jr., Asheboro, all of N.C.

[73] Assignee: Teleflex Information Systems, Inc., Greensboro, N.C.

[21] Appl. No.: 229,526

[22] Filed: Apr. 19, 1994

(Under 37 CFR 1.47)

Related U.S. Application Data

[63] Continuation of Ser. No. 203,531, Feb. 28, 1994, abandoned.

[51] Int. Cl.$^6$ ....................................... G06F 9/44
[52] U.S. Cl. ...................... 395/671; 395/675; 395/676; 395/182.08; 705/34
[58] Field of Search ................................. 395/650, 700

[56] References Cited

U.S. PATENT DOCUMENTS

| | | | |
|---|---|---|---|
| 4,495,570 | 1/1985 | Kitajima et al. | 395/675 |
| 4,503,499 | 3/1985 | Mason et al. | 395/671 |
| 4,530,051 | 7/1985 | Johnson et al. | 395/200.03 |
| 4,577,272 | 3/1986 | Ballew et al. | 395/182.13 |
| 4,661,900 | 4/1987 | Chen et al. | 395/800 |
| 4,780,821 | 10/1988 | Crossley | 395/670 |
| 4,819,159 | 4/1989 | Shipley et al. | 395/182.17 |
| 4,914,570 | 4/1990 | Peacock | 395/200.01 |
| 4,969,092 | 11/1990 | Shorter | 395/672 |
| 5,027,269 | 6/1991 | Grant et al. | 395/680 |
| 5,062,040 | 10/1991 | Bishop et al. | 395/684 |
| 5,065,311 | 11/1991 | Masai et al. | 395/182.18 |
| 5,117,352 | 5/1992 | Falek | 395/182.02 |
| 5,129,084 | 7/1992 | Kelly, Jr. et al. | 395/674 |
| 5,140,689 | 8/1992 | Kobayashi | 395/182.18 |
| 5,151,987 | 9/1992 | Abraham et al. | 395/182.18 |
| 5,179,699 | 1/1993 | Iyer et al. | 395/607 |
| 5,179,702 | 1/1993 | Spix et al. | 395/672 |
| 5,220,501 | 6/1993 | Lawlor et al. | 380/24 |
| 5,220,665 | 6/1993 | Coyle, Jr. et al. | 395/671 |
| 5,237,684 | 8/1993 | Record et al. | 395/682 |
| 5,247,664 | 9/1993 | Thompson et al. | 395/610 |

(List continued on next page.)

OTHER PUBLICATIONS

Datamation, vol. 38, No. 25, Dec. 15, 1992, pp. 57–58, Kador, "Reengineering to boost software productivity.".
*Parallel Computing: Theory and Practice*, Quinn, 1994 by McGraw–Hill, Inc., pp. 1–85.
*Designing Efficient Algorithms for Parallel Computers*, Quinn, 1987, pp. 13–42.
*Encyclopedia of Computer Science*, Ralston, et al., Van Nostrand Reinhold publishing, New York, 1993, pp. 1011–1025.
*Guide To Parallel Programming On Sequent Computer Systems*, Anita Osterhaus, Sequent Technical Publications, Published by Sequent Computer Systems, Inc., 1989, 180 pages.
Flier, "Symmetry 2000/450 and 2000/750 with the DYNIX/ptx Operating System," Sequent, three pages.
Flier, "HP 9000 Series 800 Integrated Business Server Family," Hewlett Packard, six pages.

*Primary Examiner*—Alvin E. Oberley
*Assistant Examiner*—St. John Courtenay, III
*Attorney, Agent, or Firm*—Baker & Botts, L.L.P.

[57] ABSTRACT

A system for processing a batch which is distributed into a plurality of independent segments. A preferred embodiment of this invention calls for implementation on a symmetrical multiprocessing platform, however, the invention is also applicable to massively parallel architectures as well as uniprocessor environments. Each segment comprises a plurality of discrete events, each discrete event comprising a plurality of sub-events to be processed. The system operates to process each discrete event within each segment sequentially and each sub-event within each discrete event sequentially. The plurality of segments may be processed on an uniprocessor, an SMP system or an MPP system. By balancing the number of discrete events in each segment using a "course grain" approach, a flexible but efficient use of processor availability is obtained.

21 Claims, 12 Drawing Sheets

U.S. PATENT DOCUMENTS

| | | | |
|---|---|---|---|
| 5,247,675 | 9/1993 | Farrell et al. | 395/673 |
| 5,249,290 | 9/1993 | Heizer | 395/675 |
| 5,303,297 | 4/1994 | Hillis | 379/63 |
| 5,305,454 | 4/1994 | Record et al. | 395/682 |
| 5,355,484 | 10/1994 | Record et al. | 395/704 |
| 5,359,642 | 10/1994 | Castro | 379/121 |
| 5,430,875 | 7/1995 | Ma | 395/682 |
| 5,455,952 | 10/1995 | Gjovaag | 395/701 |

| 1 I | 2 I | 3 M | 4 C | 5 C | 6 C | 7 C | 8 I | 9 M | 10 C | 11 C | 12 I | 13 I |

MULTITHREADED BATCH PROCESSING SYSTEM

CROSS REFERENCE TO PARENT AND RELATED APPLICATIONS

This application is a continuation of application Ser. No. 08/203,531 filed on Feb. 28, 1994, now abandoned. This application is related to co-pending applications entitled METHOD AND APPARATUS FOR PROCESSING DISCRETE BILLING EVENTS filed concurrently herewith which is a continuation of application Ser. No. 08/203,193 and NO-RESET OPTION IN A BATCH BILLING SYSTEM filed concurrently herewith which is a continuation of application Ser. No. 08/203,191.

An Appendix containing 68 pages of code is submitted herewith.

FIELD OF THE INVENTION

This invention relates generally to batch processing and more particularly to batch processing on a symmetrical multiprocessing (SMP) system. This invention has particular application to the batch processing of customer account information in order to perform periodic customer billing.

BACKGROUND OF THE INVENTION

There currently exist systems for customer billing in industries wherein a large number of customers are billed periodically based upon monthly (recurring) charges as well as dynamic use related (non-recurring) charges. Of interest in the design of such systems is the flexibility with which such systems can adjust to changes in such variables as billing structure, tax rates, bill formatting and incentive program implementation. Also of great importance in these systems is the ability to service an increasing number of customers as time progresses.

In a typical billing systems, the system should be designed to interface with peripheral devices and applications providing customer usage data from a variety of sources. In addition, such systems usually allow an employee of the billing company to interact with the system to, for example, specify the time, format and nature of invoice generation.

One example of an industry in which such a billing system is an important part of day to day operations is the cellular telephone/telecommunications industry. In recent years communication via cellular telephones has grown explosively. The requirement for convenient communications has become the norm in business as well as residential markets. Cellular telephones are found everywhere from automobiles and restaurants to golf courses and airplanes. In meeting the challenge of providing quality cellular services to this ever expanding subscriber base, the cellular telecommunications industry has identified a number of issues which need to be addressed in order to maintain and/or improve customer relations.

A primary concern for a cellular carrier is its ability to provide accurate and easily understood billing statements so that customers will respond promptly with payment and so that customer service interactions may be minimized. In order to achieve this objective, it is often desirable for a cellular carrier to implement such a billing system as a high-volume application with the ability to communicate with applications providing for customer service data entry and retrieval as well as automated data collection mechanisms such as a switch for monitoring customer calls, airtime and toll information. In addition, the overall system may provide fraud detection capabilities, security controls, sales and marketing support, funds collection support and message processing.

Customer service data and applications are generally provided on-line to customer service agents. Typically, the bill summary, bill detail, current balance, payment and adjustment information are available on-line. An agent can view customer information by querying on virtually any field in the database. Customer account information can be altered through customer update screens.

Fraud in areas such as subscription, airtime and roaming fraud have cost the cellular industry millions of dollars over the course of just a few years. In response to this problem a number of security controls have recently been developed for use by the industry. Such security controls include electronic switching networks (ESN's), identification by social security number, mobile number detection and monitoring reports which summarize long distance charges billed versus those recorded at the switch.

With respect to sales and marketing support, the system may provide the ability for airtime, product and other rating promotions to be created through the construction of a new rate plan in the appropriate tables. Access, service and equipment charges, like the rate plans are table-driven. Equipment charges can be categorized as recurring (those that will bill each month for a specified period of time), or non-recurring (one time charges).

Because of the periodic nature of the billing process in the cellular telephone industry, most systems have performed customer billing and invoicing as a sequential batch process. The traditional thinking on how to run the batch process has been influenced primarily by the strengths and weaknesses of the large engine uniprocessor mainframe environment. Thus, batch processes are performed in a "task oriented manner". In other words, each of the component tasks for all of the customer accounts is performed in sequence, prior to the processing of any other component tasks for each of the customer accounts.

Typically, the above-described batch processing has been performed on large scale uniprocessors, such as IBM or DEC brand mainframes which are capable of high throughput. Uniprocessor machines may be provided which operate at about 100 million instructions per second (MIPS). One example of a uniprocessor architecture, although not necessarily operating at 100 MIPS, is the HP 9000 Series 800 Server Family manufactured by the Hewlett Packard Corporation. FIG. 1 depicts the architecture of this machine. As can be seen in FIG. 1, only a single CPU 100 is provided. CPU 100 interfaces, through memory and I/O controller 110, to an expandable RAM storage area 120. A single copy of the operating system will generally reside in main memory 110. System bus 130 is further provided to allow for integration into a local area network or LAN as well as to attach various peripherals desired in order to meet system needs.

As batched applications comprise a plurality of tasks, and uniprocessor architectures are capable of executing only a single task at a time, uniprocessors are often complimented with special multitasking hardware and operating system software (such as UNIX) which allow the single processing resource to be efficiently distributed among a set of simultaneously initiated tasks. Although this multitasking increases a uniprocessor machine's overall throughput and workflow capabilities, the simultaneously initiated tasks are still in contention for a single processing resource and the amount of execution time allotted to each individual task decreases in proportion to the number of tasks initiated.

To overcome this problem with multitasking, multiprocessor systems, which utilize more than one CPU, have been developed to provide tasks with the same resources offered by their uniprocessor counterparts but further allow these resources to be shared among a set of concurrently executing tasks. In multitasking, multiprocessor environments, various tasks are distributed to the various processors. A fine grain approach parallelizes groupings of similar tasks with all of the tasks being assembled into a finished batch after parallel processing completes. Coarse grain, on the other hand, simply parallelizes groupings of various tasks of the job without regard for the similarity of the tasks within each grouping.

Several multiprocessor systems have become widely used in recent years. Some examples include massively parallel processing systems comprising a plurality of individual processors, each having its own CPU and memory, organized in a loosely coupled environment, or a distributed processing system operating in a loosely coupled environment, for example, over a local area network.

One multiprocessing technology, termed symmetrical multiprocessing (SMP), is a relatively recent architecture that provides applications with a set multiple of CPUs which operate in a tightly-coupled shared memory environment. Many major hardware vendors, e.g., IBM, DEC, HP, NCR, Sequent, Tandem, and Stratus, have released or announced computers that provide this type of architecture and associated processing. SMP techniques and functions have also been provided in some operating systems, such as, for example, an operating system sold under the trademark (MICROSOFT NT) and various derivatives of the multitasking operating system products sold under the trademark (UNIX). In addition, certain databases, particularly relational database management systems, sold under the trademark (ORACLE) and the trademark (INFORMIX) provide features that accommodate SMP techniques and speed up performance in SMP environments.

One significant advantage with an SMP system is scalability. An SMP platform, such as the SMP platforms sold under the trademark(SEQUENT), for example, includes a plurality of tightly coupled individual processors each operating under the control of a shared operating system and each accessing a shared memory. The processors share peripheral devices and communicate with one another using a high speed bus (or special switch), special control lines and the shared memory. A hardware platform designed as an SMP system is generally significantly less expensive than its uniprocessor counterpart for a comparable number of MIPS. This is primarily because of the SMP environments ability to use either a plurality of low cost general purpose CPU's, for example 486-type processors, or mass marketed proprietary processors such as some RISC chips. By contrast, most processors operating in the uniprocessor environment have been specially designed and produced in small quantities and therefore, their price is relatively high. Mass marketing of proprietary processors having broad applications, however, greatly reduces machine cost. The number of processors employed in an SMP environment is variable so that processors can be added to the system as desired. Thus, for example, one SMP platform may have 4 processors and another may have 20.

Sequent Computer Systems, Inc. provides one model, the S2000/450 of its SMP platforms sold under the trademark (SYMMETRY), which may include from 2 to 10 processors (typically Intel 486/50 Mhz CPUs) and another model, the S2000/750, which may include from 2 to 30 processors. Both models provide from 16 to 512 Mbytes of physical memory with 256 Mbytes of virtual address space per processor. Each processor runs a single, shared copy of Sequent's enhanced version of UNIX which is called DYNIX/ptx. Specifically, the version 2.0 operating system distributed under the trademark (DYNIX/ptx) is preferred.

For purposes of illustration, a block diagram of the relevant portions of the S2000/750 is shown in FIG. 2. As will be discussed below, a preferred embodiment of this invention is resident on the S2000/750 SMP system manufactured by Sequent Computer Systems, Inc. A system bus 260 is provided to support a multiprocessing environment. System bus 260 is configured as a 64 bit bus and carries data among the systems CPUs, memory subsystems and peripheral subsystems. It further supports pipelined I/O and memory operations. The bus can achieve an actual data transfer rate of 53.3 Mbytes per second. Each processor board 210 in the S2000 system contains two fully independent 486 microprocessors of the type sold, inter alia, by the Intel Corporation. These processor boards (of which there may be up to 15 in the S2000/750) are identical. The memory subsystem 220 consists of one or more memory controllers, each of which can be accompanied by a memory expansion board 270. The controllers are available with either 16 or 64 Mbytes of memory and the expansion boards may add 96 or 192 MBytes.

The Quad Channel I/O Controller (QCIC) 230 board supports up to 24 disks 240, six each on four independent channels. Multiple QCIC boards can support up to 260 GBytes of storage per system. System I/O performance growth can increase as disks are added. A VMEbus interface provides a link to Ethernet 246 and terminal line controller 248, among other possibilities. Further, the ability to add a parallel printer 252 is provided through system services module 254. Finally, a SCSI interface is provided for integration with various secondary storage devices 258.

In the past, symmetrical multiprocessing platforms such as those manufactured by Sequent have been utilized primarily for processing individual events, such as in an On-Line Transaction Processing (OLTP) environment. OLTP systems frequently involve large databases and interaction with a plurality of users, each typically operating a terminal and each using the system to perform some function requiring a predictable response within an acceptable time. In such an environment, interactive user requests, such as may be provided in customer service systems, are processed. Because each of the user requests is typically independent, the SMP system is particularly effective.

In order to effectively utilize an SMP system operating in a multitasking, multiprocessing environment, it is necessary to optimize task distribution among the varying processors. While the sequencing and parallellization with respect to the application itself, is generally handled by the UNIX operating system, the data partitioning at execution time must be accomplished through a parent process designed for optimal segregation. Such data partitioning is appropriate for applications that perform the same operations repeatedly on large collections of data. A cellular telephone billing cycle is one such application that lends itself to this type of programming method.

In the cellular telephone environment, accounts may be billed in a number of ways. For example, accounts may exist as individual accounts or they may be aggregate accounts having a high-level summary bill and a number of lower level user accounts. As will be understood by one of ordinary skill in the art, it is much less difficult to process a complete aggregate account in one segment instead of dividing it up into a number of separate segments. Moreover, the number of accounts to be placed in each segment should be accurately determined and the distribution of such accounts preferably occurs such that workload is evenly distributed among segments. Finally, various control tasks must be performed by a high level process in a batching billing system. Error handling, segment redistribution and error reporting must be efficiently and accurately implemented to maximize throughput as well as service quality.

Thus, a need has arisen for a batch processing system which is versatile so that it may operate on either a uniprocessing system, a symmetrical multiprocessing system, a massively parallel processing system or a loosely coupled distributed processing system. Further, a need has arisen for a system which can effectively control and distribute processes based upon varying aggregations of data, system errors and dynamic availability of resources. Additionally, a need has arisen for a scalable computer architecture capable of effectively and efficiently processing customer account billing statements.

SUMMARY OF THE INVENTION

In view of the foregoing, it is a principle object of this invention to provide a system and method for efficiently executing batch runs.

It is another object of this invention to provide a system and method for efficiently executing batch runs in an SMP environment.

It is yet another object of this invention to efficiently distribute data for rapid processing of large amounts of data in a batch run.

It is a further object of this invention to effectively initiate, terminate and provide error reporting for multiple processes composing a large batch run.

It is still further object of this invention to provide a system and method for batch processing based upon a multitasking architecture and allowing scalability of processors as well as I/O capacity.

The present invention subdivides each batch process into segments. The segments execute in a multi-tasking environment as separate processes, yet integrate, upon conclusion, as a single batch entry for continuing processing. The present invention provides significantly improved resource utilization especially when multi-channel access to the memory storing the discrete events is provided.

The present invention provides the advantage of being portable to any or multiples of the multi-tasking hardware architectures and configurations, from low cost personal computers running the multitasking operating system sold under the trademark (UNIX) to tightly coupled SMP architectures to loosely coupled massively parallel architectures, all of which may implement at least linear performance scalability as needed by adding I/O channels, machines and/or processors.

Further, the present invention provides a system for exploiting the capabilities of a symmetrical multiprocessing system in a batching environment. Implementing the segments of the batch on an SMP platform provides logarithmic scalability in an individual cabinet. Further, as additional cabinets are added, logarithmic scalability may still be attained, although the base of the logarithmic scalability is somewhat reduced. In addition, because of the scalability of the SMP architecture, optional growth paths based on performance/capacity requirements and budget limitations allow for efficient processing of batch jobs. Very high performance is therefore provided at a relatively low cost.

The present invention also provides a system which enables a batch to be distributed into a plurality of independent segments. Each segment comprises a plurality of discrete events, each discrete event comprising a plurality of sub-events to be processed. The system operates to process each discrete event within each segment sequentially and each sub-event within each discrete event sequentially. The plurality of segments may be processed on an uniprocessor, an SMP system a massively parallel processing system or distributed loosely coupled system. By balancing the number of discrete events in each segment using a data segment parallelized "course grain" approach, a flexible but efficient use of processor availability is obtained.

DETAILED DESCRIPTION OF THE PREFERRED EMBODIMENTS

Figure 1:
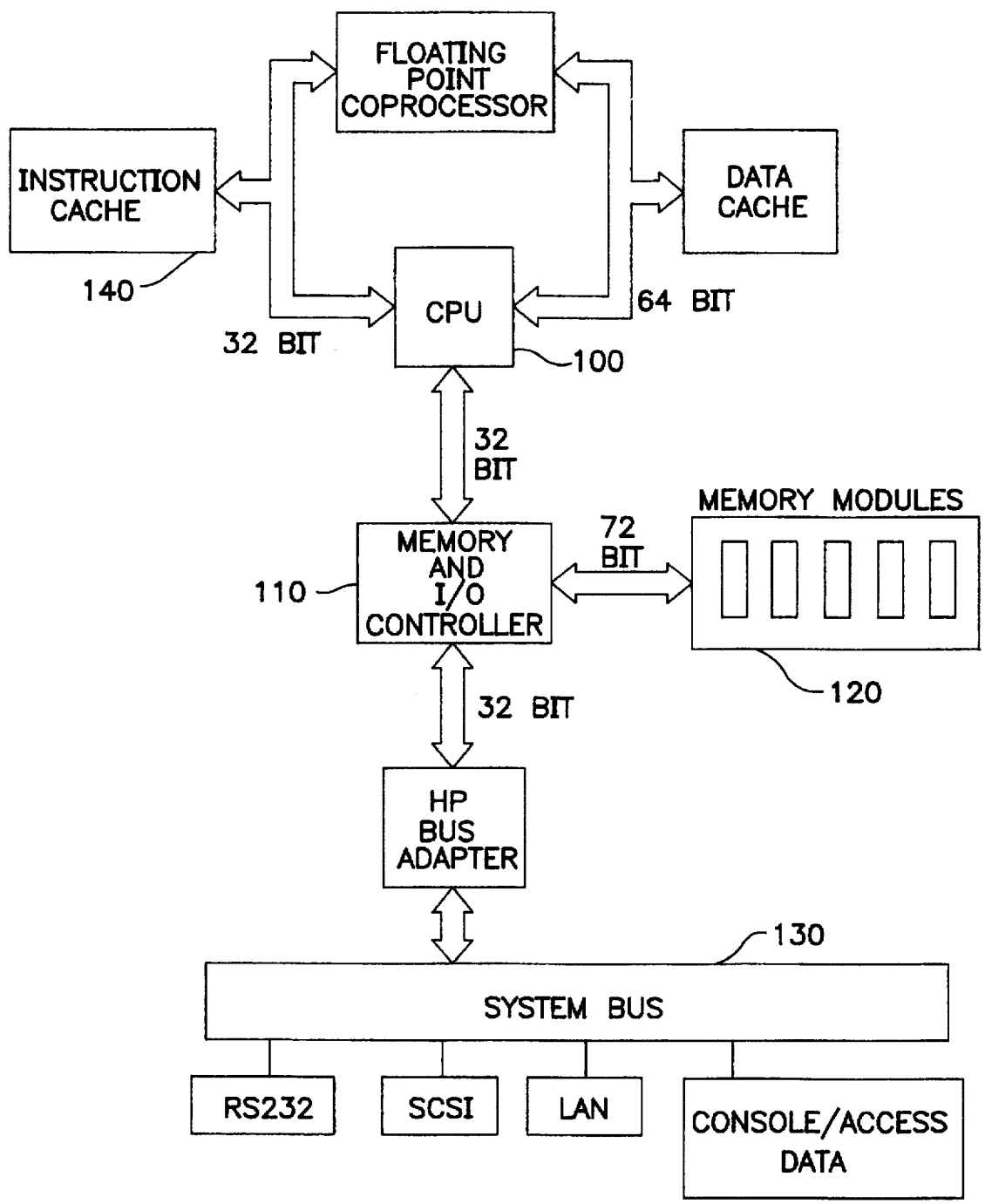
FIG. 1 is a system block diagram of a conventional uniprocessor platform according to the prior art.
Figure 2:
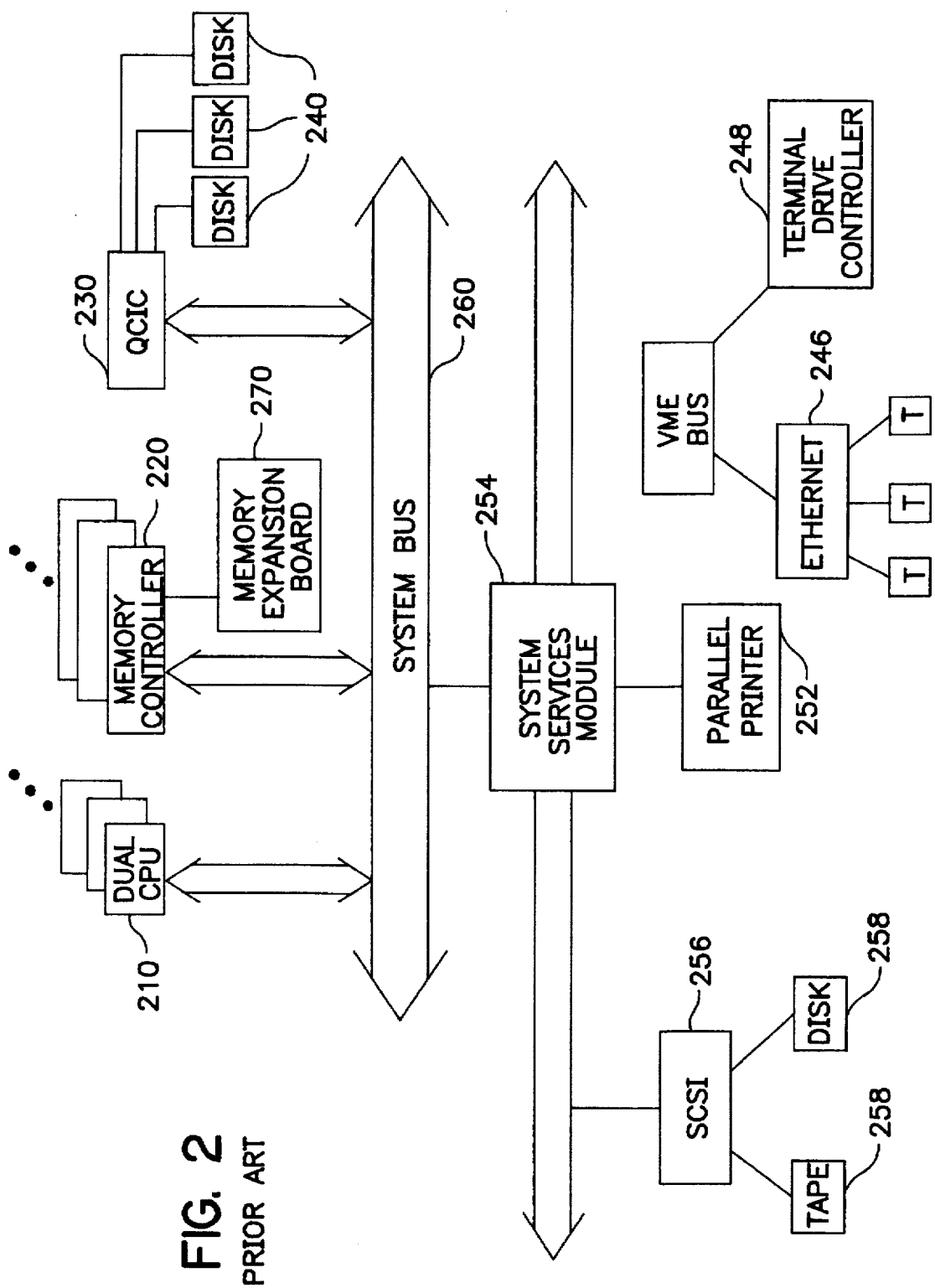
FIG. 2 is a system block diagram of an SMP platform according to the prior art.
Figure 3:
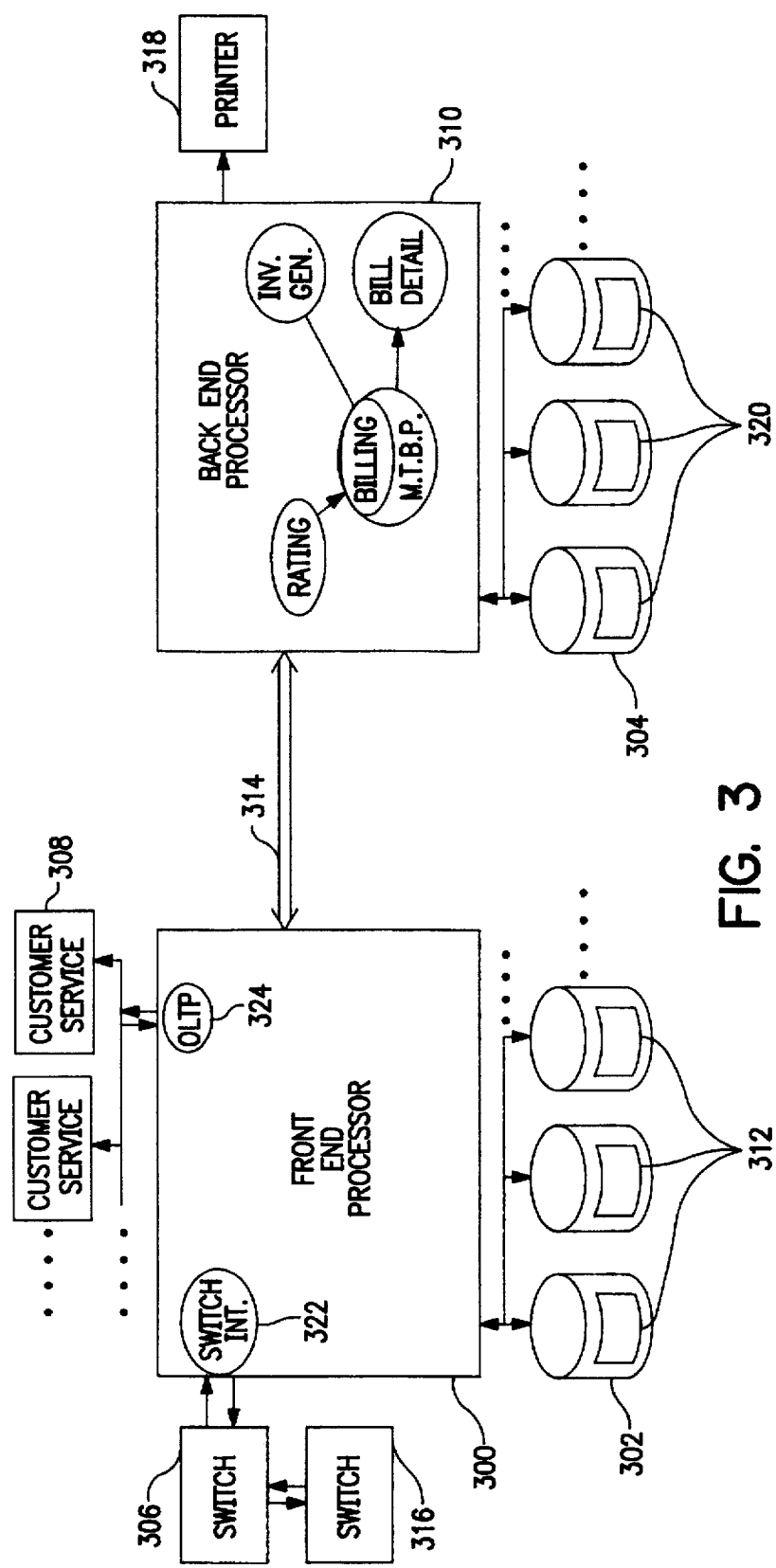
FIG. 3 depicts a block diagram of the overall system organization according to a preferred embodiment of the present invention.

FIG. 3 depicts generally a computer system according to a preferred embodiment of the present invention. For exemplary purposes, a system for use in the cellular phone industry will be described without limiting the scope of this invention. The computer system comprises a front end processor 300 and a back end processor 310. Front end processor 300 and back end processor 310 communicate via communication link 314. Front end processor 300 is also connected to a switch 306, which has a switch memory 316 connected thereto, at least one customer service node 308 and a disk farm 302. Back end processor 310 is connected to a printer 318 and a disk farm 304.

Front end processor 300 communicates with at least one switch 306 to activate or deactivate customers. Switch 306 may be any type of switch commonly used in the cellular phone industry for determining when calls are placed and for making call connections. In order to determine which customers places a call, a listing of active customers for that particular switch is maintained at each switch 306. When a customer attempts to place a call in his or her home market, that customer's ID is compared with the active customer list for the home market. If the customer's ID is not in the list, then the call is not processed. Verification of customer calls placed from outside the customer's home market, a process called roaming, occurs through another process. In order to maintain the customer list accurately, front end processor 300 notifies switch 306 via switch interface software 322 operating on front end processor 300 whenever a customer is activated, deactivated, suspended or re-stored or whenever a customer's custom calling feature is added or changed or the customer's service number is changed. Switch interface software 322 is responsible for updating and verifying the customer lists at switch 306. Periodically switch interface software 322 runs comparisons between the customer lists at switch 306 and that at front end processor 300 to verify correspondence between the two. Front end processor 300 also communicates with at least one customer service node 308. These customer service operations are commonly referred to as On-Line Transaction Processing or OLTP operations 324 which are performed in response to commands or requests from customer service nodes 308. OLTP operations 324 in general are known, and in the cellular phone industry comprise a variety of customer service functions as will be described in detail below. Back end processor 310 connects to printer 318 to generate hard copy invoices to be sent to customers.

Front end processor 300 and back end processor 310 communicate via communication link 314. This interface may be, for example, an SQL*NET connection (TCP/IP). Alternatively, front end processor 300 and back end processor 310 may comprise one processor and may communicate through a database transfer between databases maintained by each processor.

Two major databases are used by the customer billing system. These databases typically store large volumes of information and therefore are preferably relational database management systems. The RDBMS sold under the trademark(ORACLE7), is preferable for managing the data in these two databases. A first database, a customer information database 312, is stored in disk farm 302 at front end processor 300. Customer information database 312 stores all of the information regarding the customer including accounts receivable, charges, service plans, etc. The second database, an invoice processing database 320, resides in disk farm 304 associated with back end processor 310. Invoice processing database 320 stores all of the information necessary for invoice processing, including customer information and customer calls which are downloaded from front end processor 300 and switch memory 316 respectively, as described in detail below.

These databases may reside on one disk, or may be spread out over several disks in disk farm 302 and 304 respectively. One preferred method for spreading the database over a plurality of disks is a method called striping. Striping is a method whereby pieces of information from a particular entry into the database are spread onto several disks. This process is especially useful so that memory accesses will occur to a plurality of disks instead of the same disk all of the time. This provides for reduced I/O time because the same I/O channel is not being constantly barraged with requests; rather, those requests are spread over a number of I/O channels.

Figure 4:
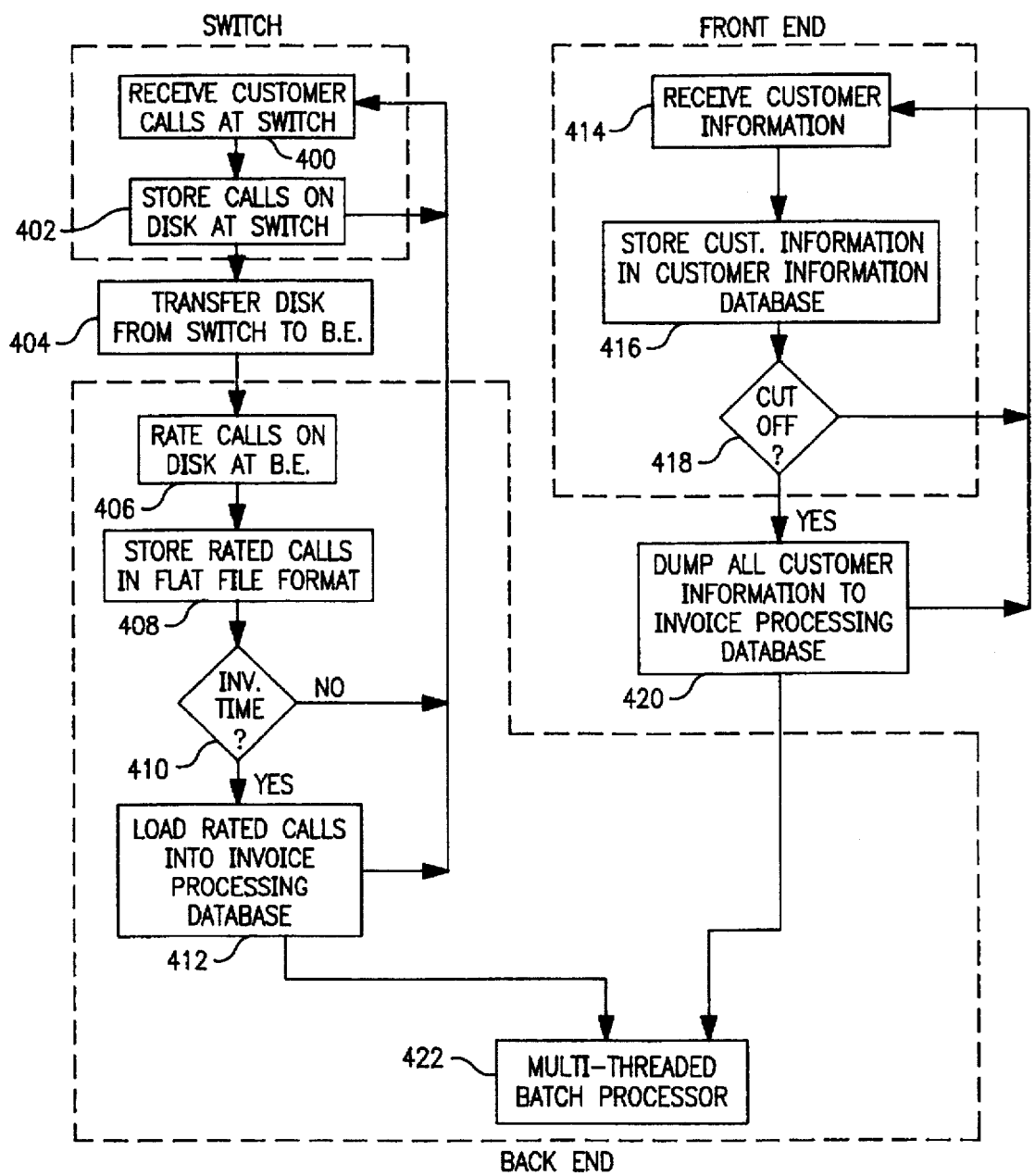
FIGS. 4 is a flowchart of an overall computer system operation according to a preferred embodiment of the present invention.

The operation and interrelation of these components will be described with reference to FIG. 4. FIG. 4 is a flow diagram representing an overall system function according to a preferred embodiment of the present invention. Two basic operations occur simultaneously in two separate locations, at switch 306 and at customer service nodes 308. In step 400, cellular calls are received by switch 306. Because customers place cellular calls at all times of day and night, this is a continuous process. As these calls are received, switch 306 generates customer call information for storage in step 402 into switch memory 316. As indicated in FIG. 4, this process occurs entirely at switch 306.

Periodically, as shown at step 404, customer call information is transferred from switch 306 to back end processor 310. Switch 306 may be located in a remote location with respect to back end processor 310 and therefore, the data collected and stored onto switch memory 316 is transferred to back end processor 310 via any communication link or stored onto a tape or other form of secondary storage and manually transported to the location of back end processor 310 for uploading. For example, switch 316 may offload the customer call data onto a tape and the tape may be mailed, or sent via an express courier service to back end processor 310 and then downloaded onto disk farm 304. Alternatively, a data link could be established between switch 306 and back end processor 310 for transferring this information over a link.

In one preferred embodiment, one front end processor 300 may service a plurality of switches 306. Therefore, rather than having a plurality of data links, manual transfer may be preferred. Step 404 occurs periodically. Preferably, customer call information is transferred daily, although weekly or even monthly transfer is possible. Daily transfer is preferable because the data which is generated over an entire month may be extremely large and transferring, as well as processing, that volume of data would likely take an unreasonable amount of time.

After the customer call information is stored at back end processor 310, each call is rated in step 406. Rating, or message processing, is a function to format each customer call and then associate certain charges associated with each customer call. In step 406, messages, or customer calls, from a variety of cellular switches may be processed and placed in a standard format. Messages are edited to determine conformity with a standard format and those which do not pass basic edits are placed into files for review and re-processing by a user at back end processor 310. A control report may be generated from the messages which cannot be processed further and those messages may then be edited and returned for processing.

Message processing also involves generating message statistics. With each set of messages uploaded at back end processor 310, summary statistics may be compiled regarding completed calls, incomplete calls, free calls, toll calls, local calls, special calls, records in error, and total records processed. Records corresponding to switch interconnections are also counted in these report records and are reported separately as well.

Each message is compared to a npa/nxx-based local coverage area. Each local coverage area is defined separately based on the customer's home region, foreign carrier region, single cell site, group of cell sites and/or service plan, each of which may be changed from time to time through OLTP operations 324 operating through customer service node 308. The coverage area is composed of groups of npa's, npa/nxx's, or even npa/nxx/lines. These groups can be combined into "super groups" to form coverage areas which can be easily manipulated to support a wide variety of local calling area scenarios.

After each call has been compared to a local coverage area to determine the origination of the call, toll rating is performed. Toll rating is based on the origination npa/nxx, destination npa/nxx, and time and date of the call (peak, off-peak, weekday, weekend, holiday). Toll rating is preferably based on tables supplied and updated by a third party supplier, for example, Q-TEL 9000, and can be modified on an as-needed basis. The toll rating system from Q-TEL provides toll rating information for all calls originating from all United States toll carriers. Another toll rating system is required to process calls placed outside the United States.

Rating also involves toll discounting. At any time, toll charges may be discounted based on the cell destination and the specific day or date rate. Day or date range discounting can be easily accomplished through menu options and is based on customer region or service plan. For example, toll charges might be discounted 50% for January 1993 for all customers on a particular service plan in order to support a special marketing promotion. Call destination discounting is accomplished by creating a special toll coverage area. Toll discounts may be assigned based on the call destination npa, npa/nxx or npa/nxx/line. Further, these toll discounts can be combined with local coverage areas to form sophisticated local calling area and toll discounting scenarios to support campus or PCN configurations. Thus, rating is performed on each call to determine a set rate to charge for that particular call and any flat fees to charge to each call. Once rating is performed, the rated calls are stored in step 408 to disk farm 304 in flat file format. As new groups of calls are rated, the rated calls are simply appended to the end of the flat file.

In step 410, after each group of rated calls is stored, back end processor 310 checks to see if the user has requested that customer invoices be generated. If not, then the loop of receiving calls in step 400, storing the calls in step 402, transferring the calls to back end processor 310 in step 404, rating calls in step 206 and storing the rated calls in a flat file in step 408 continues. Alternatively, if the user has requested that the invoice generation begin, then in step 412, the rated calls stored in the flat file are transferred into invoice processing database 320 and a new flat file is used to store the rated calls from step 408. The rated calls stored in invoice processing database 320 are then ready for invoice processing as performed in step 422 by the multi-threaded batch processor as will be described in detail below. The information stored into invoice processing database 320 may comprise, by way of illustration only, the information depicted in Table 1 below.

TABLE 1

Example of Customer Call Information Passed to Invoice Processing Database at Back End Processor 310

| FIELD NAME | FIELD TYPE |
|---|---|
| Customer Account Number | CHAR(10) |
| Area Code Called | CHAR(3) |
| Exchange Called | CHAR(3) |
| Line Number Called | CHAR(4) |

TABLE 1-continued

Example of Customer Call Information Passed to Invoice Processing Database at Back End Processor 310

| FIELD NAME | FIELD TYPE |
|---|---|
| System ID Where Call Originated | CHAR(5) |
| Date of Call | DATE |
| Start Time of Call | CHAR(6) |
| Duration of Call | NUMBER(10) |
| Time of Day Toll Rating | CHAR(1) |
| Time of Day Airtime Rating | CHAR(1) |
| Call Type - Mobile to mobile, Land to Land, Mobile to land, Land to Mobile, etc. | CHAR(1) |
| Taxes | NUMBER(10) |
| Batch Id Number | CHAR(20) |

Concurrent with the call processing operations of steps 400–412, customer information is periodically received in step 414 at front end processor 300 through customer service nodes 308. For each customer, a record of information is maintained in customer information database 312 stored in disk farm 302 at front end 300 and may include the customer's name, address, telephone number, credit rating, home cell, service plan, customer calling features selected, any custom calling information, accounts receivable, etc. This information is accessible by customer service representatives through customer service nodes 308. As customers request changes or request status inquiries, customer service representatives may enter the changes or requests via OLTP operations 324 running on front end processor 310.

Payments are also entered through OLTP operations 324 in step 414. As bills are paid, the payments received are entered into a customer information database through OLTP operations 324. Payments are posted in real time, automatically updating bill balance information for each customer and for collection queues which exist to track delinquent customers. Customer information access is also provided through OLTP operations 324. Deposits and other payments may also be recorded into customer information database 312.

Collections information may also be updated regarding each customer in step 414. When an account meets a table-defined collections criteria, for example, based on the length of time the account has been past due and the credit class assigned for the particular customer, that account is selected for collections activity. These accounts are prioritized and placed in a collections queue for a collections agent. Customer service managers may also change the order of or add accounts to the collections queues if desired.

A collections agent located at a customer service node 308 is then responsible for entering a result code to categorize the response received when the customer whose payment is past due has been contacted. This information is also received in step 414. If the result code is a busy or no answer, then the customer account is placed back into the queue. If, for example, a customer promises to pay by a certain date, that date is entered by the collector and received by the front end at step 414. Then, if payment is not received by a specified number of days past that date, the account automatically returns to the collection queue for resolution. Comments may also be stored for each customer account and stored into customer information database 312 through steps 414 and 416.

Other information may also be entered in step 414, such as tax information, one time charges, paybacks, adjustments, etc. All of the types of information concerning the customer may be changed through the customer service nodes 308 and front end processor 300 operating under OLTP operations 324.

As customer information is received in step 414, from end processor 300 stores this information into customer information database 312 in step 416. In step 418, front end processor 300 checks to see if a system operator has selected a "cut-off" in customer service information. A "cut-off" is selected by a system operator, for example, a supervisor for the cellular phone billing company who wishes to complete the charges for a particular billing period. Access to cut-off is preferably limited to a selected few individuals at each of the locations to avoid generating invoices errantly. If cut-off has not been selected, the loop of receiving and storing customer information continues. Alternatively, if cut-off has been selected in step 418, then in step 420, all customer information necessary for billing is dumped from customer information database 312 at front end processor 300 to invoice processing database 320 at back end processor 310. The customer information which is dumped generally comprises information, for example, as depicted in Table 1 below. After the customer information has been dumped into invoice processing database 320 at back end processor 310 across communications link 314, invoice processing may take place in step 422 under the control of the multi-threaded batch processor.

TABLE 2

Example of data passed from Customer Information Database at Front End Processor 300 to Invoice Processing Database at Back End Processor 310

| FIELD NAME | FIELD TYPE |
| --- | --- |
| Customer's Last Name | CHAR(15) |
| Customer's First Name | CHAR(15) |
| Customer's Social Security | NUMBER(9) |
| Account Type - Individual, | CHAR(1) |
| Customer Status - Pending, | CHAR(1) |
| Rate Plan | CHAR(3) |
| Credit Class | CHAR(1) |
| Service Plan | CHAR(1) |
| Accounts Receivable | Data structure |
| Adjustments | Data structure |
| Custom Calling Features | Data structure |
| Recurring Charges | Data structure |
| Non-recurring charges | Data structure |
| Refunds | Data structure |
| Deposit | Data structure |

As depicted in Table 2 above, a large volume of data is collected and stored regarding each customer. A database management system which is particularly effective at handling this large amount of information is important. Relational database management systems are particularly useful. In one preferred embodiment, customer information database 312 is a relational database management system, for example the relational database management system sold under the trademark(ORACLE7) which provides simple operations which perform the mass transfer of database information from one database to another. By simply executing these operations the transfer of data may be accomplished. As discussed below, a relational database management system is preferable additionally because of its ability to support SMP functions. Relational database management systems such as those sold under the trademark(ORACLE7) are particularly suited to SMP functions on a Sequent platform.

Figure 5A:
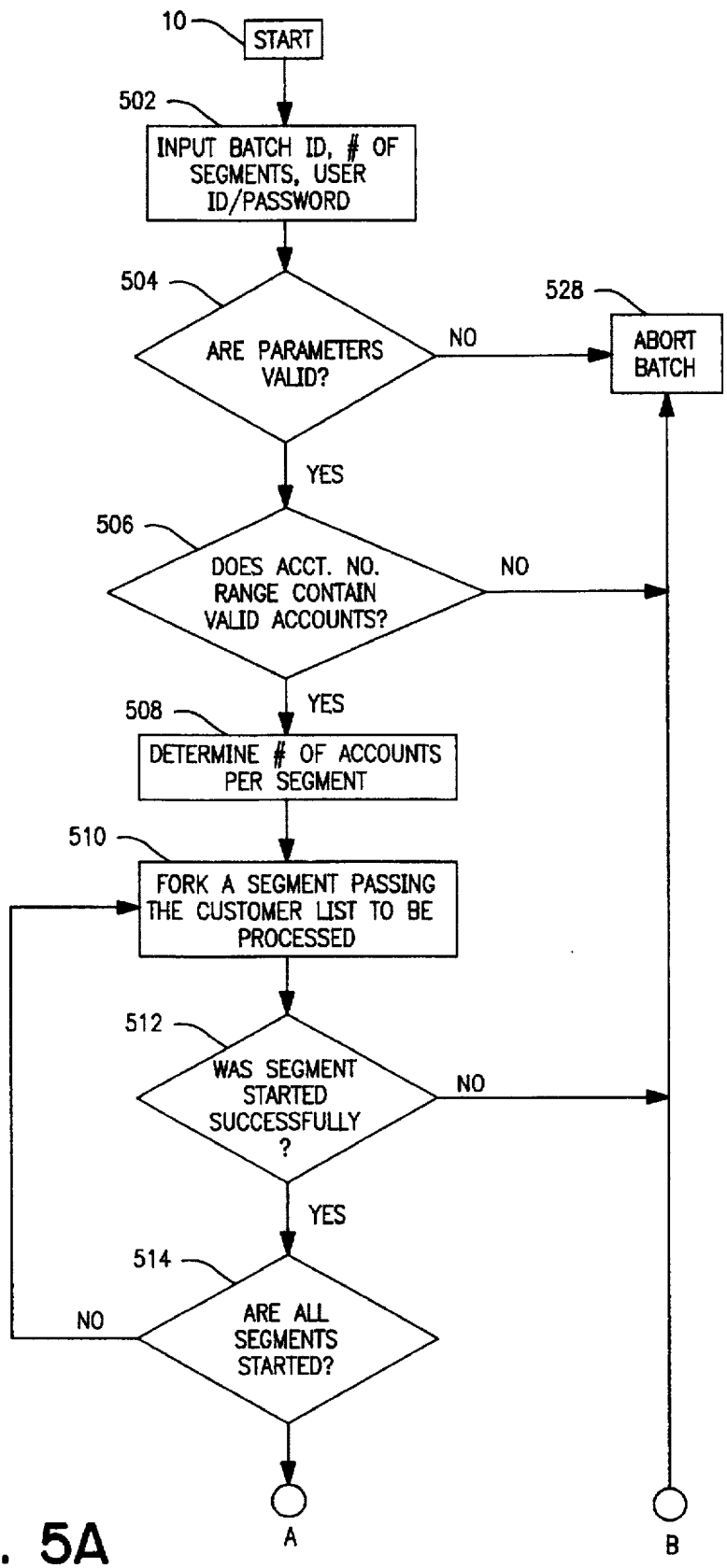
FIGS. 5A–5B is a flowchart of a process of multi-threaded batch processing according to a preferred embodiment of the present invention.
Figure 5B:
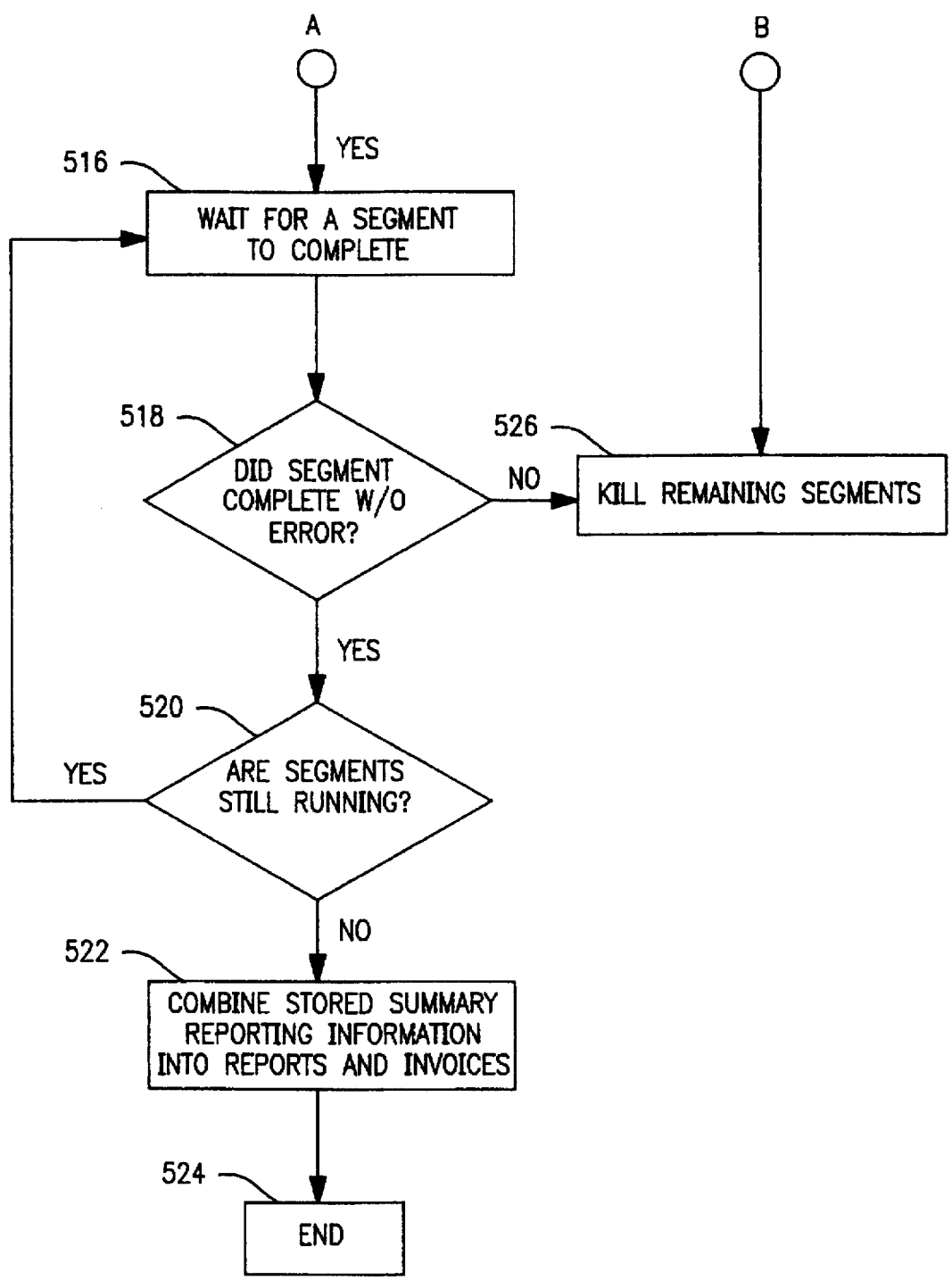

FIGS. 5A–5B depicts a flow diagram of the operation of the multi-threaded batch processor (MTBP) according to a preferred embodiment of the present invention. The steps discussed with respect to FIG. 5 correspond to the overall process step 422 depicted in FIG. 4. One embodiment, implemented in source code, of a multi-threaded batch processor according to the preferred embodiment is contained in pages 2–31 of the accompanying Microfiche Appendix.

Batch processing, as described above, comprises processing a plurality of discrete events. As used herein, the term "discrete event" is not limited to a time specific occurrence, but rather a collection of data which is to be processed to generate an outcome. Preferably, each discrete event comprises a plurality of sub-events. Each sub-event is also data which is to be processed. In a preferred embodiment of the present invention, when applied to the cellular phone customer account processing, each customer account to be processed is treated as a discrete event. Further, since a number of details regarding the customer account must be processed, for example, recurring charges, non-recurring charges, taxes, customer calls, accounts receivable, etc., each of the details is treated as a sub-event which may be processed separately.

Upon start up in step 500, MTBP requests input of the batch by requesting the batch identification, the number of segments into which the batch is to be distributed and the requesting user's identification and password. If any of these parameters is invalid, then the batch is aborted in step 528. According to an alternative embodiment, instead of the number of segments being requested and input by a user, this information could be automatically determined by the MTBP.

According to this alternative embodiment, the number of CPU's operating on the system may be determined through a system call. Therefore, if the system were operating in a uniprocessor environment, then the number of CPU's would be equal to one. If the system were operating in a SMP or MPP environment, then the operating system could pass this information as well as the number of active processors to the MTBP. In one preferred embodiment, the number of segments then could be selected to be equal to the number of CPU's. Other algorithms for selecting the number of segments as compared to CPU's are also within the scope of the present invention. For example, the number of segments could be selected to be some number times the number of CPU's operating. There could also be eight (8) CPU's and 10 segments, for example. The number of segments need not correspond to the number of CPU's Once the number of segments has been input either by a user or determined automatically and all parameters have been determined to be valid, in step 504 the account number range is determined from the batch identification. The account number range then is checked to ensure that valid accounts exist within that particular range. This step is performed as a "double-check" to validate the account range specified. Errors that sometimes might occur are specifying an account range outside of the range of existing customers or specifying a range wherein certain events are selected to be within the range but other dependent accounts are not. If all of the parameters are valid, as checked in step 504, then control passes to step 506 to determine if valid accounts exist within that particular account number range. If so, then the job is aborted in step 528. If valid accounts do exist, however, then in step 508 the MTBP determines the number of accounts per segment.

Step 508 of loading the segments may be accomplished in multiple ways. It may be desired to load each segment with similar types of customers. Alternatively, it may be desired to load each segment with a wide range of customers. Another possibility might be to load more active customers into a segment which contains fewer customers to be processed. One preferred embodiment of the MTBP for distributing the accounts into the various segments is represented by the flow diagram of FIG. 6 which will be described in detail below.

After each segment has been loaded with a set of customer accounts to be processed, a first segment is forked in step 510. "Fork", as will be recognized by one of ordinary skill in the art, is a function based on the multitasking operating system sold under the trademark(UNIX) representing the activation of a child process on the processor. While the MTBP acts as a parent process, each fork call generates a child process corresponding to a segment. When a segment is forked, resources are allocated to that segment and the segment begins sharing processor time with other active processes. "Fork" is a system call generic to the environment of the multitasking operating system sold under the trademark(UNIX) which creates a new process having a duplicate copy of the parent process, here the MTBP, with the same data, register contents, and program contents as the parent. The forked process, here the segment, has access to the same files as the MTBP. Also in step 510, the "exec" system call is made. "Exec" starts the newly created process generated by the "fork" system call. If the first segment is forked and started successfully, as detected in step 512, then the MTBP determines in step 514 if all of the segments have been forked. If the forking and starting in step 510 was unsuccessful, then the batch is aborted in step 528.

After all of the segments have been forked, then the MTBP waits in step 516 for a segment to complete processing. If a segment completes processing, the MTBP verifies whether the process completed without error and if so continues to step 520. If an error was detected, then the remaining segments are terminated in step 526 and the batch is aborted in step 528. In step 520, the MTBP checks to see if some of the segments are still being processed. If so, then it continues to loop though steps 516, 518 and 520 until all of the segments complete.

If all of the segments complete without error, then in step 522, the entire batch of customer accounts may be combined, summary reporting may occur and invoices may be generated for each of the customer accounts. Often an entire batch must be approved before invoices are mailed. Thus, by collecting each of the segments back into the batch, summary approval may be performed. After summary processing is complete, the MTBP terminates in step 524 until the next batch of customer accounts needs processing. Summary processing may include generating a detailed summary or bill detail for use by the system operator in deciding whether to approve the bill or not. Also, invoice generation performed as a step performed in step 522.

Figure 6A:
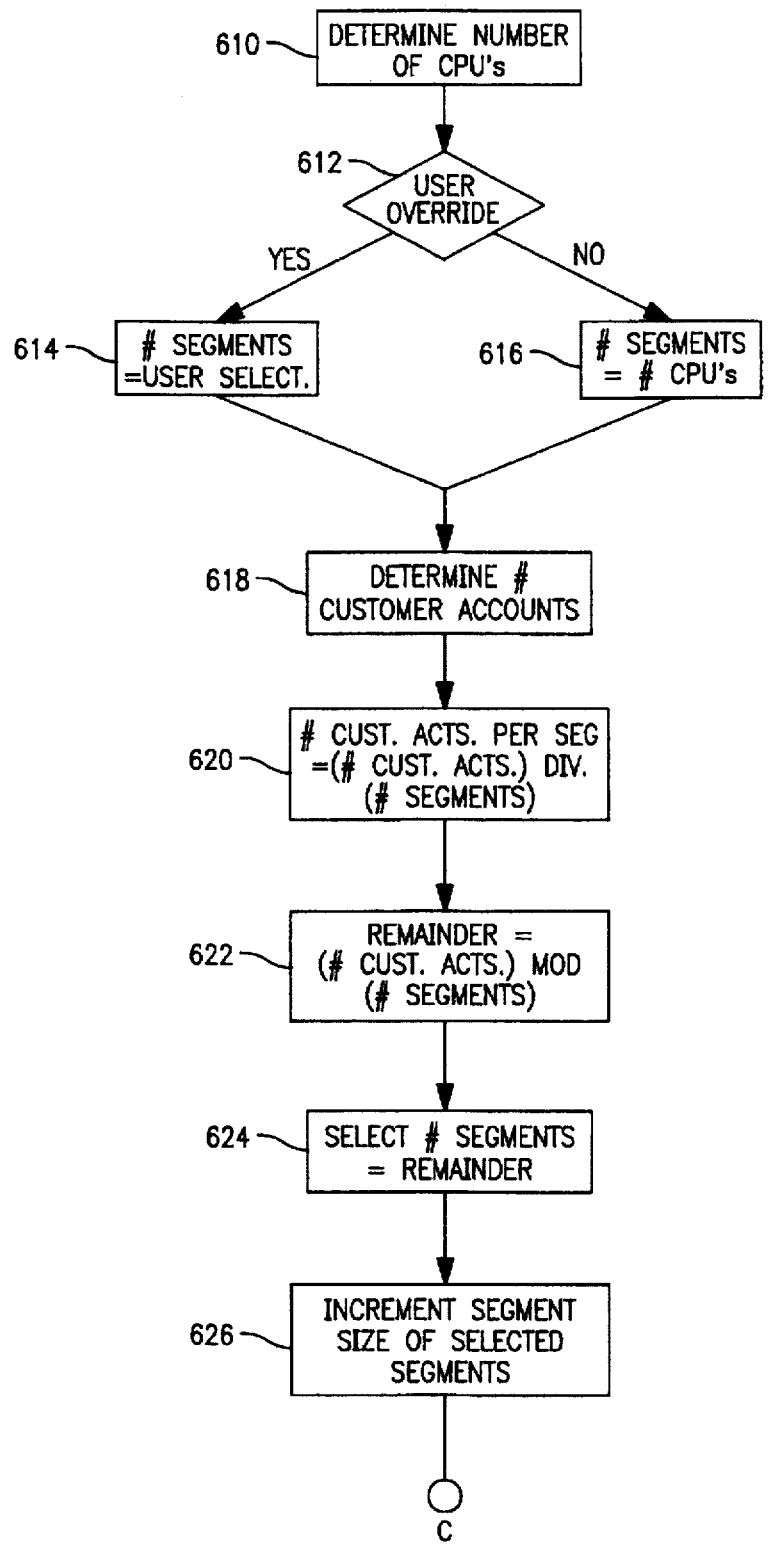
FIGS. 6A–6B is a flowchart of a process for distributing discrete events into a plurality of segments according to a preferred embodiment of the present invention.
Figure 6B:
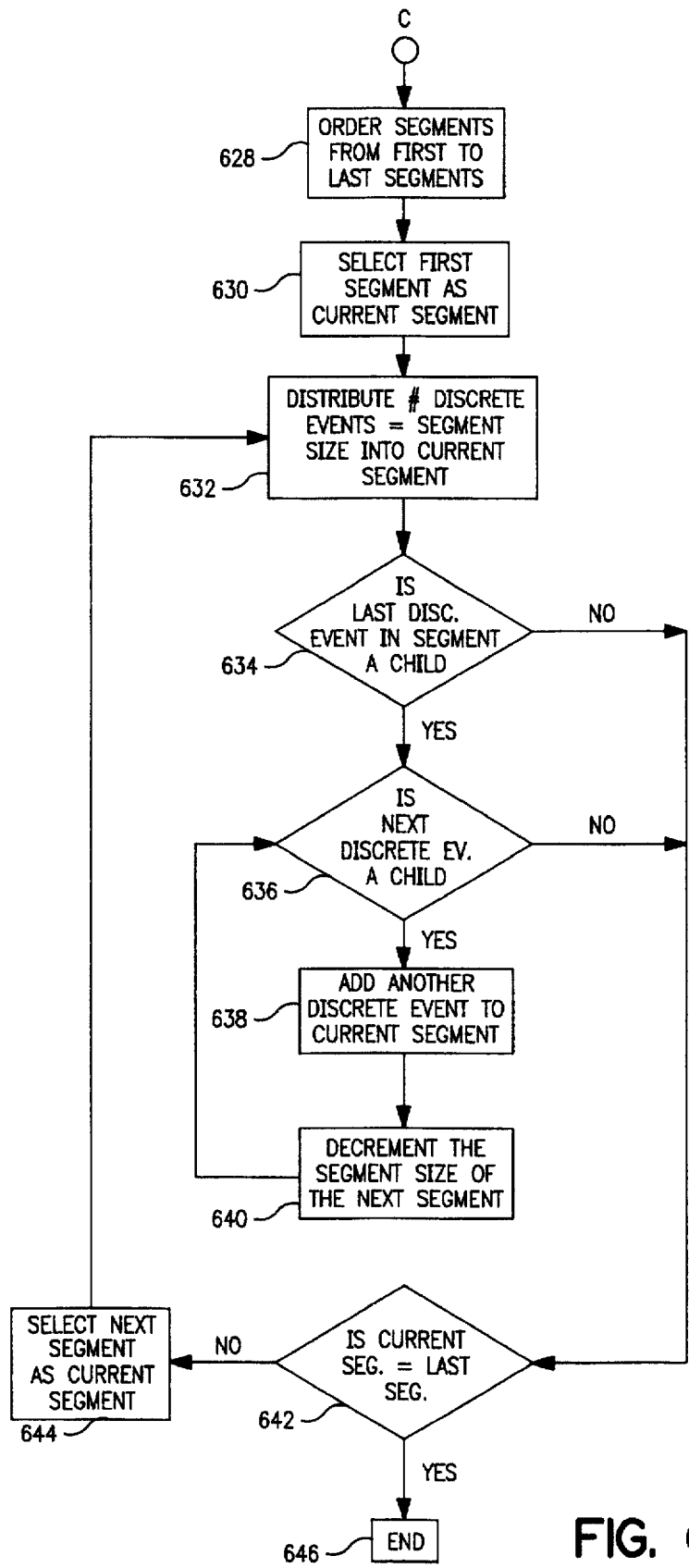

One method of placing the customer accounts into the various segments which are generated is depicted in FIG. 6. As shown in FIG. 6, in steps 610 through 616 the number of segments is determined. This may alternatively be input by a user. Once the number of segments to be used has been determined, then the number of customer accounts to be distributed into those segments must also be determined in step 618.

In general, customer accounts are labeled as either an individual account, a master account or a child account. This type of labelling is necessary in order to differentiate between individual customers and aggregate accounts such as company sponsored customers for whom cumulative company bills and individualized child bills must be generated so the company can monitor use by each of its employees.

Therefore, companies are typically labeled as master accounts and receive an aggregate bill for each of their employees. The employees are labeled as child accounts. In order to process a master account, therefore, each of its child accounts must be processed first. In order to signify the beginning of a master and child grouping, master customer ID's are placed sequentially before child customer ID's in the account number listings which are produced for batching. When distributing customer accounts into the various segments, it is desirable to keep the child accounts and the master accounts in the same segment. Once the number of customer accounts to be processed and the number of segments have been determined, then the number of customer accounts per segment is determined in step 620 to simply be (number of customer accounts) DIV (number of segments). Further, in step 622, a remainder is determined to be equal to (number of customer accounts) MOD (number of segments). After the remainder has been determined, in step 624 a number of segments equal to the remainder are selected and in step 626, the segment size for each of those segments is incremented by one. Thus, for example, if there were 7 segments and the remainder was 4, then the first four segments may be selected and the segment size of each may be incremented by one.

After each segment has a segment size assigned to it, in step 628 the segments are ordered from a first segment to a last segment for distribution of the customer accounts. In step 630 the first segment is selected as the current segment and in step 632 a number of customer accounts, or discrete events, equal to the segment size for that particular segment are distributed sequentially from the account number listing provided in the batch into the current segment. At this point, in step 634 it is determined whether the last customer account which was distributed into the current segment was a child account. If not, then control passes to step 642 to determine if all of the segments are full. If the last distributed customer account was a child account, it is determined whether the next customer account to be distributed is also a child account. If not, then control passes to step 642. If it is, then in order to process the child and master account in the same segment, the next child account is added to the current segment. This step is performed in step 638. Since adding another customer account increases the size of the current segment, the size of one of the other segments must be decremented so that the total distribution of customer accounts will correspond to the sum of the segment sizes for all of the segments. Thus in step 640, the next segment's segment size is decremented by one. It is possible that the next segment's segment size could be reduced to zero or even below zero. This would occur for a very long distribution of a child account for one particular master account.

If this were to occur, then a number of schemes to correct this problem are possible. For example, one less segment could be used. Alternatively, other load balancing schemes could be employed. However, since each batch may typically include about 10,000 or more customers and often anywhere between 2 and 20 segments are used, the likelihood of getting a master and child grouping which is over 5000 or even 500 is unlikely. Once the next segment's segment size has been decremented by one in step 640, control passes back to step 636 to continue to check to see if all of the child accounts in the sequential listing of child accounts has been added to the current segment.

In step 642, it is determined whether the current segment is the last segment to have been distributed customer accounts. If it is, then the process ends in step 646. If not, then in step 644, the next segment is selected as the current segment and the loop through steps 632, 634, 636, 638, 640 and 642 continues until all of the segments have had customer accounts distributed to them.

Figures 7, 8:
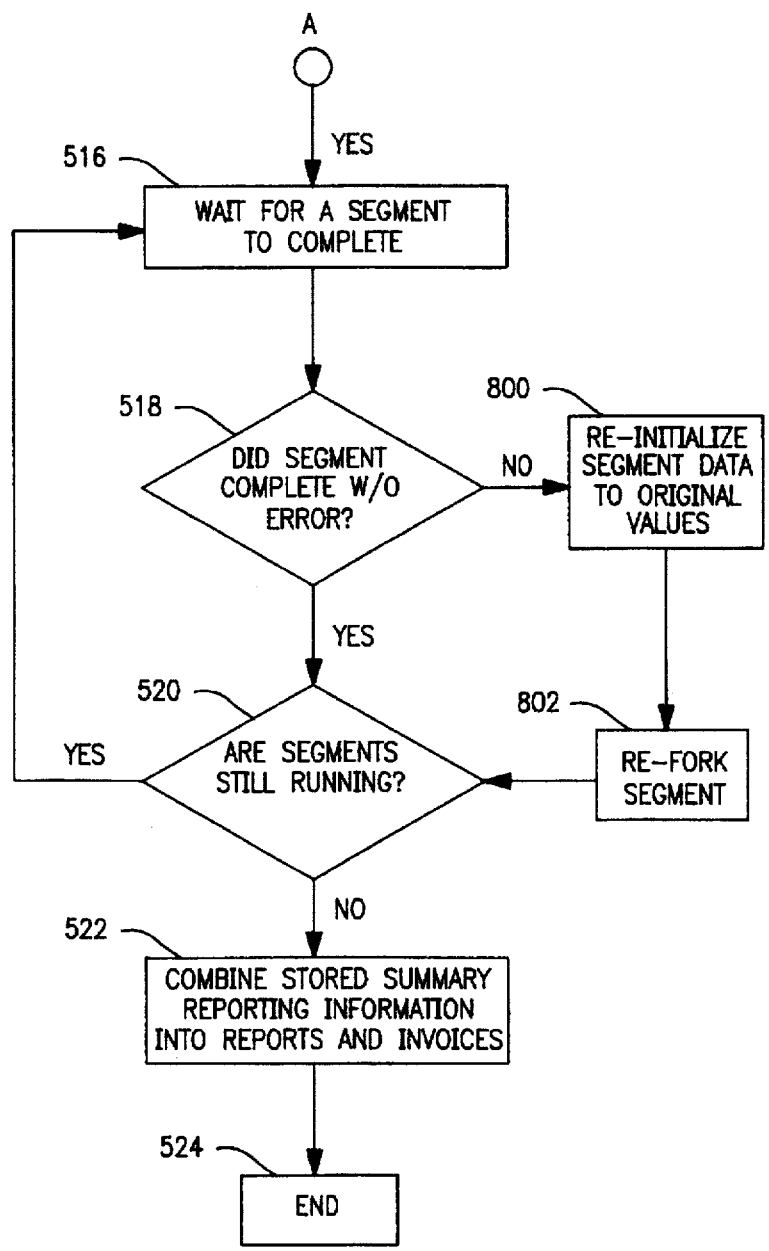
FIG. 7 is an example sequence of a plurality of discrete events in a batch to be processed according to a preferred embodiment of the present invention.
FIG. 8 is a flowchart representing a no-reset process for processing discrete events according to one preferred embodiment of the present invention.

To further illustrate this process, reference will be made to an example customer account grouping in FIG. 7. FIG. 7 depicts an example of an account number listing. I indicates an individual customer, M, a master customer and C, a child customer. If 3 CPU's were available and no user override were active, then in step 614, the number of segments would be set to equal 3. Therefore, the MTBP would create three segments, for example, segment1, segment2, and segment3. In step 618, it would be determined that there were 13 customer accounts to be processed in the listing in FIG. 7. In step 620, the number of customer accounts per segment would equal 4 and in step 622, the remainder would equal 1. In step 624, segment1 would be selected and its segment size, which was equal to 4, would be incremented to 5. Thus, we would have segment1 with a size of 5, segment2 with a size of 4 and segment3 with a size of 4.

In step 628, the segments would be ordered segment1, segment2, segment3. In step 630, segment1 would be selected as the current segment. Since segment1 has a segment size of 5, then the first 5 customer accounts (customer accounts 1-5) would be distributed into segment1. In step 634, it would be determined that the last customer account (customer account 5) distributed is a child account. Then in step 636, it would be determined that the next customer account to be distributed is also a child account. In step 638 then, customer account 6 would be added to segment1 and in step 640, the segment size of the next segment, segment2 will be decremented from 4 to 3.

Returning to step 636, once again it would be determined that the next customer account to be distributed (customer account 7) is a child account. Again, customer account 7 is added to segment1 and segment2's segment size is decremented from 3 to 2. After progressing through the distribution in this example, segment1 would have customer accounts 1-7, segment2 would have customer accounts 8-11 and segment3 would have customer accounts 12-13.

As this example illustrates, this particular scheme may not balance the load particularly evenly. Other balancing schemes could therefore be used based upon the expected configurations of data in order to finely balance the number of customer accounts in each segment.

In a preferred embodiment, both front end processor 300 and back end processor 310 comprise SMP systems. Because the present invention processes each customer account as a discrete event, the advantages of the SMP architecture may be exploited. Particularly, because each customer account is treated as a discrete event, each discrete event can be processed independent of the other discrete events and thus utilize as many CPU's as are available. The throughput for processing discrete events according to the present invention may vary when running on uniprocessing system, massively parallel processing systems, loosely coupled distributed processing systems depending, inter alia, upon the number of I/O channels, total CPU speed, and system bus capabilities. One preferred embodiment, implemented in source code, of the present invention's billing operations which operates on either an SMP, uniprocessor, a massively parallel processing system or a distributed loosely coupled system is contained in pages 32-68 of the accompanying Appendix.

For example, in the cellular phone environment, for each customer account, there may be three tasks which must be performed in order to generate the bill for the customer account. If those tasks were to 1) process payments, 2) process charges, and 3) process taxes, then for the first customer account, the customer's payments would be processed, then the customer's charges would be processed, and then the customer's taxes would be processed. Once all three tasks for that particular customer are complete, that particular customer can be stored to the processed data memory location, possibly another database and the next customer account in the segment can be processed.

Processing in this manner makes the system model function more like an OLTP model in which there are many events being performed concurrently. This type of model efficiently processes on an SMP machine running with an RDBMS database. Since a uniprocessor can also perform OLTP (albeit less effectively), the discrete customer system works fairly well in that environment as well.

It is possible to run the discrete customer events just like a traditional OLTP system in which each discrete event is a process and each process is placed in the queue waiting for the next available processor. In that instance, one process would be forked for each customer account and the system and database would handle these transactions transparently.

In order to obtain the control necessary to optimally tune the system, however, in a preferred embodiment, these discrete events are distributed into a plurality of segments as discussed. Each segment then is processed as a separate process and is forked off in that manner. Within each segment, each discrete event is processed sequentially, never beginning processing of the next discrete event until the active discrete event has finished processing. Further, since processing for each discrete event generally comprises a plurality of tasks, each task is also sequentially performed until all of the tasks for the active discrete event are complete. Because a smaller number of segments are forked as processes, the user can moderate the amount of resources used by the process to match the current hardware configuration as well as transparently meet future growth.

Existing billing applications which process customer accounts can be easily modified for use in the present distributed processing environment. Batches can be processed at many sites and on many different physical machines and still allow for information on all batches to be reported on or queried via the inherent functionality of RDBMS's.

One preferred embodiment of a billing system operating as a discrete event processor according to the present invention comprises using a SMP platform sold by Sequent under the trademark(SYMMETRY) model number S2000/750 running the relational database management system sold under the trademark(ORACLE7) and running version 2.0 of the operating system sold under the trademark(DYNIX/ptx). Treating each customer account as a discrete event, software operating according to the present invention in one embodiment generated 50,000 customer invoices in 64 minutes. In this embodiment, twenty four (24) 486 CPU's sold under the trademark(INTEL) operating at 50 MHz were provided. Main memory comprised 576 MBytes with each CPU having a cache memory of 512 KBytes. Twenty Four (24) disks in the disk farm comprised 1.3 GBytes of memory each with a disk having 300 MBytes located at the back end processor. In that process over 4,000,000 cellular telephone calls were processed as well as 7,503 adjustments to customer information, 10,004 commission wavers, 47,519 current charges, 32,513 payments and 20,008 non-recurring charges.

The present invention may alternatively operate in a uniprocessor environment, such as an HP 9000 Series 800 Integrated Business Server running the relational database management system sold under the trademark(ORACLE7) and version 9.0 of the operating system sold under the trademark(HP-UX). As discussed, the processing occurs with each segment operating as a separate process, but with each discrete event being processed sequentially within each segment as discussed above.

Figure 10:
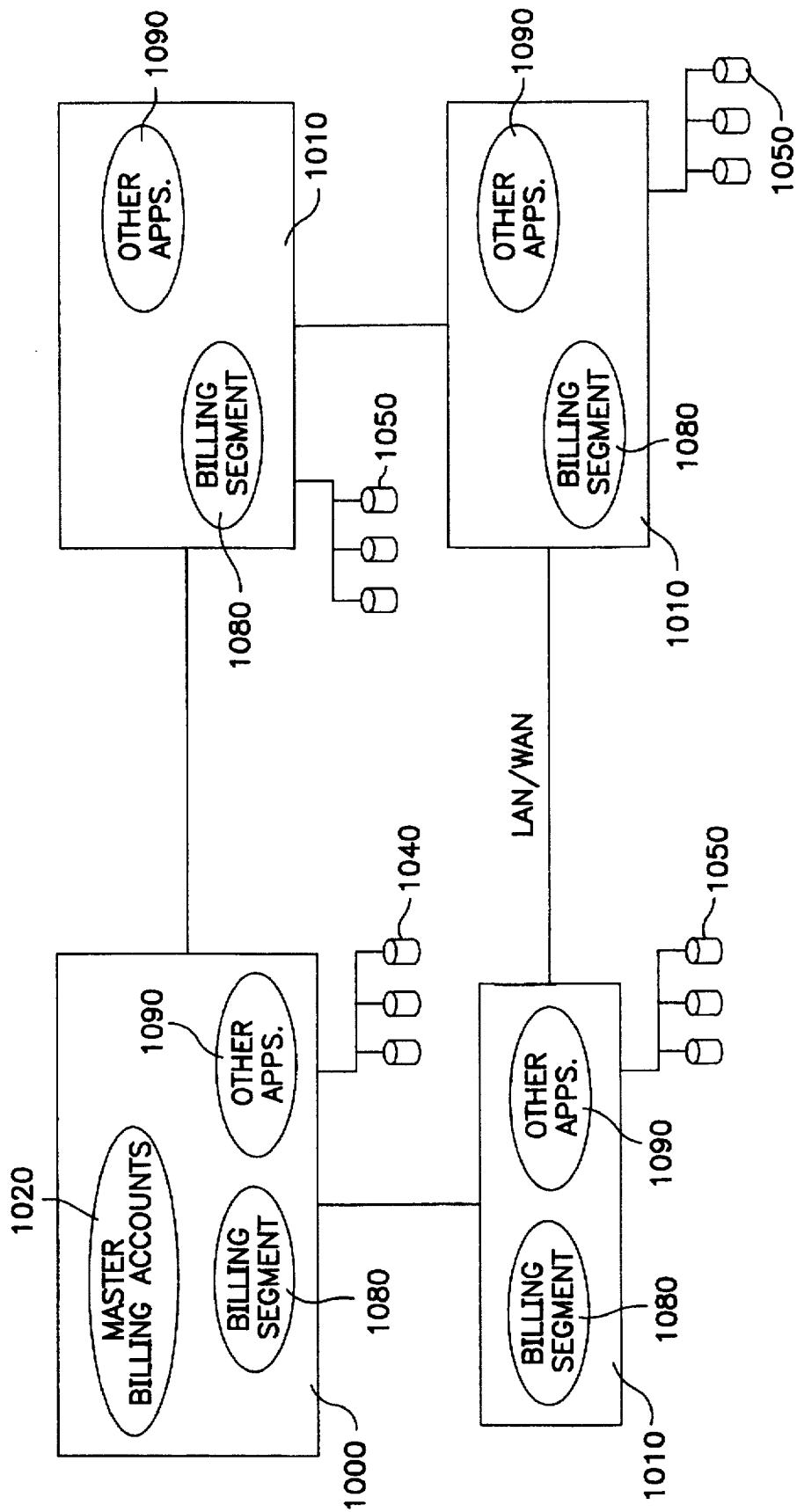
FIG. 10 depicts a block diagram of a loosely coupled distributed processing architecture according to another preferred embodiment of the present invention.

This invention may similarly be practiced in a loosely coupled distributed computing environment. An example of such an environment is illustrated in FIG. 10. In a distributed computing architecture, a plurality of workstations, PCs or other small computing systems may be connected so that they share data through a wide area network (WAN) or a local area network (LAN). In FIG. 10, four computing systems are shown connected via LAN. For purposes of illustration, each computing system 1000 and 1010 could be a personal computer having, for example, a 486-type CPU and one or more hard drives 1040 and 1050. The communication network could be, for example a LAN sold under the trademark (ETHERNET). Preferably, system 1000, having the single copy of the master billing process 1020, should be a higher MIPS machine such as a file server.

As mentioned, one copy of the master billing process 1020 resides on system 1000 and master billing process controls each of the distributed billing segments 1080 resident on systems 1000 and 1010. Each system may further have other applications 1090 resident in main memory and executing concurrently with billing segment 1080. Each system 1010, must have customer data for the appropriate segment moved to local disk 1050 prior to the bill run. Master billing process 1020, containing the multithreaded batch control system, described above, distributes discrete events into segments which are distributed to the local systems 1010. The multithreaded batch processing system when operating on a massively parallel processing system or a loosely coupled distributed processing system would include mechanisms to initiate and distribute tasks among the various processing resources within the system. Each system will then run the segment it has been assigned. Master billing process 1020 will monitor the running systems to determine if any segments have failed and need to be rerun. At the completion of all segments, the master billing process will produce reports and execute additional billing segments from a new batch should it be necessary.

The present invention may also be employed on a massively parallel processing system. Massively parallel systems employ dozens to hundreds or even thousands of processors to provide performance rates rivaling the rates provided on even supercomputers.

By adding more processors into this loosely coupled arrangement, scalability is provided almost infinitely. In this environment, even tens of thousands of MIPS are possible using, for example, general purpose CPU's such as 486 systems.

Figure 11:
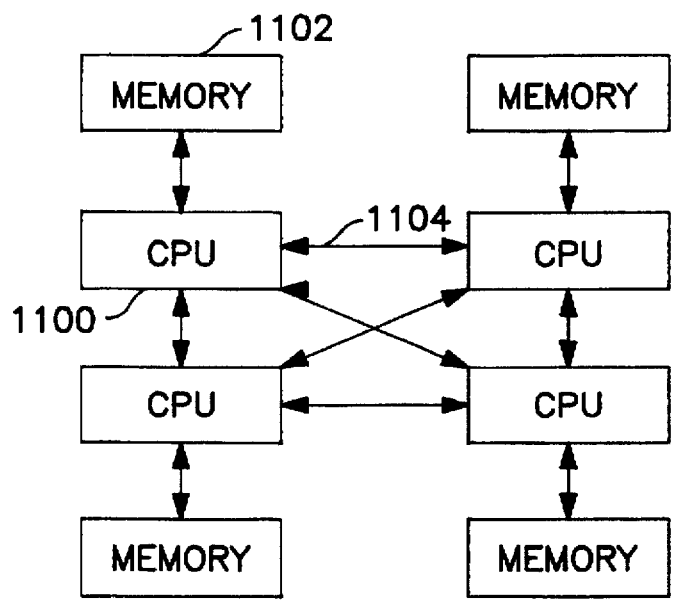
FIG. 11 depicts a block diagram of a massively parallel processing architecture according to yet another preferred embodiment of the present invention.

FIG. 11 depicts a massively parallel architecture. As depicted, a plurality of CPU's 1100, each having an associated memory 1102 are connected to each of the other CPUs 1100 via connections 1104. By having direct communication with each of the other CPU's, a loosely coupled arrangement is obtained.

One example of a massively parallel machine on which the present invention may operate is the supercomputer sold under the trademark(nCUBE2). This machine employs from 8 to 8192 nodes each consisting of a single chip 64 bit computer and memory chip. The proprietary microprocessor sold under the trademark(nCUBE2)is rated at 7.5 MIPS, so system performance may scale up to over 60,000 MIPS. The system provides over 512 GBytes of online memory with an interconnect communication throughput of 270 GByte/sec. This system may utilize the relational database management system sold under the trademark(ORACLE7). Multiple database servers run concurrently and independently, each of the CPU's 1100 having its own. However, even of the processing servers may process the requests of each of the CPU's 1100. Each parallel server has its own parallel cache manager to track the current location of database blocks in the caches of all of the servers. Most of these functions are provided through the relational database management system and the present invention, therefore takes advantage of the features present in the management system to effectively process the batch job over the massively parallel processing system architecture.

Figure 12:
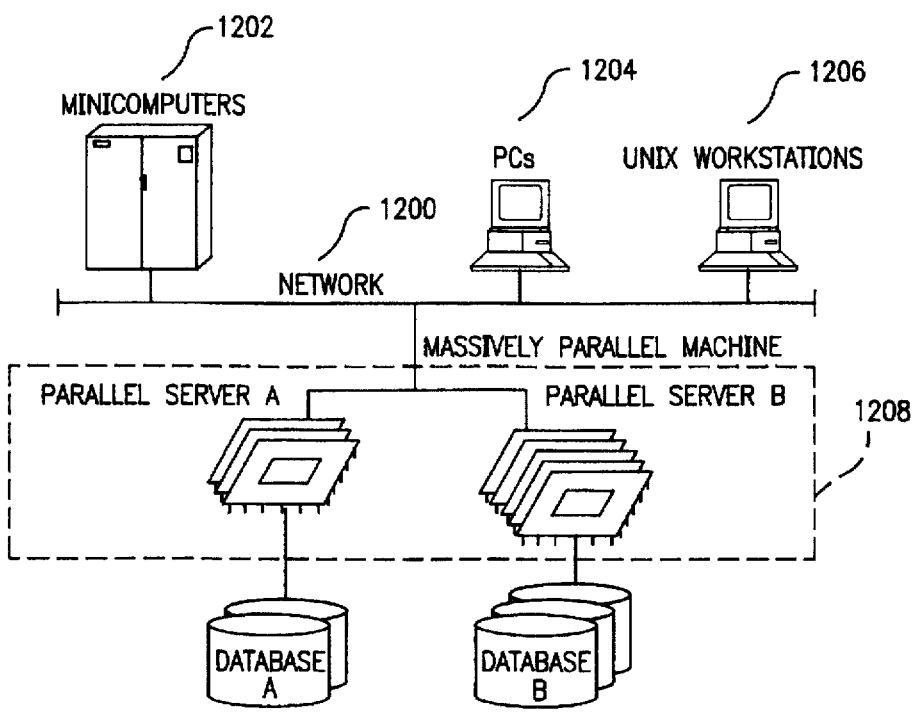
FIG. 12 depicts a block diagram of a linked computing system utilizing a massively parallel processing system, symmetrical processing system, uniprocessor system, and loosely coupled distributed processing system according to another preferred embodiment of the present invention.

In another embodiment as depicted in FIG. 12, a network 1200 may be connected to the massively parallel architecture depicted in FIG. 11 and shown as 1208. In this embodiment, a plurality of minicomputers 1202, PC's 1204 and/or UNIX workstations 1206 may be connected to the network 1200. Each of the systems 1202, 1204, 1206 could alternatively comprise a loosely coupled distributed processing system or a symmetrical processing system. Networking capabilities provided by the relational database management system sold under the trademark(ORACLE) such as SQL*NET technology utilizing communications protocols such as TCP/IP and DECnet are used to utilize the resources of the massively parallel architecture 1208. In this configuration, the MTBP may reside on either a PC, workstation or one of the CPU's 1100 included in the massively parallel architecture 1208.

Even the most effective systems run into failures while running batch jobs. When a batch terminates abnormally, heretofore, the entire batch was re-processed. In one embodiment according to the present invention, a system is provided for eliminating the need to re-process an entire batch if only a few of the discrete events within the batch fail. In the billing context, this may mean that only one or more customer accounts did not process correctly. The problems involved in this process result from the need to re-process the failed segments or customer accounts and still be able to reassemble the originally successfully processed segments and the re-processed segments into a batch for approval and invoicing.

In order to accomplish this function, it is necessary to maintain a secondary set of tables associated with the customer information and reference data (information contained in customer information database 312). These tables will be used to hold all data created by the billing process, as well as any changes to erroneous data found by human intervention (such as would occur during approval, etc.) necessary to correctly reprocess the failed events. The whole of these secondary tables preferably should:

1) include storage for information created during the billing process;

2) include storage for any new records appended to the customer or reference data; and 3) include an identifier for the run on which it was created. All new information calculated during the billing process is tied through an artificial key to the original primary customer charge information.

In addition, a table containing all accounts comprising a full batch run is provided with a status flag indicating the current state of the account. The valid states are either unapproved or approved. An unapproved account is available for processing by a billing process. An approved account has been determined, either by manual intervention or automatic determination such as through some form of artificial intelligence, for example, to have been completely and correctly processed. Further defining the account table is a pair of batching tables which provide descriptions of the parent batch (typically the full batch run) and a run ID number. Like the accounts, state information is stored for the batches. The valid states can be one of pending, active or complete. A pending batch is available for processing by a billing process. An active batch is one that is currently being handled by a billing process. A complete batch is one which has completed a billing process.

Each account is associated to the batching tables by maintaining its maximum run ID. In other words, every time an account is run, it stores an initial value for the run ID or the most current run ID. The maximum run ID is used to determine what pieces of data are the most current associated with each customer. Using the maximum run ID in this manner eliminates the need to delete old customer information when an account is re-processed. The data identified by a run ID equal to the accounts maximum run ID is the only correct data available for that customer.

An initial batch is submitted to the MTBP prior to the first request for processing. An external approval process and automatic determination by the billing process are used to handle re-submission of batches to the MTBP. A human operator is responsible for determining the completeness and correctness of a batch of accounts. Any accounts within the batch that are determined to be incorrect are re-submitted as a new batch comprised of only those accounts in error. Any accounts that contain one or more fatal processing errors or can otherwise be determined to have incorrectly processed are automatically re-batched for re-processing.

As an additional process, approval/revenue reporting and invoicing can be removed from the billing process. These processes can be placed in an external process. The external reporting mechanisms are capable of generation of their respective reports and invoices at any point after the completion of a billing process and can be created on any subset of the processed batches.

Figure 9:
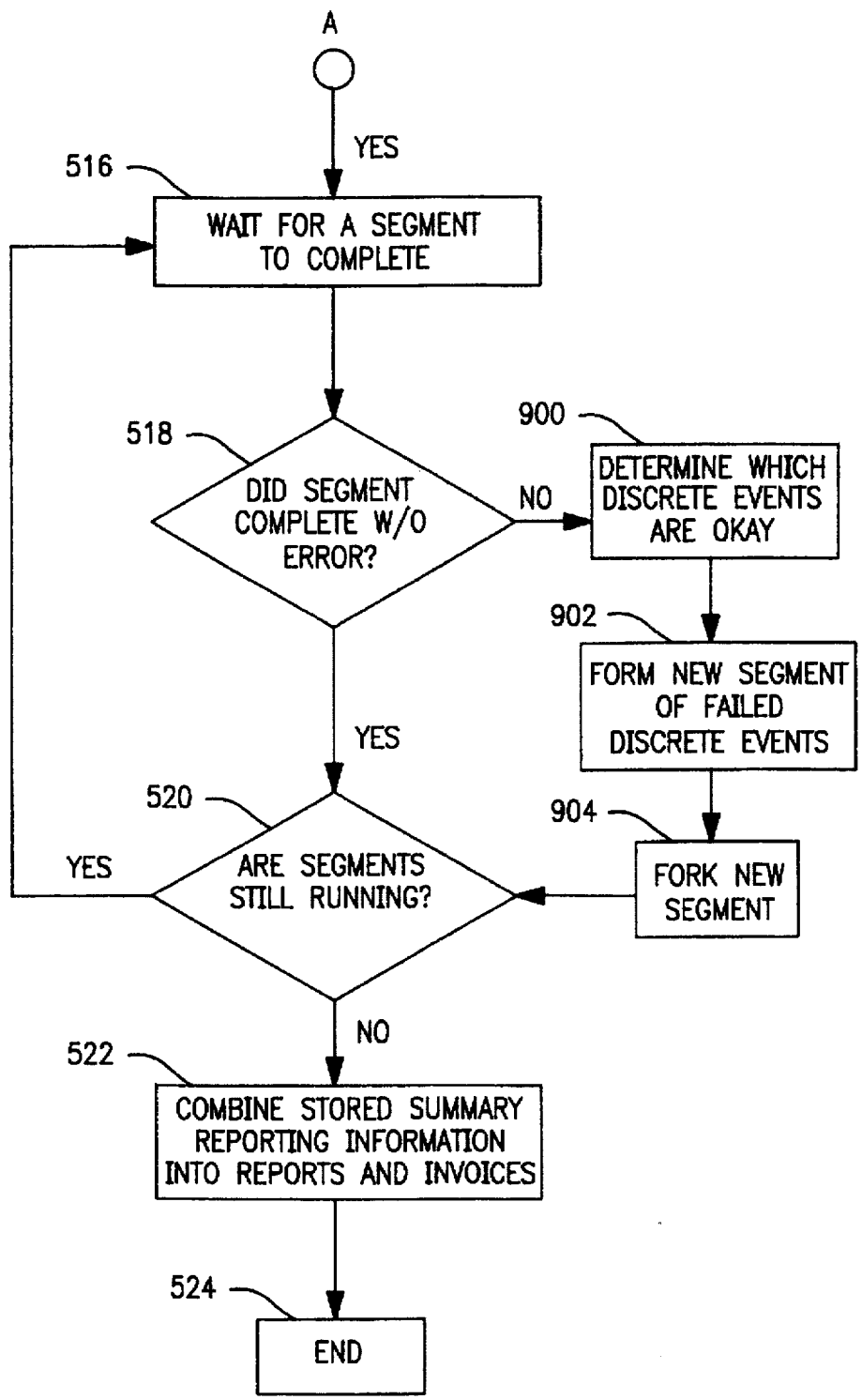
FIG. 9 is a flowchart representing a no-reset process for processing discrete events according to another preferred embodiment of the present invention.

The overall operation of a discrete billing function with a no-reset function may occur within the multi-threaded batch processor. As such, the process as depicted in FIG. 5 would be substantially the same. One embodiment of the present invention for providing a no-reset function is represented in the flowchart of FIG. 8. In FIGS. 8 and 9, numbers in common with FIG. 5 represent like process steps. In FIG. 8, when the MTBP reaches step 518 and it is determined that the segment did not complete without error, the MTBP does not kill all remaining segments as in step 526. Rather, in step 800 the segment data is re-initialized using the secondary tables associated with the customers in which the data that could have been changed is stored. At this point, a request to fork a new segment is issued by the MTBP in step 802. The process of re-initializing and re-forking preferably requires human intervention to resolve the error requiring the re-processing. However, automatic re-processing using some form of artificial intelligence could also be possible. For example, it may be desirable to attempt to process a particular segment twice before involving a human operator. Therefore, the human operator has to resolve the problem only if the error is due to some form of data error or equipment problem rather than simply a bad data read or the like.

In another embodiment, as depicted in FIG. 9, only the failed discrete events, which may be customer accounts for example, are re-processed. In this embodiment, if a segment fails as determined in step 518, in step 900, it is determined which of the discrete events were processed without failure and which were not. Again, this process could be done automatically by comparing the discrete event to some range of acceptable values, or could be done through an operator. Once it is determined which customer accounts should be reprocessed, a new segment is formed in step 902 comprising the failed customer accounts. This new segment is then forked in step 904 and control passes back to the 516–520 loop.

Having described the preferred embodiments of the invention, it will be appreciated by those skilled in the art that there exist numerous alternatives and equivalents which do not depart from the scope or spirit of the invention. Accordingly, it is intended that the scope of the present invention be limited only by the appended claims and not by the above description of the above preferred embodiments.

APPENDIX

```c
#include <stdio.h>
#include <stdlib.h>
#include <string.h>
#include "bglobal.h"
#include "vg_error.h"
#include "bparallel.h"
#include "stddevlp.h"
#ifdef _SEQUENT_
#include <sys/tmp_ctl.h>
endif EXEC SQL BEGIN DECLARE SECTION;
EXEC SQL END DECLARE SECTION;
#undef SQLCA_STORAGE_CLASS
EXEC SQL INCLUDE SQLCA.H;

int get_distribution(struct segment_struct **segment_list,
                     char *market,
                     long number_of_segments,
                     char *dynamic_load,
                     char *start_account,
                     char *end_account)
{
    EXEC SQL BEGIN DECLARE SECTION;
    char     oacct_nr[11];
    VARCHAR  ostart_account[10];
    VARCHAR  oend_account[10];
    VARCHAR  omarket[3];
    long     orownum=0;
    long     ocnt=0;
    long     ototal_cust_count=0;
    long     ototal_account_count=0;
    long     osegment_size=0;
    EXEC SQL END DECLARE SECTION;

struct segment_struct *segment_start=(struct segment_struct *)NULL;
    struct segment_struct *segment_last=(struct segment_struct *)NULL;
    struct segment_struct *segment_cur=(struct segment_struct *)NULL;
    struct segment_struct *segment_end=(struct segment_struct *)NULL;

BOOLEAN  error = FALSE; /* error flag */
    BOOLEAN  first = TRUE;  /* first account flag */
    long tot_cust_chk=0;/* count custs in segments */
    int index=0;/* count segments as produced */
    int indexa=0;/* count accounts as produced */
    int indexs_adj=0;/* count aggr overflow for segment */
    int segment_count=0;/* count segments as produced */
    long temp_acct_number=0;
    char segment_start_acct[11];
    char last_acct_nr[11];
    char segment_start_npa[4];
    char segment_start_str[8];
    long segment_start_num;
    long segment_mod=0;
    long distributer=0;
    long dist_adjust=0; /* Compensate for remainder after last segment */
    char line[80];
    FILE *fp;/* Static load file pointer */
    char tmp_err_buf[80]; /* used for formatted error statements */ vput(&omarket,market);
    vput(&ostart_account,start_account);
    vput(&oend_account,end_account);
    memset(segment_start_acct,NULL,sizeof(segment_start_acct));
```

-2-

```
memset(last_acct_nr,NULL,sizeof(last_acct_nr));

if(dynamic_load[0] == '1')
{

/* These queries assume pending accounts are not present in DB */

EXEC SQL
        SELECT COUNT(account_nr)
          INTO :ototal_account_count
          FROM BILL_INFO
         WHERE MARKET = :omarket
           AND (ACCOUNT_NR BETWEEN :ostart_account AND :oend_account);

EXEC SQL
        SELECT COUNT(account_nr)
          INTO :ototal_cust_count
          FROM CUST_INFO
         WHERE MARKET = :omarket
           AND ((:aggr != 'A')
           AND (ACCOUNT_NR BETWEEN :ostart_account AND :oend_account))
            OR (PARENT_ACCT BETWEEN :ostart_account AND :oend_account));

if((ototal_cust_count == 0) || (ototal_account_count == 0))
    {
        error = TRUE;
        error_handler("get_distribution",UNKNOWN,
                      "Need to specify an account range "
                      "encompassing actual accounts.");
        return(error);
    }
    else if(number_of_segments > 0)
    {

/* Must kludge this until able to bill aggs across batches */
        if(ototal_account_count/number_of_segments >= 0)
        {
            osegment_size = ototal_cust_count/number_of_segments;
            /* mod is the overflow to be evenly distributed */
            segment_mod = ototal_cust_count % number_of_segments;

/* protect for divide by zero */
            if(segment_mod != 0)
                distributer = number_of_segments/segment_mod;
            else distributer = 0;
        }
        else
        {
            osegment_size = 0;
        } if(osegment_size == 0)
        {
            /* don't run parallel if one account per segment */
            /* overhead is worse than sequential */
            osegment_size = 1;
            number_of_segments = 1;
            error_handler("get_distribution",UNKNOWN,
                          "Warning: Segment size < 1 account per ... "
                          "reset to one segment.");
        }/* If there are more segments than accounts */ printf("start_account = %10.10s end_account = %10.10s "
               "num accts = %ld\n",
               start_account,end_account,ototal_account_count);
```

```
            printf("custs = %ld seg size = %ld num segs = %ld "
                   "mod = %ld dist = %ld\n",
                   ototal_cust_count,osegment_size,number_of_segments,
                   segment_mod,distributer);
        }
        else
        {
            error = TRUE;
            error_handler("get_distribution",UNKNOWN,
                          "Number of segments cannot be zero.");
            return(error);
        }

EXEC SQL DECLARE segments CURSOR FOR
            SELECT NVL(PARENT_ACCT,ACCOUNT_NR)
              FROM CUST_INFO
             WHERE MARKET = :omarket
               AND (NVL(PARENT_ACCT,ACCOUNT_NR)
                    between :ostart_account AND :oend_account)
          ORDER BY NVL(PARENT_ACCT,ACCOUNT_NR)ASC;

EXEC SQL OPEN segments;

if(sqlca.sqlcode != NOT_SQL_ERROR)
        {
            error_handler("get_distribution",UNKNOWN,sqlca.sqlerrm.sqlerrmc);
        } while((sqlca.sqlcode == NOT_SQL_ERROR) && (!error))
        {

/* distribute extra accounts if more left in overflow (segment mod) and
   distributer indicates some segments get an extra account. */ if((distributer != 0) && (segment_mod > 0) &&
               ((segment_count % distributer) == 0))
            {
                /* add an extra account to segment size */
                dist_adjust = 1;

/* adjust so when extra accounts are depleted, no more extra segment
               space will be allocated */ segment_mod--;
            }
            else dist_adjust = 0;

/* Fetch another segment */
            while((sqlca.sqlcode == NOT_SQL_ERROR) &&
                  (index < (osegment_size + dist_adjust)) &&
                  (!error))
            {
                EXEC SQL FETCH segments INTO :oacct_nr;
                if((sqlca.sqlcode != NOT_SQL_ERROR) &&
                   (sqlca.sqlcode != SQL_NOT_FOUND))
                {
                    segment_start = (struct segment_struct *)NULL;
                    error_handler("get_distribution",UNKNOWN,
                                  sqlca.sqlerrm.sqlerrmc);
                    error = TRUE;
                }/* error */
                else if(sqlca.sqlcode != SQL_NOT_FOUND)
                {
                    /* Fetch at end throws off customer count */
                    index++;
```

```
            if(first)
            {
                first = FALSE;
                memcpy(segment_start_acct,oacct_nr,10);
            }

/* Just logging a count of accounts vs customers (actual)*/
            if(memcmp(oacct_nr,last_acct_nr,sizeof(oacct_nr)) != 0)
            {
                indexa++;
                memcpy(last_acct_nr,oacct_nr,sizeof(oacct_nr));
            }
            if((indexa == 0) &&
                (memcmp(oacct_nr,last_acct_nr,sizeof(oacct_nr))) == 0)
            {
                indexa_adj++;
            }
        }/* no error fetching next customer */
    }/* While not segment limit */

/* allocate a list element (0th counts here) */
    if((segment_count < number_of_segments) &&
        ((sqlca.sqlcode == SQL_NOT_FOUND) ||
         (sqlca.sqlcode == NOT_SQL_ERROR)))
    {
        if ((segment_cur = (struct segment_struct *)
            malloc((unsigned int)sizeof(struct segment_struct)))
            != (struct segment_struct *)NULL)
        {
            segment_count++;

/* Load the segment element */
            sprintf(segment_cur->rpt_file,"%3.3s_%d",
                omarket.arr,segment_count);
            if(osegment_size > 1)
                memcpy(segment_cur->begin_acct,
                    segment_start_acct,sizeof(oacct_nr));
            else
                memcpy(segment_cur->begin_acct,oacct_nr,
                    sizeof(oacct_nr));
            segment_cur->begin_acct[10] = '\0';
            memcpy(segment_cur->end_acct,oacct_nr,sizeof(oacct_nr));
            segment_cur->end_acct[10] = '\0';
            sprintf(segment_cur->stdout_file,"%3.3s_%d",
                omarket.arr,segment_count);
            segment_cur->segment_number = segment_count;
            segment_cur->process_id = 0;
            segment_cur->processor = 0;
            segment_cur->running = 0;
            segment_cur->row_num = 0;
/* adjust customer count to reflect aggregates that went to previous segment */
            segment_cur->csize = index - indexa_adj;
/* account count in this segment */
            segment_cur->asize = indexa;
            segment_cur->count = 0;
            segment_cur->complete = 0;
            segment_cur->link = (struct segment_struct *)NULL;

/* if this is the first element then mark it as the head of the list */
            if (segment_start == (struct segment_struct *)NULL)
            {
                segment_start = segment_end = segment_cur;
            } /* if start of list */
            else
            {
```

```c
/* adjust customer count in previous segment to reflect its aggr overflows */
                    segment_end->csize -= indexa_adj;
                    tot_cust_chk += segment_end->csize;
                    segment_end->link = segment_cur;
                    segment_end = segment_cur;
                } /* else not start of list */

/* Increment end account to use as start of next segment */
                sprintf(segment_start_npa,"%3.3s",segment_end->end_acct);
                sprintf(segment_start_str,"%7.7s",
                        &segment_end->end_acct[3]);
                segment_start_num = atol(segment_start_str);
                segment_start_num++;
                sprintf(segment_start_acct,"%3.3s%07ld",
                        segment_start_npa,
                        segment_start_num);

} /* if allocate list element */
            else
            {
                segment_start = (struct segment_struct *)NULL;
                error_handler("get_distribution",UNKNOWN,
                              "memory allocation");
                error = TRUE;
            } /* else malloc error */
        }/* If fetch */
        else if((segment_count >= number_of_segments) &&
                (sqlca.sqlcode != SQL_NOT_FOUND))
        {
            if(memcmp(oacct_nr,last_acct_nr,sizeof(oacct_nr)) != 0)
            {
                sprintf(tmp_err_buf,
                        "Out of segments and account %10.10s left.",
                        oacct_nr);
                segment_start = (struct segment_struct *)NULL;
                error_handler("get_distribution",UNKNOWN,tmp_err_buf);
                error = TRUE;
            }
            else
            {
                segment_end->csize++;
                while((sqlca.sqlcode != SQL_NOT_FOUND))
                {
                    if(memcmp(oacct_nr,last_acct_nr,sizeof(oacct_nr)) != 0)
                    {
                        sprintf(tmp_err_buf,
                                "Out of segments and account "
                                "%10.10s left.",oacct_nr);
                        segment_start = (struct segment_struct *)NULL;
                        error_handler("get_distribution",UNKNOWN,
                                      tmp_err_buf);
                        error = TRUE;
                    }
                    segment_end->csize++;
                    EXEC SQL FETCH segments INTO :oacct_nr;
                }
            }
        }/* error if out of segments and more accounts left */

/* reset index for next goround */
        index = 0;
        indexa = 0;
        indexa_adj = 0;

}/* While more segments */
```

```
memcpy(segment_end->end_acct,end_account,10);

if(sqlca.sqlcode != SQL_NOT_FOUND)
{
    segment_start = (struct segment_struct *)NULL;
    error_handler("get_distribution",UNKNOWN,sqlca.sqlerrm.sqlerrmc);
    error = TRUE;
}/* Report error */

EXEC SQL CLOSE segments;
/* get last segments' customer allotment */
tot_cust_chk += segment_end->csize;

printf("%ld TOTAL IN SEGMENTS = %ld in db = %ld\n",
       segment_count,tot_cust_chk,ototal_cust_count);
}
else
{
    if((fp = fopen("LOAD_BALANCE","r")) == NULL)
    {
        segment_start = (struct segment_struct *)NULL;
        error_handler("get_distribution",UNKNOWN,
                      "Can't open LOAD_BALANCE file for "
                      "segmenting information");
        error = TRUE;
    }
    else for(segment_count = 1;
             segment_count <= number_of_segments;
             segment_count++)
    {
        /* Load X number of segments (error if proper number not found) */
        if(fgets(line,80,fp) != (char)NULL)
        {
            if ((segment_cur = (struct segment_struct *)
                malloc((unsigned int)sizeof(struct segment_struct)))
                != (struct segment_struct *)NULL)
            {
                printf("STATIC_LOAD MALLOC\n");

/* Load the segment element */
                sprintf(segment_cur->rpt_file,"%s_%d",market,
                        segment_count);
                memcpy(segment_cur->begin_acct,line,10);
                segment_cur->begin_acct[10] = '\0';
                memcpy(segment_cur->end_acct,&line[11],10);
                segment_cur->end_acct[10] = '\0';
                sprintf(segment_cur->stdout_file,"%s_%d",
                        market,segment_count);
                segment_cur->segment_number = segment_count;
                segment_cur->process_id = 0;
                segment_cur->processor = 0;
                segment_cur->running = 0;
                segment_cur->row_num = 0;
                segment_cur->csize = 0;
                segment_cur->asize = 0;
                segment_cur->count = 0;
                segment_cur->complete = 0;
                segment_cur->link = (struct segment_struct *)NULL;

/* if this is the first element then mark it as the head of the list */
                if (segment_start == (struct segment_struct *)NULL)
                {
                    segment_start = segment_end = segment_cur;
                } /* if start of list */
                else
```

```
            {
               segment_end->link = segment_cur;
               segment_end = segment_cur;
            } /* else not start of list */

} /* if allocate list element */
         else
         {
            segment_start = (struct segment_struct *)NULL;
            error_handler("get_distribution",UNKNOWN,
                      "memory allocation");
            error = TRUE;
         } /* else malloc error */
      }/* If get segment line */
      else
      {
         segment_start = (struct segment_struct *)NULL;
         sprintf(line,"Can't get segment range entry %d of %d",
               segment_count,number_of_segments);
         error_handler("get_distribution",UNKNOWN,line);
         error = TRUE;
      }
   }/* for x segments */
}

/* Place starting address of segment list in caller's pointer */
*segment_list = segment_start;

return(error);
}/* End of get distribution */
```

```
#include "stddevlp.h"
#include "bill_global.h"
#include "vg_error.h"
#include "par_man_proto.h"

EXEC SQL BEGIN DECLARE SECTION;
EXEC SQL END DECLARE SECTION;
EXEC SQL INCLUDE SQLCA.H;

BOOLEAN get_executable(char *path, char *name)
{
    EXEC SQL BEGIN DECLARE SECTION;
    VARCHAR opath[50];
    VARCHAR oname[20];
    EXEC SQL END DECLARE SECTION;

BOOLEAN error = FALSE;

EXEC SQL
        SELECT EXECUTABLE_PATH, EXECUTABLE_NAME
            INTO :opath, :oname
          FROM BILLING_PARAMETERS
         WHERE ROWNUM = 1;

if (sqlca.sqlcode != NOT_SQL_ERROR)
    {
        error = TRUE;
        error_handler("get_executable.pc", ORACLESELECT,
                    "selecting executable info");
    } vget(path, &opath);
    vget(name, &oname);

return error;
}
```

```c
#include <stdlib.h>
#include <stdio.h>
#include <string.h>
#include <osfcn.h>
#include <fcntl.h>
#include <sgtty.h>
#include <sys/resource.h>
#include <sys/signal.h>
#include <sys/stat.h>
#ifdef _SEQUENT_
#include <sys/tmp_ctl.h>
endif
#include <sys/types.h>
#include <sys/ipc.h>
#include <sys/shm.h>
#include <sys/wait.h>
#include <sys/vmsystm.h>
#include <sys/types.h>
#include <unistd.h>
#include <errno.h>
#include <signal.h>
#include "time.h"
#include "bill_global.h"
#undef BOOLEAN
#include "stddevlp.h"
#include "vg_error.h"
#include "bparallel.h"

/* TEMP DEBUG */
char *a;
char *b;

struct mark_struct
{
    char   remark[81];
    long   seconds;
    long   useconds;
};

#ifdef _SEQUENT_
extern "C" {
    char *shmat(int, void*, int);
    int shmget(key_t, int, int);
} union {
    struct vm_tune *vmtune;
    unsigned long *procrss;
    bool_t onoff;
}argp;
endif struct par_perf_struct par_per;
struct seg_perf_struct seg_per;

void shmark_time(int remark_nr,mark_struct *time_array,int mark_number);
void fork_segment(segment_struct *segment,
                  char arg_list[ARG_COUNT][MAX_ARG_SIZE],
                  char *shmaddress,char *executable);

int main(int argc,char **argv)
{
    struct segment_struct *segment_list_start=(struct segment_struct *)NULL;
    struct segment_struct *segment_list=(struct segment_struct *)NULL;
    int error=0,finished=0;
    int affinity_err_adj=0,cpu_num=0,set_p=0,number_of_cpus=0;
```

```c
    int process_status=0,accounted_for=0,found=0,wait_count=0;
    int previous_processor=0,index=0;
    char market[4];
    long number_of_segments=0;
    long number_of_processes=0;
    char arg_list[ARG_COUNT][MAX_ARG_SIZE];
    char tmparg1[3];
    char oracle_login[40];
    char bill_date[11];
    char commit_flag[2];
    char overide_flag[2];
    char dynamic_load[2];
    BOOLEAN reports_flag;
    char tmp_err_str[80];
#ifdef _SEQUENT_
    int process_group=0;
#else
    pid_t process_group=0;
#endif
    char tmpindex_err_str[80];
    char start_account[11];
    char end_account[11];
    char billing_path[51];
    char billing_name[21];
    char full_billing_name[71];

/* Shared memory vars */
    BOOLEAN shared=0;
    key_t shbill_key=SHARED_MEM_KEY;
    int   shbill_id;
    int shmflg=1;
    char *shmaddress;
    char *shmaddress_s;

struct mark_struct mark_time_arr[80];

pid_t current_pid=0;

sprintf(mark_time_arr[0].remark,"OVERALL ");
    mark_time_arr[0].useconds = 0L;
    mark_time_arr[0].seconds = 0L;

sprintf(mark_time_arr[1].remark,"LOAD BALANCE ");
    mark_time_arr[1].useconds = 0L;
    mark_time_arr[1].seconds = 0L;

sprintf(mark_time_arr[2].remark,"REPORT GENERATION ");
    mark_time_arr[2].useconds = 0L;
    mark_time_arr[2].seconds = 0L;

sprintf(mark_time_arr[3].remark,"THREAD FILE MERGE ");
    mark_time_arr[3].useconds = 0L;
    mark_time_arr[3].seconds = 0L;

setbuf(stdout,NULL);

/* Set process group so parallel manager (this program) is part of it. */
    if((process_group = setpgrp()) == -1)
    {
        sprintf(tmp_err_str,
            "FATL: Unable to obtain process group id for this bill run");
        error_handler("par_bill.pc",UNKNOWN,tmpindex_err_str);
    }
    /* Validate command line arguments */
    if(argc != 11)
    {
```

```
        fprintf(stderr,
               "Usage: par_bill market bill_date oracle_login "
               "commit_flag(0,1) overide_flag(0,1) "
               "dynamic_load_flag(0,1) reports_flag(0,1) "
               "[segments] start end\n");
        _exit(0);
    }
    else
    {
        shmark_time(0,mark_time_arr,1);
        sprintf(market,"%s",argv[1]);
        sprintf(bill_date,"%s",argv[2]);
        sprintf(oracle_login,"%s",argv[3]);
        sprintf(commit_flag,"%s",argv[4]);
        sprintf(overide_flag,"%s",argv[5]);
        sprintf(dynamic_load,"%s",argv[6]);
        reports_flag = atoi(argv[7]);

number_of_cpus = get_cpus();
printf("Number of cpus = %d\n",number_of_cpus);

/* Allow user to assign segment list or set via available cpus */
        if((argc >= 9) && (argc != 10))
        {
            number_of_segments = atol(argv[8]);
        }
        else
        {
            number_of_segments = (number_of_cpus - 1);
        } if(argc == 11)
        {
            printf("ARGS start = %10.10s end = %10.10s\n",argv[9],argv[10]);
            sprintf(start_account,"%s",argv[9]);
            sprintf(end_account,"%s",argv[10]);
        }
        else
        {
            sprintf(tmp_err_str,
                    "This batch will bill every account for market %s",market);
            error_handler("par_bill.pc",UNKNOWN,tmp_err_str);
            strcpy(start_account,"0000000000");
            strcpy(end_account,"9999999999");
        } number_of_processes = number_of_segments;

}/* load command line arguments. */ if ((oracleLogin(oracle_login,NULL)) != -1)
    {
        /* Allocate shared memory block for manager and threads */
        /* if not existing */
        while((!shared) && (!error))
        {
```

```
            /* Allocate shared memory sufficient for parallel bill run */
            shbill_id = shmget(shbill_key,
                            (int)(sizeof(struct par_perf_struct) +
                                ((60)*(sizeof(struct seg_perf_struct)))),
                            (0666 | IPC_CREAT));

if(shbill_id == -1)
            {
                error = TRUE;
                sprintf(tmp_err_str,
                        "Shared memory allocation for %d: attempt failed.",
                        shbill_key);
                error_handler("par_bill.pc",UNKNOWN,tmp_err_str);
                exit(0);
            }/* Get new key if in use */
            else
            {
                shared = 1;
#ifdef _SEQUENT_
                shmaddress = shmat(shbill_id,0,0);
#else
                shmaddress = (char *)shmat(shbill_id,0,0);
#endif
                if((int)shmaddress == -1)
                {
                    error = TRUE;
                    sprintf(tmp_err_str,
                            "shmat() had error attaching %d to data segment.",
                            shbill_id);
                    error_handler("par_bill.pc",UNKNOWN,tmp_err_str);
                    exit(0);
                }
                else
                {
                    par_per.segments = number_of_segments;
                    par_per.status = 1;
                    par_per.load_bal_time = 0;
                    par_per.rpt_build_time = 0;
                    par_per.rpt_merge_time = 0;
                    memcpy(shmaddress,&par_per,sizeof(struct par_perf_struct));
                }

}/* allocate shared memory ok */
        }/* Allocate shared memory for inter process communication */ if (error = get_executable(billing_path,billing_name))
        {
            error_handler("par_bill.c",UNKNOWN,
                        "Unable to find billing executable name");
            exit(0);
        }
        else
        {
            sprintf(full_billing_name,"%s/%s",billing_path,billing_name);
        } printf("market = %3.3s nos = %ld nop = %ld error before distribution = %d\n",
    market,number_of_segments,number_of_processes,error);
printf("start = %10.10s end = %10.10s\n",
    start_account,end_account);

seg_per.seg_bills = 0;
    seg_per.seg_accts = 0;
    seg_per.segment_number = 0;
    seg_per.process_id = 0;
```

-13-

```
        seg_per.processor = 0;
        seg_per.running = 0;
        seg_per.complete = 0;
        seg_per.slow_time = 0;
        seg_per.fast_time = 0;
        seg_per.last_acct_time = 0;
        seg_per.last_cust_time = 0;
        seg_per.elapsed_time = 0;
        seg_per.total_time = 0;
        seg_per.bill_count = 0;
        seg_per.acct_count = 0;
        memcpy(seg_per.last_account,"XXXXXXXXXX",10);
        memcpy(seg_per.last_cust,"XXXXXXXXXX",10);

for(index = 1;index <= number_of_segments;index++)
        {
            shmaddress_s = (shmaddress + (sizeof(struct par_perf_struct) +
                                         ((index - 1) *
                                         sizeof(struct seg_perf_struct))));
            memcpy(shmaddress_s,&seg_per,sizeof(struct seg_perf_struct));

}/* Initialize shared memory for each threagment. */

/* Get load distribution (processing segments) */
        shmark_time(1,mark_time_arr,1);
        error = get_distribution(&segment_list,
                                 market,
                                 number_of_segments,
                                 dynamic_load,
                                 start_account,
                                 end_account);
        shmark_time(1,mark_time_arr,2);
        par_per.status = 2;
        memcpy(shmaddress,&par_per,sizeof(struct par_perf_struct));

segment_list_start = segment_list;
printf("error after distribution = %d\n",error);

/* Don't need database anymore. */
        oracleLogout();

while(segment_list != (struct segment_struct *)NULL)
        {
            printf("%s ",market);
            printf("%s ",segment_list->rpt_file);
            printf("%s ",oracle_login);
            printf("%s ",commit_flag);
            printf("%s ",overide_flag);
            printf("%s ",dynamic_load);
            printf("%s ",bill_date);
            printf("%s ",segment_list->begin_acct);
            printf("%s ",segment_list->end_acct);
            printf("%s ",segment_list->stdout_file);
            printf("%d ",segment_list->segment_number);
            printf("%d ",segment_list->process_id);
            printf("%d ",segment_list->processor);
            printf("%d ",segment_list->running);
            printf("%d ",segment_list->complete);
            printf("%ld ",segment_list->csize);
            printf("%ld\n",segment_list->asize);

seg_per.seg_bills = segment_list->csize;
            seg_per.seg_accts = segment_list->asize;
            shmaddress_s =
                (shmaddress + (sizeof(struct par_perf_struct) +
```

-14-

```c
                        (((segment_list->segment_number - 1) *
                         sizeof(struct seg_perf_struct))));
        memcpy(shmaddress_s,&seg_per,sizeof(struct seg_perf_struct));

segment_list = segment_list->link;

}/* traverse */ segment_list = segment_list_start;

/* Fork X segments of the bill run and maintain that number
     * until entire segment list is completed.
     */

/* Set up non segment-specific argument list execution */
        sprintf(arg_list[0],"%s",billing_name);
        sprintf(arg_list[1],"%s",market);
        sprintf(arg_list[3],"%s",oracle_login);
        sprintf(arg_list[4],"%s",bill_date);
        sprintf(arg_list[5],"%s",commit_flag);
        sprintf(arg_list[6],"%s",override_flag);
        if(number_of_segments == 1)
            sprintf(arg_list[7],"S");
        else
            sprintf(arg_list[7],"P");
        sprintf(arg_list[12],"%s","");

for(index = 1;index <= number_of_processes;index++)
    {
        /* create child process */
        fork_segment(segment_list,arg_list,shmaddress,
                     full_billing_name);

/* if successful fork, handle next segment in list */
        if(segment_list != (segment_struct *)NULL)
        {
            segment_list = segment_list->link;
        }
        else if(index != number_of_processes)
        {
            sprintf(tmp_err_str,
                    "WARN: Exhausted segment list at %d before "
                    "reaching last (%dth) segment.",
                    index,number_of_processes);
            error_handler("par_bill.pc",UNKNOWN,tmp_err_str);
        }/* Make sure finished when list is exhausted. */ printf("FORK\n");

}/* end for x segments */ segment_list = segment_list_start;
    while(segment_list != (struct segment_struct *)NULL)
    {
        /* Put process ID into shared memory for this segment */
        shmaddress_s = (shmaddress + (sizeof(struct par_perf_struct) +
                                     ((index - 1) *
                                      sizeof(struct seg_perf_struct))));
        memcpy(&seg_per,shmaddress_s,sizeof(struct seg_perf_struct));
        seg_per.process_id = segment_list->process_id;
        printf("SHARED MEM PROCESS ID %d %%d\n",seg_per.process_id,
               seg_per.segment_number);
        memcpy(shmaddress_s,&seg_per,(sizeof(struct seg_perf_struct)));
```

-15-

```
            segment_list = segment_list->link;
        }/* traverse */ while(!finished)
        {
            /* Monitor pids and fork as needed until segment_list exhausted */
            current_pid = waitpid(0,&process_status,0);
            if((current_pid != 0) && (current_pid != -1))
            {
                printf("good process_status = %d\n",process_status);

/* Find segment and processor number of this process */
                /* for reporting. */
                segment_list = segment_list_start;
                found=0;
                index=0;
                while((segment_list != (struct segment_struct *)NULL) &&
                      (!found))
                { if(segment_list->process_id == current_pid)
                    {
                        index = segment_list->segment_number;
                        previous_processor = segment_list->processor;
                        found=1;
                    }
                    else segment_list = segment_list->link;
                }/* while looking for segment that matches this pid */ if(WIFEXITED(process_status) != 0)
                {
                    printf("DETECTED NORMAL\n");
                    if(WEXITSTATUS(process_status) == 0)
                    {
                        printf("DETECTED NO ERROR\n");
/* If exit was ok, then fork another segment while more is left, accounting
 * for segment just completed in the segment list.
 */
                        segment_list = segment_list_start;
                        accounted_for = 0;
                        while((!accounted_for) &&
                              (segment_list != (segment_struct *)NULL))
                        {
                            /* Mark segment as completed */
                            if(current_pid == segment_list->process_id)
                            {
                                segment_list->complete = accounted_for = 1;
                                segment_list->running = 0;
                            }
                            else segment_list = segment_list->link;
                        } /* Account for segment just completed */ if(!accounted_for)
                        {
                            sprintf(tmp_err_str,
                                    "WARN: Process %d running segment ? "
                                    "is unaccounted for.",
                                    current_pid);
                            error_handler("par_bill.pc",UNKNOWN,tmp_err_str);
                        }

/* Find next segment to be executed */
                        found=0;
                        segment_list = segment_list_start;
                        while ((segment_list !=
                                (struct segment_struct *)NULL) &&
```

```
                    (!found))
        {
            if((segment_list->running == 0) &&
               (segment_list->complete == 0))
            {
                /* Fork another segment to replace completed one. */
                fork_segment(segment_list,arg_list,shmaddress,
                             full_billing_name);

sprintf(tmpargl,"pid created: %d",
                        segment_list->process_id);
                printf("tmpargl = %s\n",tmpargl);
                found = 1;
            }/* Fork a new segment */
            else segment_list = segment_list->link;
        }/* While looking for next segment to execute */ if(!found)
        {
            finished = 1;
        } /* All segments are or were running. */
        /* Run manager is finished. */
    }/* If _exit(0) */
    else
    {
        printf("DETECTED ERROR\n");
/*
 * If exited due to error, kill all other segments, report error, and die.
 */
        sprintf(tmp_err_str,
                "FATL: Process %d running segment %d "
                "terminated with error.",
                current_pid,index);
        error_handler("par_bill.pc",UNKNOWN,tmp_err_str);
        par_per.status = -1;
        memcpy(shmaddress,
               &par_per,sizeof(struct par_perf_struct));
        seg_per.running = 0;
        shmaddress_s = (shmaddress +
                        (sizeof(struct par_perf_struct) +
                         ((segment_list->segment_number - 1) *
                          sizeof(struct seg_perf_struct))));
        memcpy(shmaddress_s,&seg_per,
               sizeof(struct seg_perf_struct));
        kill(0,SIGKILL);
    }/* _exit(1) */
}/* process terminated normally */
else if(WIFSIGNALED(process_status) != 0)
{
    printf("DETECTED KILL\n");
    /* Report that process was killed and kill */
    /* all others before exiting. */
    sprintf(tmp_err_str,
            "FATL: Process %d running segment %d was "
            "killed by signal %d",
            current_pid,index,WTERMSIG(process_status));
    error_handler("par_bill.pc",UNKNOWN,tmp_err_str);
    par_per.status = -1;
    memcpy(shmaddress,&par_per,sizeof(struct par_perf_struct));
    seg_per.running = 0;
    shmaddress_s = (shmaddress +
                    (sizeof(struct par_perf_struct) +
                     ((segment_list->segment_number - 1) *
                      sizeof(struct seg_perf_struct))));
    memcpy(shmaddress_s,&seg_per,
           sizeof(struct seg_perf_struct));
```

```
                    kill(0,SIGKILL);
                }/* Killed by signal */
#ifdef _SEQUENT_
                else if(WIFCORESIG(process_status) != 0)
#else
                else if(WCOREDUMP(process_status) != 0)
#endif
                {
                    printf("DETECTED CORE\n");
                    sprintf(tmp_err_str,
                            "FATL: Process %d running segment %d was "
                            "killed by signal %d causing core dump.",
                            current_pid,index,WTERMSIG(process_status));
                    error_handler("par_bill.pc",UNKNOWN,tmp_err_str);
                    par_per.status = -1;
                    memcpy(shmaddress,&par_per,sizeof(struct par_perf_struct));
                    seg_per.running = 0;
                    shmaddress_s = (shmaddress +
                                    (sizeof(struct par_perf_struct) +
                                    ((segment_list->segment_number - 1) *
                                    sizeof(struct seg_perf_struct))));
                    memcpy(shmaddress_s,&seg_per,
                            sizeof(struct seg_perf_struct));
                    kill(0,SIGKILL);
                }/* Core dump */
                else if(WSTOPSIG(process_status) != 0)
                {
                    printf("DETECTED STOP\n");
                    sprintf(tmp_err_str,
                            "FATL: Process %d running segment %d was "
                            "stopped by signal %d.",
                            current_pid,index,WTERMSIG(process_status));
                    error_handler("par_bill.pc",UNKNOWN,tmp_err_str);
                    par_per.status = -1;
                    memcpy(shmaddress,&par_per,sizeof(struct par_perf_struct));
                    seg_per.running = 0;
                    shmaddress_s = (shmaddress +
                                    (sizeof(struct par_perf_struct) +
                                    ((segment_list->segment_number - 1) *
                                    sizeof(struct seg_perf_struct))));
                    memcpy(shmaddress_s,&seg_per,
                            sizeof(struct seg_perf_struct));
                    kill(0,SIGKILL);
                }/* Stop signal */
                else
                {
                    printf("DETECTED UNKNOWN CONDITION\n");
                    sprintf(tmp_err_str,
                            "WARN: Process %d running segment %d "
                            "affected by signal %d.",
                            current_pid,index,WTERMSIG(process_status));
                    error_handler("par_bill.pc",UNKNOWN,tmp_err_str);
                    par_per.status = -1;
                    memcpy(shmaddress,&par_per,sizeof(struct par_perf_struct));
                    seg_per.running = 0;
                    shmaddress_s = (shmaddress +
                                    (sizeof(struct par_perf_struct) +
                                    ((segment_list->segment_number - 1) *
                                    sizeof(struct seg_perf_struct))));
                    memcpy(shmaddress_s,&seg_per,
                            sizeof(struct seg_perf_struct));
                    kill(0,SIGKILL);
                }/* Unknown signal */
                wait_count = 0;
            }
            else
```

```c
{
    if(current_pid == -1)
    {
        printf("process_status = %d\n",process_status);
        sprintf(tmp_err_str,
                "WARN: monitor1: wait pid is finished. "
                "Parallel monitor1 is terminating.");
        error_handler("par_bill.pc",UNKNOWN,tmp_err_str);
        finished = 1;
    }/* wait pid error dump */
    else
    {
        printf("process_status = %d\n",process_status);
        wait_count++;
        sprintf(tmp_err_str,
                "WARN: monitor1: No status was returned.");
        error_handler("par_bill.pc",UNKNOWN,tmp_err_str);

sleep(5);
        if(wait_count == MAX_WAIT) finished = 1;
    }/* wait pid error dump */
}/* Problems with wait pid */
} /* maintain X processes until all segments are completed */
printf("FINISHED MONITOR.\n");

finished = 0;
while(!finished)
{
    /* Monitor pids until all have completed without errors.*/
    /* removed no hang up WNOHANG so it should wait till */
    /* something happens */
    current_pid = waitpid(0,&process_status,0);
    if((current_pid != 0) && (current_pid != -1))
    {
        printf("good process_status = %d\n",process_status);
        if(WIFEXITED(process_status) != 0)
        {
            printf("DETECTED NORMAL\n");
            if(WEXITSTATUS(process_status) != 0)
            {
                printf("DETECTED ERROR\n");
/*
 * If exited due to error, kill all other segments, report error, and die.
 */
                sprintf(tmp_err_str,
                        "FATL: Process %d running segment %d "
                        "terminated with error.",
                        current_pid,index);
                error_handler("par_bill.pc",UNKNOWN,tmp_err_str);
                par_per.status = -1;
                memcpy(shmaddress,&par_per,
                       sizeof(struct par_perf_struct));
                seg_per.running = 0;
                shmaddress_s = (shmaddress +
                               (sizeof(struct par_perf_struct) +
                                ((segment_list->segment_number - 1) *
                                 sizeof(struct seg_perf_struct))));
                memcpy(shmaddress_s,&seg_per,
                       sizeof(struct seg_perf_struct));
                kill(0,SIGKILL);
            }/* _exit(1) */
        }/* process terminated normally */
        else if(WIFSIGNALED(process_status) != 0)
        {
            printf("DETECTED KILL\n");
            /* Report that process was killed and kill all */
```

-19-

```
                    /* others before exiting. */
                    sprintf(tmp_err_str,
                            "FATL: Process %d running segment %d was killed "
                            "by signal %d",
                            current_pid.index,WTERMSIG(process_status));
                    error_handler("par_bill.pc",UNKNOWN,tmp_err_str);
                    par_per.status = -1;
                    memcpy(shmaddress,&par_per,sizeof(struct par_perf_struct));
                    seg_per.running = 0;
                    shmaddress_s = (shmaddress +
                                (sizeof(struct par_perf_struct) +
                                ((segment_list->segment_number - 1) *
                                sizeof(struct seg_perf_struct))));
                    memcpy(shmaddress_s,&seg_per,
                            sizeof(struct seg_perf_struct));
                    kill(0,SIGKILL);
                }/* Killed by signal */
#ifdef _SEQUENT_
                else if(WIFCORESIG(process_status) != 0)
#else
                else if(WCOREDUMP(process_status) != 0)
#endif
                {
                    printf("DETECTED CORE\n");
                    sprintf(tmp_err_str,
                            "FATL: Process %d running segment %d was "
                            "killed by signal %d causing core dump.",
                            current_pid.index,WTERMSIG(process_status));
                    error_handler("par_bill.pc",UNKNOWN,tmp_err_str);
                    par_per.status = -1;
                    memcpy(shmaddress,&par_per,sizeof(struct par_perf_struct));
                    seg_per.running = 0;
                    shmaddress_s = (shmaddress +
                                (sizeof(struct par_perf_struct) +
                                ((segment_list->segment_number - 1) *
                                sizeof(struct seg_perf_struct))));
                    memcpy(shmaddress_s,&seg_per,
                            sizeof(struct seg_perf_struct));
                    kill(0,SIGKILL);
                }/* Core dump */
                else if(WSTOPSIG(process_status) != 0)
                {
                    printf("DETECTED STOP\n");
                    sprintf(tmp_err_str,
                            "FATL: Process %d running segment %d was "
                            "stopped by signal %d.",
                            current_pid.index,WTERMSIG(process_status));
                    error_handler("par_bill.pc",UNKNOWN,tmp_err_str);
                    par_per.status = -1;
                    memcpy(shmaddress,&par_per,sizeof(struct par_perf_struct));
                    seg_per.running = 0;
                    shmaddress_s = (shmaddress +
                                (sizeof(struct par_perf_struct) +
                                ((segment_list->segment_number - 1) *
                                sizeof(struct seg_perf_struct))));
                    memcpy(shmaddress_s,&seg_per,
                            sizeof(struct seg_perf_struct));
                    kill(0,SIGKILL);
                }/* Stop signal */
                wait_count = 0;
            }
            else
            {
                if(current_pid == -1)
                {
                    printf("process_status = %d\n",process_status);
```

```c
            sprintf(tmp_err_str,
                    "WARN: monitor2: wait pid is finished. "
                    "Parallel manager is terminating.");
            error_handler("par_bill.pc",UNKNOWN,tmp_err_str);
            finished = 1;
        }/* wait pid error dump */
        else
        {
            printf("process_status = %d\n",process_status);
            wait_count++;
            sprintf(tmp_err_str,
                    "WARN: monitor2: No status was returned.");
            error_handler("par_bill.pc",UNKNOWN,tmp_err_str);

sleep(5);
            if(wait_count == MAX_WAIT) finished = 1;
        }/* wait pid error dump */
    }/* Problems with wait pid */
}/* Monitor without creating replacements */
printf("FINISHED MONITOR 2.\n");

segment_list = segment_list_start;
while(segment_list != (struct segment_struct *)NULL)
{
    printf("%3.3s ",market);
    printf("%s ",segment_list->rpt_file);
    printf("%17.17s ",oracle_login);
    printf("%1.1s:",commit_flag);
    printf("%1.1s:",override_flag);
    printf("%1.1s ",dynamic_load);
    printf("%10.10s ",bill_date);
    printf("%10.10s ",segment_list->begin_acct);
    printf("%10.10s ",segment_list->end_acct);
    printf("%s ",segment_list->stdout_file);
    printf("%d:",segment_list->segment_number);
    printf("%d:",segment_list->process_id);
    printf("%d:",segment_list->processor);
    printf("%d:",segment_list->running);
    printf("%d ",segment_list->complete);
    printf("%ld ",segment_list->csize);
    printf("%ld\n",segment_list->asize);
    segment_list = segment_list->link;
}/* Show state of segment list when parallel manager terminated. */

}/* If not error logging into Oracle */
else
{
    error_handler("par_bill.pc",UNKNOWN,"Can't log in to ORACLE");
    error = TRUE;
    par_per.status = -1;
    memcpy(shmaddress,&par_per,sizeof(struct par_perf_struct));
}/* If oracle error logging in*/

/* free segment list memory */
segment_struct *segment_tmp = segment_list = segment_list_start;
while (segment_list)
{
    segment_list = segment_list->link;
    free(segment_tmp);
    segment_tmp = segment_list;
} if ((oracleLogin(oracle_login,NULL)) != -1)
{
    if((!error) && (reports_flag) && (number_of_segments > 1))
    {
```

```
            shmark_time(2,mark_time_arr,1);
            par_per.status = 3;
            memcpy(shmaddress,&par_per,sizeof(struct par_perf_struct));
            error = prt_bill_rpts(market,bill_date,number_of_segments);
            shmark_time(2,mark_time_arr,2);
            memcpy(shmaddress,&par_per,sizeof(struct par_perf_struct));

/* Merge utility not installed */
            shmark_time(3,mark_time_arr,1);
            par_per.status = 4;
            memcpy(shmaddress,&par_per,sizeof(struct par_perf_struct));
            /* error = merge_bill_rpts() */
            shmark_time(3,mark_time_arr,2);
            memcpy(shmaddress,&par_per,sizeof(struct par_perf_struct));

}/* generate reports if selected */
    }/* If not error logging into Oracle */
    else
    {
        error_handler("par_bill.pc",UNKNOWN,
                      "Can't log in to ORACLE for reporting");
        error = TRUE;
    }/* If oracle error logging in*/ if(error)
    {
        error_handler("par_bill.pc",UNKNOWN,"prt_bill_rpts returned error");
        par_per.status = -1;
        memcpy(shmaddress,&par_per,sizeof(struct par_perf_struct));
    }/* generate reports */
    else
    {
        par_per.status = 0;
        memcpy(shmaddress,&par_per,sizeof(struct par_perf_struct));
    }

/* Don't need database anymore. */
    oracleLogout();

shmark_time(0,mark_time_arr,2);

return 0;
}/* test main */ void fork_segment(segment_struct *segment,
                  char arg_list[ARG_COUNT][MAX_ARG_SIZE],
                  char *shmaddress,char *executable)
{
    char tmp_err_str[80];
    char *shmaddress_s;

/* Set up segment specific arguments execution */
    sprintf(arg_list[2],"%s",segment->rpt_file);
    sprintf(arg_list[8],"%d",segment->segment_number);
    sprintf(arg_list[9],"%s",segment->begin_acct);
    sprintf(arg_list[10],"%s",segment->end_acct);
    sprintf(arg_list[11],"%s",segment->stdout_file);
```

```
/* flush before fork to avoid stdio file inconsistencies */
fflush(stdout);

if((segment->process_id = vfork()) == 0)
{
    /* Set stdout descriptor to close on successful exec only. */
    fcntl(1,F_SETFD,1);
    /* Exec a bill segment */
    if(execl(executable, arg_list[0],
            arg_list[1],
            arg_list[2],
            arg_list[3],
            arg_list[4],
            arg_list[5],
            arg_list[6],
            arg_list[7],
            arg_list[8],
            arg_list[9],
```

-23-

```
                    arg_list[10],
                    arg_list[11],
                    arg_list[12]) == -1)
        {
            sprintf(tmp_err_str,
                    "FATL: Failed to exec segment %d",segment->segment_number);
            error_handler("par_bill.pc",UNKNOWN,tmp_err_str);

par_per.status = -1;
            memcpy(shmaddress,&par_per,sizeof(struct par_perf_struct));
            seg_per.running = 0;
            shmaddress_s = (shmaddress +
                            (sizeof(struct par_perf_struct) +
                            ((segment->segment_number - 1) *
                             sizeof(struct seg_perf_struct))));
            memcpy(shmaddress_s,&seg_per,
                   sizeof(struct seg_perf_struct));
            /* Kill off process group first, then exit */
            kill(0,SIGKILL);
        }
    }
    else if(segment->process_id != 0)
    {
        segment->running = 1;
        printf("process created = %d\n",segment->process_id);
    }/* Parent should log segment as a running segment */
} void shmark_time(int remark_nr, mark_struct *time_array,int mark_number)
{
    int error=0;
    int sequential=0;
    int tmp=0;
    time_t curtime;
    struct tm *loc_time;

/* set the minutes west of Greenwich and timezone treatment */
    if ((curtime = time(0))
    {
        loc_time = localtime(&curtime);
        /* determine the elapsed time since the last mark */
        if (mark_number == 1)
        {
            printf("%s %s",time_array[remark_nr].remark,asctime(loc_time));
        }
        if (mark_number == 2)
        {
            printf("%s - time elapsed since last mark: secs %f\n",
                   time_array[remark_nr].remark,
                   (float)((float)curtime -
                           (float)time_array[remark_nr].seconds));
            if(remark_nr == 1)
            {
                par_per.load_bal_time =
                    curtime - time_array[remark_nr].seconds;
            }
            else if(remark_nr == 2)
            {
                par_per.rpt_build_time =
                    curtime - time_array[remark_nr].seconds;
            }
            else if(remark_nr == 3)
            {
                par_per.rpt_merge_time =
                    curtime - time_array[remark_nr].seconds;
            }
```

```
        }
    time_array[remark_nr].seconds = curtime;  /* ptx conversion */
    }
}
```

```c
#define MAX_PROCS 50
#define MAX_WAIT 100
#define ARG_COUNT 13
#define MAX_ARG_SIZE 30
define SHARED_MEM_KEY 100 include <sys/types.h>
include "par_man_proto.h"

struct segment_struct
  {
  char        market[4];
  char        rpt_file[25];
  char        oracle_login[18];
  char        commit_flag[2];
  char        override_flag[2];
  char        bill_date[11];
  char        begin_acct[11];
  char        end_acct[11];
  char        stdout_file[25];
  long        csize;
  long        asize;
  long        row_num;
  long        count;
  int         segment_number;
#ifdef _SEQUENT_
  int         process_id;
#else
  pid_t                   process_id;
#endif
  int         processor;
  int         running;
  int         complete;
  struct segment_struct  *link;
  };

struct acct_range
  {
  char begin_acct[10];
  char end_acct[10];
  struct acct_range *link;
  };

struct merge_struct
  {
  int         segment_number;
  int         process_id;
  int         processor;
  int         running;
  int         complete;
  struct merge_struct *link;
  };

struct seg_perf_struct
  {
  int         seg_bills;
  int         seg_accts;
  int         segment_number;
#ifdef _SEQUENT_
  int         process_id;
#else
  pid_t       process_id;
#endif
  int         processor;
  int         running;
  int         complete;
```

```
    long         slow_time;
    long         fast_time;
    long         last_acct_time;
    long         last_cust_time;
    long         elapsed_time;
    long         total_time;
    long         bill_count;
    long         acct_count;
    char         last_account[10];
    char         last_cust[10];
    };

struct par_perf_struct
    {
    int          segments;
    int          status;
    long         load_bal_time;
    long         rpt_build_time;
    long         rpt_merge_time;
    };

/* status values definition
= 0 - terminated normally
> 0 - status {1 - load; 2 - bill exec;3 - report build;4 - report merge}
< 0 - abnormal termination signal code
*/
```

```
#include <stdlib.h>
#ifdef _SEQUENT_
#include "parallel/parallel.h"
#include <sys/tmp_ctl.h>
endif
#include "stddevlp.h"

int get_cpus()
{
    /* default cpus for a non-parallel machine */
    int cpu_count=1;

/* Get number of CPUs */
#ifdef _SEQUENT_
    cpu_count = cpus_online();
endif return (cpu_count);
}
```

```
/****************************************************************
 * Name        : error_handler
 *
 * Description : The billing system error handling routine.
 *
 * Parameters  : f_name - the function calling the error routine.
 *               error_code - error message code.
 *               info - additional error information.
 *
 * Return Value : void.
 *
 *
 *
 *
 *
 *
 * Notes       :
 ****************************************************************/
#include <stdio.h>
#include <string.h>
#include <time.h>
#include "bglobal.h"
#include "vg_error.h"

void error_handler(char *f_name,int error_code,char *info)
/* char *f_name - funtion name */
/* int  error_code - error code */
/* char *info - additional information e.g. filename of open file */
{
  FILE    *fp; /* file pointer to error log file */
  char    message[ERR_MESSAGE_LENGTH+1];
  char    *err_log_fn = "vgerr.log";
  time_t  curtime; /* current time in seconds */

/* print any additonal instructions and set the return status */
  switch (error_code)
    {
    case QTEL_DB:
      strcpy(message,"error updating QTEL database");
      break;
    case TAPE_READ:
      strcpy(message,"error reading tape");
      break;
    case FILEOPEN:
      sprintf(message,"can't open file %-s",info);
      break;
    case FILECLOSE:
      sprintf(message,"can't close file %-s",info);
      break;
    case FWRITE:
      sprintf(message,"fwrite error in file %-s",info);
      break;
    case FREAD:
      sprintf(message,"fread error in file %-s",info);
      break;
    case FSEEK:
      sprintf(message,"fseek error in file %-s",info);
      break;
    case ORACLELOG:
      strcpy(message,"can't log on to oracle");
      break;
    case ORACLECREATE:
      sprintf(message,"can't create the table %-s",info);
      break;
    case ORACLEINSERT:
```

```
      sprintf(message,"can't insert %-s",info);
      break;
    case ORACLEDELETE:
      sprintf(message,"can't insert %-s",info);
      break;
    case ORACLESELECT:
      sprintf(message,"can't select %-s",info);
      break;
    case ORACLEUPDATE:
      sprintf(message,"can't update %-s",info);
      break;
    case ORACLENOTFOUND:
      sprintf(message,"table not found %-s",info);
      break;
    case SYS_ERROR:
      sprintf(message,"cannot execute the system call %-s",info);
      break;
    default:
      sprintf(message,"UNKNOWN error %-s",info);

} /* switch error_code */

/* write the error message to the error log file */

/* if the log file does not exist then create it */
/* NOTE: The use of "a+" to append and/or create to append is not in */
/* accordance with the ansi standard and may cause upgrade and/or port */
/* problems. */
if ( (fp = fopen(err_log_fn,"a+")) != NULL)
  {
  if ((curtime = time(0)) != -1)
    { fprintf(fp,"%s error in %s : %s\n",ctime(&curtime),
                                       f_name,message);
    } /* if time of day */
  else
    {
    printf("\nCan't get the time of day value\n");
    } /* else error */ if (fclose(fp))
    {
    printf("\nError handler: can't close the error log file\n");
    printf("%s error in %s : %s\n",ctime(&curtime),
                                       f_name,message);
    } /* if fclose */
  } /* append to existing or open new log file */
else
  {
  printf("\nError handler: can't open the error log file\n");
  printf("%s error in %s : %s\n",ctime(&curtime),
                                       f_name,message);
  } /* can't open error log file */

} /* error_handler */
```

```
#ifndef __PAR_MAN_PROTO_H
define __PAR_MAN_PROTO_H int  get_distribution(struct segment_struct **segment_list,
                      char *market,
                      long number_of_segments,
                      char *dynamic_load,
                      char *start_account,
                      char *end_account);
int get_cpus();

void error_handler(char *f_name,int error_code,char *info);
BOOLEAN prt_bill_rpts(char *mkt,char *billdate,long segment_count);
BOOLEAN get_executable(char *path,char *name);

#endif /* __PAR_MAN_PROTO_H */
```

```
#define PROJECT_MAIN
#define BILL_TEST
#include <stdio.h>
#include <errno.h>
#include <unistd.h>
#include <malloc.h>
#include <stdlib.h>
#include <string.h>
#include "bill_global.h"
#include "bill_struct.h"
#include "comments.h"
#include "stddevlp.h"
#include "vg_error.h"
#include "error.h"    /* REV1 */
#include "error_proto.h"
#ifdef _SEQUENT_
#include <sys/tmp_ctl.h>
endif
#include <sys/types.h>
#include <sys/ipc.h>
#include <sys/shm.h>
#include <time.h>
#include "taxlib.h"
#include "bill_proto.h"
#include "bparallel.h"

char *a;

#ifdef _SEQUENT_
extern "C" char *sbrk(int);
endif struct ora_tab_struct
  {
  char   table_name[81];
  long   seconds;
  long   useconds;
  };

/* These are global for diagnostic development purposes. */
int segment=0;
struct ora_tab_struct oracle_tables[10];

#pragma sequent_expandable(printf(),fprintf(),memcpy(),fwrite())
EXEC SQL BEGIN DECLARE SECTION;
   static VARCHAR     uid[80];  /* user id */
   static char        omarket[3];/* bill date validation kludge */
   static char        obill_date[8];/* bill date validation kludge */
   static VARCHAR     obill_date2[10]; /* thp - bill date validation */
   static VARCHAR     obill_date_test[10]; /* thp - bill date validation */
EXEC SQL END DECLARE SECTION;
#undef SQLCA_STORAGE_CLASS
EXEC SQL INCLUDE SQLCA.H;
EXEC ORACLE OPTION (MAXOPENCURSORS=30);

struct mark_struct
  {
  char   remark[81];
  long   seconds;
  long   useconds;
  };

void mark_time(int remark_nr,mark_struct *time_array,int mark_number);

GLOBAL TaxInterface *taxer;
```

-32-

```
/*************************************************************
 *
 * Name        : main
 * Description : Main driver for the billing system program.
 *
 *
 *
 *
 *
 *
 *
 *
 *
 *
 *
 *
 *
 *
 *
 *
 *
 *
 *
 *
 *
 *
 *
 *
 *
 *
 *
 *
 *
 *
 *
 *
 *
 *
 *
 *
 *
 *
 *
 *************************************************************/
/* Global segment performance monitoring struct */
struct seg_perf_struct seg_perf;

main(int argc,char **argv)
{
struct rev_by_cat *rev_list = (struct rev_by_cat *)NULL;/* Revenue by charge */
FILE        *pfp;  /* print file file pointer */
FILE        *bdfp; /* bill detail file file pointer */
register FILE       *tpfp; /* temporary print file file pointer */
register FILE       *tbdfp; /* temporary bill detail file file pointer */
BOOLEAN     error = FALSE; /* error flag */
BOOLEAN     found; /* found flag */
int         return_val = OK; /* return value */
char        print_fn[80]; /* print file name */
char        print_tmp_fn[80]; /* temp print file name */
char        bill_image_fn[80]; /* bill image file name */
char        bill_image_tmp_fn[80]; /* temp bill image file name */
char        bill_summary_fn[80]; /* bill summary file name */
char        market[4]; /* market id to produce bill for */ struct switch_mkt_struct market_rec; /* market information record */
struct market_call_struct *market_call_list = (struct market_call_struct *)NULL;
                                    /* call list by market */
struct rate_plan_struct *rate_plan_list = (struct rate_plan_struct *)NULL;
                                    /* rate plan list */
struct rate_plan_struct customer_rate_plan; /* customer rate plan */
struct totals_struct totals; /* totals by category and taxes */
memset(&totals,NULL,sizeof(totals_struct));
struct totals_struct current_charge_totals; /* list of totals for current
                                               charges table update */
memset(&current_charge_totals,NULL,sizeof(totals_struct));
```

-33-

```
struct recur_struct *recur_list = (struct recur_struct *)NULL;
                                        /* customer recurring charges */
struct recur_struct *misc_mkt_chg = (struct recur_struct *)NULL;
struct non_recur_struct *nonrecur_list = (struct non_recur_struct *)NULL;
                                        /* customer nonrecurring charges */
struct call_struct *call_list = (struct call_struct *)NULL; /* call list */
struct cust_struct *cust_info_list = (struct cust_struct *)NULL;
                                        /* customer information list */
struct tod_desc_struct *tod_desc_list = (struct tod_desc_struct *)NULL;
                                        /* tod description list */ struct bill_info_struct bill_info_rec; /* billing information record */
memset(&bill_info_rec,NULL,sizeof(bill_info_struct));

struct exemption_info *exemption_list = (exemption_info *)NULL;

struct ar_struct *ar_list = (struct ar_struct *)NULL; /* A/R information list */
struct collect_adj_struct *collect_adj_list = (struct collect_adj_struct *)NULL;
                                        /*adjustments list for collections*/
struct adjustment_struct *adjustment_list = (struct adjustment_struct *)NULL;
                                        /* adjustments list */
struct fyi_notice_struct *fyi_messages = (struct fyi_notice_struct *)NULL;
                                        /* for your information list */ struct date_struct todays_date; /* todays_date */
struct date_struct latefee_date; /* date of latefee threshold */
struct date_struct bill_date; /* bill cutoff date */
struct date_struct period_date; /* billing period start or end date */
struct date_struct due_date; /* bill due date */
struct date_struct prorate_to_date; /* prorate to date */
struct date_struct prorate_from_date; /* prorate from date */
struct date_struct activation_date; /* customer activation date */
struct date_struct deactivation_date; /* customer deactivation date */
struct date_struct suspend_date; /* customer suspend date */
struct date_struct offset_display_date; /* bill date + offset*/
int         i; /* loop control and indexing */
struct airtime_summary_struct *airtime_summary =
                                        (struct airtime_summary_struct *)NULL;
                                        /* airtime summary for reporting */
struct report_format rev_rpt_struct; /* account receivable report structure */
struct report_format ar_rpt_struct; /* account receivable report structure */
char        **as_rpt; /* pointer to airtime summary report */
struct report_format as_rpt_struct; /* airtime summary report structure */
char        **tas_rpt; /* pointer to toll and airtime summary report */
struct report_format tas_rpt_struct; /* toll and airtime summary report struct*/
struct toll_airtime_struct *toll_airtime_list =
                                        (struct toll_airtime_struct *)NULL;
                                        /* toll and airtime summary for reporting */
struct      totals_struct total_non_call_totals; /* non call totals for market*/
memset(&total_non_call_totals,NULL,sizeof(totals_struct));
struct      call_totals_struct total_call_totals; /* call totals for market*/
memset(&total_call_totals,NULL,sizeof(call_totals_struct));
struct      call_totals_struct total_roamer_totals; /* roamer totals for */
                                        /* market*/
memset(&total_roamer_totals,NULL,sizeof(call_totals_struct));
char        **billing_rpt; /* pointer to billing report */
struct report_format billing_rpt_struct; /* billing report struct*/
char        **js_rpt; /* pointer to journal summary report */
struct report_format js_rpt_struct; /* journal summary report struct*/
struct journal_struct *journal_list = (struct journal_struct *)NULL;
                                        /* journal summary for reporting */
char        **ps_rpt; /* pointer to phone sales report */
struct report_format ps_rpt_struct; /* phone sales report struct*/
```

-34-

```c
struct tax_reg_summary *tax_register = (tax_reg_summary *)NULL;
                                        /* tax register by geocode */ struct report_format zero_rpt_struct;  /* zero bill report struct*/
struct report_format excp_rpt_struct;  /* exception report struct*/
struct report_format dxcp_rpt_struct;  /* exception report struct*/
char       **tr_rpt;  /* pointer to tax register report */
struct report_format tr_rpt_struct;  /* tax register report struct*/
char       **chrg_rpt;  /* pointer to charge detail report */
struct report_format chrg_rpt_struct;  /* charge detail report struct*/
char       **comw_rpt;  /* pointer to commission waivers report */
struct report_format comw_rpt_struct;  /* commission waivers report struct*/
struct phone_sales_list_struct *phone_sales_list_header =
                        (phone_sales_list_struct *)NULL;/* charge type header */
struct phone_sales_list_struct *phone_sales_list_header_cur =
                        (phone_sales_list_struct *)NULL;/* charge type current */
struct phone_sales_tot_struct *phone_sales_list =
                                        (struct phone_sales_tot_struct *)NULL;
                                        /* phone sales for reporting */ struct cur_charge_struct *cur_charge_list =
                                        (struct cur_charge_struct *)NULL;
                                        /* charge list start */
BOOLEAN    bill_commit = FALSE;  /* TRUE if this run is a commit billing */
BOOLEAN    override = FALSE;  /* TRUE if no abort on date errors.*/
char       *temp_list_start;  /* generic pointer used to free linked lists */
struct bill_format bp;  /* bill page format structure */
struct bill_format dbp;  /* detail bill page format structure */
struct cust_struct *master_aggregate_ptr;  /* master aggregate pointer */
                        /* while processing an aggregate account */
struct aggregate_struct *aggregate_totals = (struct aggregate_struct *)NULL;
                                        /* list of aggregate totals */
struct aggregate_struct *aggregate_totals_start =
            (struct aggregate_struct *)NULL;  /* list of aggregate totals */
BOOLEAN    processing_aggregate = FALSE;  /* TRUE if currently processing an */
                        /* aggregate account */
struct p_category_struct *cat_list = (struct p_category_struct *)NULL;
                                        /* adjustment print category list */
char       prev_acct_nr[10];  /* previous account number being processed */
int        airtime_detail_start;  /* starting page of airtime detail */ struct commwaiv_struct *comw_list = (struct commwaiv_struct *)NULL;

long       comw_amt_totals = 0L;
long       comw_fed_totals = 0L;
long       comw_state_totals = 0L;
long       comw_county_totals = 0L;
long       comw_loc_totals = 0L;

struct mark_struct mark_time_arr[30];
struct collections_info dunning_cust;/* Node of customer information for
                                        late notice */
memset(&dunning_cust,NULL,sizeof(collections_info));
struct zero_bill_struct *zero_bill_list = (zero_bill_struct *)NULL;
                                        /* pointer of customer information for
                                        zero bill report */
struct collections_stat_hdr dunning_stats_hdr;
memset(&dunning_stats_hdr,NULL,sizeof(collections_stat_hdr));
struct collections_stat
      *dunning_stats = (struct collections_stat *)NULL;
struct collections_info *dunning_exception_list =
```

```
                    (struct collections_info *)NULL;/* List of dunning exceptions */
BOOLEAN send_bill=FALSE;
struct duedate_list *ddl_list = (struct duedate_list *)NULL;/* due_date list */
struct free_number_struct *free_number_ptr; /*freenumber table (roam america) */ call_struct *taxable_calls = (call_struct *)NULL;

struct super_list      *super = (struct super_list *)NULL;
struct write_off       *temp_write_off =(struct write_off *)NULL;
struct debt_exception  *temp_debt_xcp =(struct debt_exception *)NULL;
struct journal_ref     *temp_jour_ref=(struct journal_ref *)NULL;
struct rev_total       *temp_rev_total=(struct rev_total *)NULL;
struct bill_parameter  *temp_bill_params=(struct bill_parameter *)NULL;

/* ---------------------------------------------- */
/*      - Call discounting variables and functions */
/* ---------------------------------------------- */
struct discountPlan plan;
char pfile_buf[155648 * 2];
char pfile_buf_tmp[155648];
char bfile_buf[155648 * 2];
char bfile_buf_tmp[155648];

char sxcp_file[30];
char dxcp_file[30];
char zero_file[30];
char ar_rpt_file[30];
char as_rpt_file[30];
char tas_rpt_file[30];
char js_rpt_file[30];
char ps_rpt_file[30];
char cr_rpt_file[30];
char comm_rpt_file[30];
char rev_chg_rpt_file[30];
char billing_rpt_file[30];

BOOLEAN reopen_flag=FALSE;
BOOLEAN parallel=FALSE;
char diag_file_name[40];
char diag2_file_name[40];
char error_filename[40];
/* ---------------------------------------------- */
/*      - Call discounting variables and functions */
/* ---------------------------------------------- */
FILE *fpstd;
FILE *fpstde;

/* Shared memory interface variables */
key_t shbill_key=SHARED_MEM_KEY;
key_t shbill_id=0;
char *shmaddress; /* Pointer to shared memory */
char tmp_err_buf[80];/* for more descriptive error messages */ strcpy(mark_time_arr[0].remark,"BDRPT - NEW CUSTOMER");
mark_time_arr[0].useconds = 0L;
mark_time_arr[0].seconds = 0L;
strcpy(mark_time_arr[1].remark,"MTIME - POST PAYMENTS");
mark_time_arr[1].useconds = 0L;
mark_time_arr[2].seconds = 0L;
strcpy(mark_time_arr[2].remark,"MTIME - POST CALLS (HOME)");
mark_time_arr[2].useconds = 0L;
mark_time_arr[2].seconds = 0L;
strcpy(mark_time_arr[3].remark,"MTIME - RATE LOCAL HOME AIRTIME");
```

-36-

```c
mark_time_arr[3].useconds = 0L;
mark_time_arr[3].seconds = 0L;
strcpy(mark_time_arr[4].remark,"MTIME - PRINT BILL");
mark_time_arr[4].useconds = 0L;
mark_time_arr[4].seconds = 0L;
strcpy(mark_time_arr[5].remark,"MTIME - TOTAL BILL PROCESS");
mark_time_arr[5].useconds = 0L;
mark_time_arr[5].seconds = 0L;
strcpy(mark_time_arr[6].remark,"MTIME - RPT DATA INSERT");
mark_time_arr[6].useconds = 0L;
mark_time_arr[6].seconds = 0L;
strcpy(mark_time_arr[7].remark,"MTIME - POST CALLS (ROAM)");
mark_time_arr[7].useconds = 0L;
mark_time_arr[7].seconds = 0L;
strcpy(mark_time_arr[8].remark,"MTIME - CALC ROAM (ROAM)");
mark_time_arr[8].useconds = 0L;
mark_time_arr[8].seconds = 0L;
strcpy(mark_time_arr[9].remark,"SUMMARY USAGE 2");
mark_time_arr[9].useconds = 0L;
mark_time_arr[9].seconds = 0L;
strcpy(mark_time_arr[10].remark,"SUMMARY USAGE 3");
mark_time_arr[10].useconds = 0L;
mark_time_arr[10].seconds = 0L;
strcpy(mark_time_arr[11].remark,"SUMMARY USAGE 4");
mark_time_arr[11].useconds = 0L;
mark_time_arr[11].seconds = 0L;
strcpy(mark_time_arr[12].remark,"SUMMARY USAGE 5");
mark_time_arr[12].useconds = 0L;
mark_time_arr[12].seconds = 0L;
strcpy(mark_time_arr[13].remark,"MTIME - RPT DATA INSERT");
mark_time_arr[13].useconds = 0L;
mark_time_arr[13].seconds = 0L;

// clear out plan struct
memset(&plan, NULL, sizeof(discountPlan));

// set up error handler information
setIdentity(argv[0]);
setErrorFile("vgerr.log");

/* Set I/O buffer size for standard out
setvbuf(stdout,(char!)NULL,_IOFBF,65536); */ mark_time(5,mark_time_arr,1);

strcpy(market,argv[1]);
if (argv[4] != (char!)NULL)
  {
  sscanf(argv[4],"%2d/%2d/%4d",&bill_date.month,&bill_date.day,
                               &bill_date.year);
  sprintf(bill_date.date_str,"%4d%02d%02d",bill_date.year,
                               bill_date.month,bill_date.day);
  } /* if arg passed */
else
  {
  bill_date.year = 0;
  bill_date.month = 0;
  bill_date.day = 0;
  } /* else no arg passed */ memcpy(obill_date,bill_date.date_str,8);
memcpy(omarket,market,3);

vput(&obill_date2, argv[4]);
```

```c
/* ---------------------------------------------------- */
/*     - Set the error log for the changes that use the */
/* usererr function for reporting error from billing.   */
/* ---------------------------------------------------- */
open_error_log("vgerr.log");

if (*argv[5] == '1')
  bill_commit = TRUE;
if (*argv[6] == '1')
  override = TRUE;
if (*argv[7] == 'P')
  parallel = TRUE;

if ((segment = ((int)atoi(argv[8]))) == 0)
  {
  error_handler("bill_test.pc",UNKNOWN,
  "Could not determine segment number.");
  _exit(1);
  }
if (parallel)
        sprintf(ar_rpt_file,"ar_%d.rpt",segment);
else
        sprintf(ar_rpt_file,"ar.rpt");

sprintf(as_rpt_file,"as.rpt");
sprintf(tas_rpt_file,"tas.rpt");
sprintf(js_rpt_file,"js.rpt");
sprintf(ps_rpt_file,"ps.rpt");
sprintf(tr_rpt_file,"tr.rpt");
sprintf(comm_rpt_file,"comm.rpt");
sprintf(rev_chg_rpt_file,"rev_chg.rpt");
sprintf(billing_rpt_file,"billing.rpt");
sprintf(diag_file_name,"%s.xxx",argv[11]);
sprintf(diag2_file_name,"%s.err",argv[11]);

if((fpstd = freopen(diag_file_name,"w",stdout)) == (FILE *)NULL)
  {
  error_handler("bill_test.pc",FILEOPEN,
  "Could bill diagnostic file");
  _exit(1);
  }/* Can't open diagnostic file */
else
  {
   if((fpstde = freopen(diag2_file_name,"w",stderr)) == (FILE *)NULL)
     {
     error_handler("bill_test.pc",FILEOPEN,
     "Couldn't open stderr bill diagnostic file");
     _exit(1);
     }/* Can't open diagnostic file */ sprintf(tmp_err_buf,"sbrk: %d",sbrk(0));
error_handler("par_bill.pc",UNKNOWN,tmp_err_buf);
#ifdef _SEQUENT_
        shbill_id = shmget(shbill_key,0,IPC_CREAT);
#else
        shbill_id = shmget((int)shbill_key,0,IPC_CREAT);
#endif
sprintf(tmp_err_buf,"sbrk: %d",sbrk(0));
error_handler("par_bill.pc",UNKNOWN,tmp_err_buf);

if(shbill_id == -1)
        {
            error = 1;
            sprintf(tmp_err_buf,
            "Shared memory allocation for %d: attempt failed.",shbill_key);
```

-38-

```c
            error_handler("bill_test.pc",UNKNOWN,tmp_err_buf);
            _exit(0);
        }/* Get new key if in use */
        else
        {
/* Attach shared memory segment */
// #ifdef _SEQUENT_
// shmaddress = shmat(shbill_id,0,0);
// #else
shmaddress = (char *)shmat((int)shbill_id,(void *)0,0);
// #endif
sprintf(tmp_err_buf,"sbrk: %d",sbrk(0));
error_handler("par_bill.pc",UNKNOWN,tmp_err_buf);
if(((int )shmaddress) == -1)
{
sprintf(tmp_err_buf,"Chimp] %d",errno);
perror(tmp_err_buf);
    error = TRUE;
    sprintf(tmp_err_buf,
    "Could not attach shared memory in segment %d.",segment);
    error_handler("bill_test.pc",UNKNOWN,tmp_err_buf);
    _exit(1);
}
else
{
/* Set shared memory address to that of this segments shared area */
    shmaddress += (sizeof(struct par_perf_struct) +
                    ((segment-1) *
                     sizeof(struct seg_perf_struct)
                   )
                  );
    memcpy(&seg_perf.shmaddress,sizeof(struct seg_perf_struct));
    seg_perf.segment_number = segment;
    seg_perf.running = 1;
    seg_perf.complete = 0;
    seg_perf.slow_time = 0;
    seg_perf.fast_time = 100;
    seg_perf.last_acct_time = 0;
    seg_perf.last_cust_time = 0;
    seg_perf.elapsed_time = 0;
    seg_perf.total_time = 0;
    seg_perf.bill_count = 0;
    seg_perf.acct_count = 0;
    memcpy(seg_perf.last_account,
           "XXXXXXXXX",10);
    memcpy(seg_perf.last_cust,
           "XXXXXXXXX ",10);

/* Initialize shared memory for this tresgment. */
    memcpy(shmaddress,&seg_perf,(sizeof(struct seg_perf_struct)));

sprintf(tmp_err_buf,"sbrk: %d",sbrk(0));
error_handler("par_bill.pc",UNKNOWN,tmp_err_buf);
}
} /* got shmget() */ setvbuf(stdout,(char)NULL,_IOFBF,65536);
  printf("%s %s %s %s %s %s %s %s %s %s %s %s %s\n",
         argv[0],
         argv[1],
         argv[2],
         argv[3],
         argv[4],
         argv[5],
         argv[6],
         argv[7],
```

```
                argv[8],
                argv[9],
                argv[10],
                argv[11],
                argv[12]);
    }/* TESTING REMOVE */

/* log on to oracle */
strcpy((char *)uid.arr,argv[3]);
uid.len = strlen((char *)uid.arr);
EXEC SQL CONNECT :uid;
if (sqlca.sqlcode == NOT_SQL_ERROR)
    {
/*
    EXEC SQL ALTER SESSION SET OPTIMIZER_GOAL = RULE;
    EXEC SQL ALTER SESSION SET SQL_TRACE TRUE;
*/
/*
    EXEC SQL SELECT TO_CHAR(TO_DATE(:obill_date2, 'mm/dd/YYYY')) INTO :obill_date_test FROM DUAL;

if(sqlca.sqlcode != 0)
        {
        error_handler("bill_test.pc",UNKNOWN,
        "FATAL ERROR : bill date parameter is not in mm/dd/YYYY format.");
        exit(0);
        }/* If error, abort and inform operator to check bill date */
/* thp - end new kludge */

/* HUGE VANGUARD KLUDGE FOR bill date validation */
    EXEC SQL SELECT BILL_DATE INTO :obill_date2 FROM SWITCH_MARKET WHERE
             MARKET = :omarket AND
             BILL_DATE = ADD_MONTHS(TO_DATE(:obill_date,'YYYYMMDD'),-1);

if((sqlca.sqlcode != 0))
        {
        error_handler("bill_test.pc",UNKNOWN,
        "FATAL ERROR : bill date parameter is not 1 month greater than last bill date.");
        _exit(0);
        }/* If error, abort and inform operator to check bill date */

// wholt 12/6/92 changed for new tax lib
        taxer = new TaxInterface;
/*
    sprintf(print_fn,"/dev/null");
    sprintf(print_tmp_fn,"%s.prt.tmp",argv[2]);
*/
    sprintf(print_fn,"%s.prt",argv[2]);
    sprintf(print_tmp_fn,"%s.prt.tmp",argv[2]);
    sprintf(bill_image_fn,"%s.bmg",argv[2]);
    sprintf(bill_image_tmp_fn,"%s.bmg.tmp",argv[2]);

/*--------------------------------------------------*/
/* Get the super_list from the database (rgates)    */
/*--------------------------------------------------*/
    if(!bld_writeoff_list(&temp_write_off))
    {
        add_sub_list(&super,temp_write_off,WRITEOFF);
    }
    if(!bld_debt_xcp_list(&temp_debt_xcp))
    {
        add_sub_list(&super,temp_debt_xcp,DEBT_EXCEPT);
    }
    if(!bld_jrnl_ref_list(&temp_jour_ref))
    {
        add_sub_list(&super,temp_jour_ref,JOURNAL_REFERENCE);
    }
```

```
if(!bld_rev_total_list(&temp_rev_total))
{
    add_sub_list(&super,temp_rev_total,REVENUE_TOTAL);
}
if(!get_bill_params(&temp_bill_params,market))
{
    add_sub_list(&super,temp_bill_params,BILLING_PARAMS);
}

/* -------------------------------------------------- */
/*    - Get the discount plans from the database */
/* -------------------------------------------------- */
if(retreiveDiscountPlans(&plan,market,bill_date.date_str) == -1)
{
    error_handler("Call Discounting",
                  UNKNOWN,"Could not get discount plans");
    _exit(1);
}

/* name file by market */
if (((pfp = fopen(print_fn,"w+")) != NULL) &&
    ((bdfp = fopen(bill_image_fn,"w+")) != NULL))
{
 if(setvbuf(pfp,pfile_buf,_IOFBF,153600) == 0)
    if(setvbuf(bdfp,bfile_buf,_IOFBF,153600) == 0)

/* build the free number list                          */
       free_number_ptr = get_free_list();
    /* retrieve the market information record */
    if (!get_market(market,&market_rec))
       {
       if (!get_due_list(market,&ddl_list))
          {
          if(!get_dunning_leeway(&market_rec.leeway_amount,
                                 &market_rec.latefee_leeway,
                                 market))
         {
printf("notice %ld latefee %ld leeways\n",market_rec.leeway_amount,
                                        market_rec.latefee_leeway);

if (!get_rate_list(&rate_plan_list,market,
                          &airtime_summary))
          {
          due_date.day = market_rec.due_date_day_in_month;
          if !get_date_values(&bill_date,&period_date,&due_date,&todays_date,
                              &latefee_date,(int)market_rec.latefee_threshold,
                              market_rec.init_pay_type,overide,super))
             {
             if(strcmp(market_rec.bill_date.date_str,bill_date.date_str) == 0)
                {
printf("FATAL ERROR:  Current billing date is equal to last billing date.\n");
            error_handler("bill_test.pc",UNKNOWN,
               "Current bill_date = last bill date in switch_market table.");
            _exit(0);
            }
          compute_billdate_offsets(&bill_date,&offset_display_date);
          if ((cod_desc_list = get_cod_desc_list(market)) !=
             (struct cod_desc_struct *)NULL)
            {
            misc_mkt_chg = get_misc_mkt_chg(market,&todays_date);
            fyi_messages = get_fyi_notices(market,
                                           &due_date,
                                           &offset_display_date,
                                           &market_rec.csh_rcvd_date,
```

-41-

```
                                            &todays_date);
            if(fyi_messages == (struct fyi_notice_struct *)NULL)
                {
   printf("FATAL ERROR: retreiving fyi message/late notices.\n");
            error_handler("bill_test.pc",UNKNOWN,
                "get_fyi_notices() returned fatal error.");
                _exit(0);
                }/* if fyi error fatal */ if ((cat_list = get_print_cat()) !=
                  (struct p_category_struct *)NULL)
                { printf("Going to get cust_list \n");
fflush(stdout);
            if ((cust_info_list = get_cust_list(market,&bill_date,
                                            argv[9],argv[10])) !=
                    (struct cust_struct *)NULL)
                {
                get_journal_summary(&journal_list);
                get_phone_sales(&phone_sales_list,market);
                get_phone_sales(&phone_sales_list,market,
                             temp_bill_params->ph_sales_jrnl_acct);

if ((phone_sales_list_header = (phone_sales_list_struct *)
                       malloc(sizeof(phone_sales_list_struct))) !=
                       (phone_sales_list_struct *) NULL)
                 {
                  phone_sales_list_header->sales_list = phone_sales_list;
                  strcpy(phone_sales_list_header->titleText, "PHONE");
                  phone_sales_list_header_cur = phone_sales_list_header;
                  phone_sales_list_header_cur->link = (phone_sales_list_struct *)NULL;

/* get 'KE' codes list */
                  if ((phone_sales_list_header_cur->link =
                    (phone_sales_list_struct *)malloc(sizeof(phone_sales_list_struct)))
                    != (phone_sales_list_struct *) NULL)
                    {
                      phone_sales_list_header_cur = phone_sales_list_header_cur->link;
                      strcpy(phone_sales_list_header_cur->titleText, "EQUIPMENT");
                      phone_sales_list_header_cur->link=(phone_sales_list_struct *)NULL;
                      phone_sales_list_header_cur->sales_list=
                                            (phone_sales_tot_struct *)NULL;
                      get_phone_sales(&(phone_sales_list_header_cur->sales_list),market, temp_bill_params->equip_sales_jrnl_acct);
                    }
                    else
                    {
                      error_handler("bill_test.pc",UNKNOWN,
                      "Malloc error for phone_sales_list_header.");
                      printf("ERROR OCCURRED BUILDING PHONE SALES LIST.\n");
                    }
                 }
                 else
                 {
                   error_handler("bill_test.pc",UNKNOWN,
                   "Malloc error for phone_sales_list_header.");
                   printf("ERROR OCCURRED BUILDING PHONE SALES LIST.\n");
                 } if(!get_rev_list(&rev_list,market)) != 0)
                    {
                    error_handler("bill_test.pc",UNKNOWN,
                    "Can't make revenue by charge code list.");
                    printf("ERROR OCCURRED BUILDING REVENUE LIST.\n");
                    }
```

-42-

```
/*
            traverse(&rev_list);
*/

/* set the prorating to date as bill date */
            prorate_to_date = bill_date;

/* initialize the report structures */
            init_bill_rpt(&ar_rpt_struct,&as_rpt_struct,&tas_rpt_struct,
                          &billing_rpt_struct,&js_rpt_struct,
                          &ps_rpt_struct,&tr_rpt_struct,
                          &chrg_rpt_struct,&comw_rpt_struct,&bill_date,
                          &market_rec,super);

/* open the report files only in sequential mode */
            if((parallel) || ((!parallel) && ((
                    ((as_rpt_struct.rpt_file =
                     fopen(as_rpt_file,"w+")) != NULL))
                 && (
                    ((tas_rpt_struct.rpt_file =
                     fopen(tas_rpt_file,"w+")) != NULL))
                 && (
                    ((js_rpt_struct.rpt_file =
                     fopen(js_rpt_file,"w+")) != NULL))
                 && (
                    ((ps_rpt_struct.rpt_file =
                     fopen(ps_rpt_file,"w+")) != NULL))
                 && (
                    ((tr_rpt_struct.rpt_file =
                     fopen(tr_rpt_file,"w+")) != NULL))
                 && (
                    ((rev_rpt_struct.rpt_file =
                     fopen(rev_chg_rpt_file,"w+")) != NULL))
                 && (
                    ((billing_rpt_struct.rpt_file =
                     fopen(billing_rpt_file,"w+")) != NULL))
                 && (
                    ((comw_rpt_struct.rpt_file =
                     fopen(comw_rpt_file,"w+")) != NULL))))))
            {
/* open the ar report file IRregardless of parallel status */
                if(((ar_rpt_struct.rpt_file =
                     fopen(ar_rpt_file,"w+")) == NULL)
            /*       || (
             *        ((comw_rpt_struct.rpt_file =
             *         fopen(comw_rpt_file,"w+")) == NULL))
             */
                {
                    error_handler("bill_test",FILEOPEN,
                    "ar report files");
                    error = TRUE;
                } /* else fopen report files error */

/* Set I/O buffer size for ar.rpt file */
setvbuf(ar_rpt_struct.rpt_file,(char)NULL,_IOFBF,102400);
setvbuf(comw_rpt_struct.rpt_file,(char)NULL,_IOFBF,102400);

/* create the toll and airtime list for the home market */
            /* integrate into build market call list */
            if ((!build_toll_airtime_list(&toll_airtime_list,
                                          market_rec.market_sid,
                                          market_rec.market_name))
```

-43-

```
                {
                init_noncall_totals(&total_non_call_totals);
                init_call_totals(&total_call_totals);
                init_call_totals(&total_roamer_totals);
                init_dunning_stats(&dunning_stats_hdr,&dunning_stats);

while (!error &&
                    cust_info_list != (struct cust_struct *)NULL)
                {
                seg_perf.acct_count++;
                memcpy(seg_perf.last_account,
                    cust_info_list->acct_nr,
                    sizeof(cust_info_list->acct_nr));

mark_time(0,mark_time_arr.1);
                /* get the associated bill info record */
                if (!get_bill_info(&bill_info_rec,
                                cust_info_list->acct_nr))
                {
                /* get the current charges record */
                if (!get_current_charges(&cur_charge_list,
                                cust_info_list->acct_nr,
                                &bill_info_rec))
                { processing_aggregate = FALSE;
                do
                {
                seg_perf.bill_count++;
                memcpy(seg_perf.last_cust,
                    cust_info_list->cust_nr,
                    sizeof(cust_info_list->cust_nr));
printf("CUSTOMER # %-10.10s ACCT # %-10.10s\n",cust_info_list->cust_nr,
        cust_info_list->acct_nr);
                memcpy(bill_info_rec.bill_categories,"00000000",8);
                taxer->freeTaxList(&totals.noncall_tax);
                taxer->freeTaxList(&totals.payment_adj_tax);
                taxer->freeTaxList(&totals.home_adj_tax);
                taxer->freeTaxList(&totals.foreign_adj_tax);
                taxer->freeTaxList(&totals.payment_taxes);
                taxer->freeTaxList(&totals.home_taxes);
                taxer->freeTaxList(&totals.foreign_taxes);
                taxer->freeTaxList(&current_charge_totals.noncall_tax);
                taxer->freeTaxList(&current_charge_totals.payment_adj_tax);
                taxer->freeTaxList(&current_charge_totals.home_adj_tax);
                taxer->freeTaxList(&current_charge_totals.foreign_adj_tax);
                taxer->freeTaxList(&current_charge_totals.payment_taxes);
                taxer->freeTaxList(&current_charge_totals.home_taxes);
                taxer->freeTaxList(&current_charge_totals.foreign_taxes);
                init_noncall_totals(&totals);
                init_noncall_totals(&current_charge_totals);

init_tax_rec(&totals.noncall_tax);
                if(totals.noncall_tax != (struct vtax *)NULL)
                    taxer->freeTaxList(&totals.noncall_tax);
```

```
                    /* load date display variables */
                    load_date(&prorate_from_date,
                              cust_info_list->activation_date);
                    load_date(&activation_date,
                              cust_info_list->activation_date);
                    load_date(&deactivation_date,
                              cust_info_list->deactivation_date);
                    load_date(&suspend_date,cust_info_list->suspend_date);
                    /* build the call related totals list */
                    if ((market_call_list =
                         build_market_call_list(&market_rec)) !=
                        (struct market_call_struct *)NULL)
                    {
                    /* if the customer element is a master aggregate */
                    /* reserve it to process after individual accounts */
                    if (cust_info_list->aggr == AGGREGATE_MASTER)
                    {
                      /* the first time through set up aggregates */
                      if (processing_aggregate == FALSE)
                      {
                         master_aggregate_ptr = cust_info_list;
                         /* point to the first sub account */
                         processing_aggregate = TRUE;

/* build the aggregate totals list */
                         build_aggr_totals_list(&aggregate_totals,
                                   master_aggregate_ptr->cust_nr,
                                   cust_info_list);

/* retrieve calls for each aggregate account */
mark_time(2,mark_time_arr,1);
                         ret_aggr_call_info(aggregate_totals->link,
                                   cust_info_list->link,
                                   market_rec.market_sid,
                                   &bill_date,
                                   &(bill_info_rec.detail_sort_cd));
mark_time(2,mark_time_arr,2);

calculate_free_aggr_airtime(aggregate_totals,
                                   cust_info_list,
                                   &bill_info_rec,
                                   rate_plan_list,
                                   &prorate_to_date,
                                   &market_rec.bill_date,
                                   &period_date,
                                   market_rec.init_pay_type,&plan);

/* point to the first aggregate, if one exists. */
                         if(aggregate_totals->link !=
                            (struct aggregate_struct *)NULL)
                            aggregate_totals_start = aggregate_totals->link;
                         else
                            aggregate_totals_start = aggregate_totals;

/* get the data for billing the first */
                         /* subordinate from the aggregate list */
                         market_call_list->call_list =
                                   aggregate_totals_start->call_list;

market_call_list->alt_call_list =
                                   aggregate_totals_start->alt_call_list;

/* copy the aggregate rate plan to current rate */
                         /* plan record */
                         copy_rate_plan(
                                   &aggregate_totals_start->rate_plan_rec,
```

-45-

```
                        &customer_rate_plan);

/* if this aggregate master has no subordinates */
            /* set processing aggregate flag to FALSE and */
            /* process only the aggregate master */
            if (memcmp(cust_info_list->acct_nr,
                       cust_info_list->link->acct_nr,10))
            {
                cust_info_list = master_aggregate_ptr;
                processing_aggregate = FALSE;
            } /* if only master aggregate */
            else
                cust_info_list = cust_info_list->link;
            } /* if processing aggregatge = FALSE */
            /* process the master aggregate last */
            else
            {
            /* total the subordinate charges into the */
            /* totals record for this aggregate account */
            totals.subordinate_home =
        aggregate_totals->aggregate_totals.subordinate_home;
            totals.subordinate_foreign =
        aggregate_totals->aggregate_totals.subordinate_foreign;

/* point back to the start of aggregate list */
            aggregate_totals_start = aggregate_totals;
            /* total the subordinate account charges */
            market_call_list->call_list =
                    (struct call_struct *)NULL;
            market_call_list->alt_call_list =
                    (struct call_struct *)NULL;
            /* copy the aggregate rate plan to current rate */
            /* plan record */
            copy_rate_plan(
                    &aggregate_totals_start->rate_plan_rec,
                    &customer_rate_plan);
            processing_aggregate = FALSE;
            } /* else processing aggregate = TRUE */
            } /* if master aggregate */
            else if (cust_info_list->aggr ==
                 AGGREGATE_SUBORDINATE)
            {
            /* get the data for billing the subordinate from */
            /* the aggregate list */
            market_call_list->call_list =
                    aggregate_totals_start->call_list;

market_call_list->alt_call_list =
                    aggregate_totals_start->alt_call_list;
            /* copy the aggregate rate plan to current rate */
            /* plan record */
            copy_rate_plan(
                    &aggregate_totals_start->rate_plan_rec,
                    &customer_rate_plan);
            } /* if aggregate subordinate */
            else
            {
mark_time(2,mark_time_arr,1);
            market_call_list->call_list =
                ret_call_info(cust_info_list->cust_nr,
                              market_rec.market_sid,
                              &prorate_from_date,&bill_date,
                              &(bill_info_rec.detail_sort_cd),
                              &(market_call_list->alt_call_list));
```

```
mark_time(2,mark_time_arr,2);
                if (!get_cust_rate_plan(&bill_info_rec,
                            rate_plan_list,
                            cust_info_list->cust_status,
                            cust_info_list->cust_nr,
                            &customer_rate_plan,
                            &prorate_from_date,
                            &prorate_to_date,
                            &market_rec.bill_date,
                            &activation_date,
                            &deactivation_date,
                            &suspend_date,
                            &period_date,
                            market_call_list->call_list,
                            market_rec.init_pay_type,
                            cust_info_list->nr_prorated_days))
                {
                error_handler("bill_test",UNKNOWN,"no rate plan");
                error = TRUE;
                } /* no rate plan */
            } /* non aggregate */ taxer->getCustExemptions(&exemption_list,
                            cust_info_list->cust_nr);
            printf("Just Returned From getCustExempts for");
            printf(" account number %10.10s\n",
                    cust_info_list->cust_nr);

/* get the previous charge */
            totals.previous_balance = bill_info_rec.current_chges;

/* get any A/R records or any adjustments */
mark_time(1,mark_time_arr,1);
            ar_list = get_ar_info(cust_info_list->cust_nr,
                            &total_non_call_totals,
                            &bill_date);

adjustment_list =
                    get_adj_info(cust_info_list->cust_nr,
                            market_rec.market,
                            &bill_date,
                            cat_list,
                            &bill_info_rec);

taxer->calcTax(adjustment_list,exemption_list,
                        bill_date.date_str,
                        cust_info_list->geo_code,
                        bill_info_rec.service_class,
                        cust_info_list->cust_nr,
                        cust_info_list->city_resident);
            taxer->buildTaxRegister(adjustment_list,
                        &tax_register,
                        cust_info_list->geo_code);

calc_ar_adj(ar_list,adjustment_list,&totals,
                    cat_list,journal_list,&collect_adj_list,
                    super);
```

-47-

```
mark_time(1,mark_time_arr,2);
                    /* account balance for aggregates is 0 */
                    if (cust_info_list->aggr == AGGREGATE_SUBORDINATE)
                      {
                      totals.previous_balance = 0L;
                      totals.unpaid = 0L;
                      }
                    else
                      totals.unpaid = totals.previous_balance -
                                      totals.payments;

/* calculate the rate plan charges - if any */
                    if (customer_rate_plan.rate_plan_id[0] != (char)NULL)
                    { taxer->calcTax(&customer_rate_plan,
                                     exemption_list,bill_date.date_str,
                                     cust_info_list->geo_code,
                                     bill_info_rec.service_class,
                                     cust_info_list->cust_nr,
                                     cust_info_list->city_resident);
                      taxer->buildTaxRegister(&customer_rate_plan,
                                     &tax_register,
                                     cust_info_list->geo_code);

calc_rate_plan_charges(&customer_rate_plan,&totals,
                                     journal_list);
                    }

/* calculate the recurring charge totals and debit */
                    /* the recurring charge balance - if appropriate */
                    /* NOTE: prorate from date is the activation date */
printf("BT no_active_days = %d\n",customer_rate_plan.no_active_days);

recur_list =
                        get_recur_charges(cust_info_list->cust_nr,
                                     cust_info_list->aggr,
                                     &prorate_from_date,
                                     &prorate_to_date,
                                     &bill_date,
                                     &market_rec.bill_date,
                                     &deactivation_date,
                                     &suspend_date,
                                     &activation_date,
```

```
                              market_rec.market,
                              cust_info_list->cust_status,
                              market_rec.init_pay_type,
                              customer_rate_plan.no_active_days,
                              cat_list,
                              &bill_info_rec,
                              cust_info_list->nr_prorated_days,
                              misc_mkt_chg,
                              market_rec.switch_name,
                              cust_info_list->mobile_nr,
                              super);

if (recur_list != (struct recur_struct *)NULL)
            { taxer->calcTax(recur_list,exemption_list,
                              bill_date.date_str,
                              cust_info_list->geo_code,
                              bill_info_rec.service_class,
                              cust_info_list->cust_nr,
                              cust_info_list->city_resident);
              taxer->buildTaxRegister(recur_list,
                              &tax_register,
                              cust_info_list->geo_code);
              calc_recur_charges(recur_list,&totals,
                              journal_list);
            } /* if recur_list */

/* calculate the nonrecurring charge totals */
            nonrecur_list =
                get_nonrecur_charges(cust_info_list->cust_nr,
                              market_rec.market,
                              &bill_date,
                              cat_list,
                              &bill_info_rec);
            if (nonrecur_list != (struct non_recur_struct *)NULL)
            { taxer->calcTax(nonrecur_list,exemption_list,
                              bill_date.date_str,
                              cust_info_list->geo_code,
                              bill_info_rec.service_class,
                              cust_info_list->cust_nr,
                              cust_info_list->city_resident);
              taxer->buildTaxRegister(nonrecur_list,
                              &tax_register,
                              cust_info_list->geo_code);
              calc_nonrecur_charges(nonrecur_list,&totals,
                              journal_list);
            } /* if nonrecur_list */

/* calculate the air time charges */
mark_time(3,mark_time_arr,1);
            /* don't calculate airtime charges or roamer */
            /* charges for master aggregates */
            if (cust_info_list->aggr != AGGREGATE_MASTER)
            {
              if (customer_rate_plan.rate_plan_id[0] !=
                   (char)NULL)
              {
```

-49-

```
                            taxable_calls = (call_struct *)NULL;
                        market_call_list->airtime_tot =
                            calc_call_charges(&customer_rate_plan,
                                    market_call_list->call_list,
                                    &totals,
                                    &market_call_list->call_totals,
                                    &market_rec,
                                    toll_airtime_list,
                                    journal_list,
                                    cust_info_list->cust_status,
                                    &plan,&bill_info_rec,
                                    &taxable_calls,
                                    free_number_ptr);

taxer->calcTax(taxable_calls,exemption_list,bill_date.date_str,
                cust_info_list->geo_code,bill_info_rec.service_class,
                cust_info_list->cust_nr,cust_info_list->city_resident);
    taxer->buildTaxRegister(taxable_calls,&tax_register,
                        cust_info_list->geo_code);
    taxer->summarizeTax(taxable_calls,&market_call_list->call_totals.air_tax,
                    &market_call_list->call_totals.land_tax);
    // this assumes that the taxable calls has local,intra and inter calls
    // in that order.
    taxer->summarizeTax(taxable_calls,
                    &toll_airtime_list->airtime_tax[MAX_ROAMER_TYPES],NULL);
    call_struct *iter = taxable_calls;
    taxer->addTax(&toll_airtime_list->local_access_tax[MAX_ROAMER_TYPES],
                iter->land_tax);
    iter = iter->link;
    taxer->addTax(&toll_airtime_list->intrastate_tax[MAX_ROAMER_TYPES],
                iter->land_tax);
    iter = iter->link;
    taxer->addTax(&toll_airtime_list->interstate_tax[MAX_ROAMER_TYPES],
                iter->land_tax);
                            /* update airtime and tax data to call_info */
                        } mark_time(3,mark_time_arr,2);

/* retrieve all roamer call records */
                        /* NOTE: prorate from date is activation date */
                        if ((ret_roamer_info(cust_info_list->cust_nr,
                                    market_call_list,
                                    market_rec.market_sid,
                                    cust_info_list->activation_date,
                                    &bill_date,
                                    toll_airtime_list,
                                    &(bill_info_rec.detail_sort_cd)))

for (market_call_struct *mc_iter = market_call_list->link; mc_iter;
     mc_iter = mc_iter->link)
{
    taxer->calcTax(mc_iter->call_list,exemption_list,bill_date.date_str,
                cust_info_list->geo_code,bill_info_rec.service_class,
                cust_info_list->cust_nr,cust_info_list->city_resident);
    taxer->buildTaxRegister(mc_iter->call_list,&tax_register,
                        cust_info_list->geo_code);
} calc_roamer_charges(market_call_list,&totals,
                                        toll_airtime_list);
                    } /* if not master aggregate */
```

-50-

```
                            /* total all charges by category */
                            total_charges(&totals,market_call_list);

/* set the detailed billing flag */
                              detail_key(&bill_info_rec.recur_list);
                              /* if there are no current or unpaid charges */
                              /* then do not print a bill - flag the customer */
                              /* as having no current or unpaid charges */
                              /* print the bill */
mark_time(4,mark_time_arr,1);

/* change to use freopen for subsequent opens */
                    if(((reopen_flag) &&
                       ((tpfp = fopen(print_tmp_fn,"w+")) != NULL) &&
                       ((tbdfp = fopen(bill_image_tmp_fn,"w+")) != NULL))
                       ||
                      ((tpfp = freopen(print_tmp_fn,"w+",tpfp)) != NULL) &&
                      ((tbdfp = freopen(bill_image_tmp_fn,"w+",tbdfp)) != NULL))
                            {
                            reopen_flag=TRUE;
                            setvbuf(tpfp,pfile_buf_tmp,_IOFBF,153600);
                            setvbuf(tbdfp,bfile_buf_tmp,_IOFBF,153600);
                            init_bill(&bp,80,66,tpfp);
                            init_bill(&dbp,80,66,tbdfp);

/* collect dunning information applicable. */
                            get_dunning_data(&market_rec.bill_date,
                                            cust_info_list,
                                            &bill_info_rec,
                                            &dunning_cust,
                                            &cur_charge_list,
                                            &totals,
                                            &collect_adj_list,
                                            &customer_rate_plan,
                                            ddl_list,
                                            &todays_date,
                                            super);

if ((cust_info_list->aggr != AGGREGATE_SUBORDINATE) &&
                          (cust_info_list->aggr != MALE_IN))
                          {
                          switch(dunning_cust.treatment_notice)
                              {
                              case NO_TREATMENT:
printf("NO TREATMENT\n");
/* Compute balance anyway but won't get notice.(print_bill handles that) */
                              standardDunning(&dunning_cust,
                                              market_rec.leeway_amount);
                              break;
                              case STANDARD_TREAT:
printf("STANDARD\n");
/* Use standard treatment algorithm. */
                              standardDunning(&dunning_cust,
                                              market_rec.leeway_amount);
                              break;
                              case SPECIAL_TREAT:
printf("SPECIAL\n");
/* Use corporate treatment algorithm. */
                              specialDunning(&dunning_cust,
                                              market_rec.leeway_amount);
                              break;
                              case DEAL_TREAT:
printf("DEAL\n");
/* Use corporate treatment algorithm. */
                              dealDunning(&dunning_cust,
                                           market_rec.leeway_amount);
```

-51-

```c
                                break;
                            case BAD_DEAL_TREAT:
printf("BAD_DEAL\n");
/* Use corporate treatment algorithm. */
                                baddealDunning(&dunning_cust,
                                               market_rec.leeway_amount);
                                break;
                            default:
printf("DEFAULT\n");
/* This may happen given our screwy data security. So log and fix as needed. */
                                error_handler("bill_test",UNKNOWN,
                                "Undefined dunning treatment code");
                                error = TRUE;
                                break; /* Just for the hell of it. */
                            }/*Balance based on account's treatment code*/ printf("PAST DUE Account = %10.10s past due = %ld notice level = %c\n",
dunning_cust.acct_nr,
dunning_cust.past_due_balance,
dunning_cust.notice_level);

/* catalog dunning action in statistics record. */
                            acc_dunning_stats(&dunning_cust
                                              &dunning_stats_hdr,
                                              &dunning_stats);

/* Calculate a latefee */
//*************************** late_fee_struct lfs;

lfs.market = &market_rec;
   lfs.cust_info_list = cust_info_list;

lfs.dunning_cust = &dunning_cust;
   lfs.bill_info_rec = &bill_info_rec;
   lfs.cur_charge_list = cur_charge_list;
   lfs.adjustment_list = &adjustment_list;
   lfs.collect_adj_list = &collect_adj_list;
   lfs.totals = &totals;
   lfs.todays_date = &todays_date;
   lfs.latefee_date = &latefee_date;

lfs.cat_list = cat_list;
   lfs.ddl_list = ddl_list;
   lfs.jrnl_list = journal_list;
   lfs.exemptions = exemption_list;
//***************************
                            if(calc_latefee(&lfs.super))
                                {
                                error_handler("bill_test",UNKNOWN,
                                "Error calculating late fee.");
                                error = TRUE;
                                }
                            else
                                {
/* Check for dunning exceptions */
                                if(dunning_cust.notice_level != FYI_MESSAGE)
                                    {
                                    if(dunning_cust.notice_level == ERROR_NOTICE)
                                        {
```

```
                    error_handler("bill_test",UNKNOWN,
                    "Undefined notice level in bill_info");
                    error = TRUE;
                    }/* Fatal error invalid notice */
                else
                    { dunning_exception(&dunning_cust,
                                    &dunning_exception_list,
                                    &dunning_stats_hdr);

if((commentLevels(&dunning_cust,
                                    &bill_date,
                                    &todays_date,
                                    market_rec.market,
                                    super))
                        {
                        error_handler("bill_test",UNKNOWN,
                        "Error inserting late notice comment.");
                        error = TRUE;
                        }
                    }/* else no error notice */
                }/* fyi's don't count here */
            }/* else no error latefee */ if(update_bill_info(&bill_date,&dunning_cust,
                            bill_info_rec.rowid))
                {
                error_handler("bill_test",UNKNOWN,
                "Error updating aged_analysis in bill_info");
                error = TRUE;
                }

}/* Aggregates subordinates don't have balances*/
        else
            {
            dunning_cust.notice_level = FYI_MESSAGE;
            }/* Give subordinates FYI */

//***************************** print_bill_struct pbs;
pbs.cust_info_rec = cust_info_list;
pbs.market_call_list = market_call_list;
pbs.totals = &totals;
pbs.recur_list = recur_list;
pbs.nonrecur_list = nonrecur_list;
pbs.ar_list = ar_list;
pbs.adjustment_list = adjustment_list;
pbs.mkt_rec = &market_rec;
pbs.bill_info_rec = &bill_info_rec;
pbs.rate_plan_rec = &customer_rate_plan;
pbs.tod_desc_list = tod_desc_list;
pbs.fyi_messages = fyi_messages;
pbs.airtime_tod_totals = market_call_list->airtime_tot;
pbs.rate_plan_prorate = customer_rate_plan.sc_pro_rate;
pbs.aggregate_totals = aggregate_totals_start;
pbs.display_date = &bill_date;
pbs.period_display_date = &period_date;
pbs.offset_display_date = &offset_display_date;
pbs.due_date = &due_date;
pbs.bp = &bp;
pbs.dbp = &dbp;
pbs.cat_list = cat_list;
```

-53-

```
    pbs.airtime_detail_start = &airtime_detail_start;
    pbs.todays_date = &todays_date;
    pbs.dunning_cust = &dunning_cust;
//*******************************
                        if(print_bill(&pbs,super))
                          {
                            error_handler("bill_test",UNKNOWN,
                                                    "printing bill");
                            error = TRUE;
                          } /* if print_bill */

//                      if((cust_info_list->aggr )= AGGREGATE_MASTER) &&
//                         (cust_info_list->aggr != WALK_IN))

/* See if this is a zero bill customer */
                        if(cust_info_list->aggr != WALK_IN)
                          {
                            send_bill = check_zero_bill(&dunning_cust,
                                                cust_info_list,
                                                &dunning_stats_hdr,
                                                &totals,
                                                market_call_list,
                                                &zero_bill_list,
                                                &collect_adj_list,
                                                bill_info_rec.pull_bill,
                                                super);
                          }
                        else
                          {
                            send_bill = TRUE;
                          }

/* Get number of pages generated for this bill */
                        if(send_bill)
                        dunning_stats_hdr.bill_pages +=
                         (bp.page_count + dbp.page_count) *
                         bill_info_rec.bill_copies;

build_bill_detail(market,cust_info_list,
                                        &bill_date,airtime_detail_start,
                                        &bill_info_rec,pfp,bdfp,&bp,
                                        &dbp,send_bill,
                                        &dunning_stats_hdr);

/* close the print files */
                        fclose(tpfp);
                        fclose(tbdfp);
                        } /* fopen or freopen */
                        else
                          {
                            printf("error opening bill print files\n");
                            error = TRUE;
                          } /* fopen error */
mark_time(4,mark_time_arr,2);
                        /* build the commission_waivers report line */
mark_time(6,mark_time_arr,1);
                        build_comm_rpt(&comm_rpt,
                                        &comm_rpt_struct,
                                        adjustment_list,
                                        cust_info_list,
                                        exemption_list,
                                                                                &comm_list,
                                        todays_date.date_str,
```

```
                              bill_info_rec.service_class,
                              &comv_amt_totals,
                              &comv_fed_totals,
                              &comv_state_totals,
                              &comv_county_totals,
                              &comv_loc_totals,
                              -                                              parallel);
#if 0

/* accumulate phone sales report */
                acc_phone_sales(phone_sales_list,recur_list,
                                nonrecur_list,cust_info_list);
endif phone_sales_list_header_cur = phone_sales_list_header;
            acc_phone_sales(phone_sales_list_header_cur->sales_list,
                            recur_list,
                            nonrecur_list,
                            cust_info_list,
                            temp_bill_params->ph_sales_jrnl_acct);
            phone_sales_list_header_cur = phone_sales_list_header_cur->link;
            acc_phone_sales(phone_sales_list_header_cur->sales_list,
                            recur_list,
                            nonrecur_list,
                            cust_info_list,
                            temp_bill_params->equip_sales_jrnl_acct);

/* Get copy of charge totals record for current
               charges table update */
                add_totals(&totals,&current_charge_totals);

/* accumulate revenue by charge report */
                    acc_rev_chg(&rev_list,&recur_list,
                                &nonrecur_list,&bill_info_rec,
                                totals.monthly_access);

/* accumulate the airtime summary report totals */
            if (customer_rate_plan.rate_plan_id[0] != (char)NULL)
                if (acc_airtime_summary(airtime_summary,
                                market_call_list->airtime_tot,
                                customer_rate_plan.rate_plan_id,
                                totals.monthly_access))
                {
                  printf("airtime summary report error\n");
                } /* else acc_airtime_summary error */ mark_time(6,mark_time_arr,2);
mark_time(7,mark_time_arr,1);
                /* update summary of cust activity */
                        upd_summary_list(
                        cust_info_list->cust_nr,
                        market,
                        market_call_list,
                        &totals,
                        bill_date.date_str);
mark_time(7,mark_time_arr,2);

memcpy(prev_acct_nr,cust_info_list->acct_nr,10);

/* total the aggregate accounts */
                if (cust_info_list->aggr == AGGREGATE_SUBORDINATE)
                {
                    /* copy the aggregate totals data into the */
```

-55-

```
                /* aggregate totals list */
                add_totals(&totals,
                    &aggregate_totals_start->aggregate_totals);
                add_call_totals(&market_call_list->call_totals,
                    &aggregate_totals_start->aggregate_call_totals);
                total_sub_aggr(aggregate_totals,
                                aggregate_totals_start,
                                market_call_list);
                aggregate_totals_start =
                                aggregate_totals_start->link;
                cust_info_list = cust_info_list->link;
                } /* if aggregate subordinate */
            /* total all the subordinate charges for the */
            /* current master account. this will allow */
            /* correct reporting based on account number */
            else if (cust_info_list->aggr == AGGREGATE_MASTER)
                {
                /* pass the head of the aggregate list */
                total_aggregate(aggregate_totals_start,&totals,
                                &market_call_list->call_totals);
                } /* if master aggregate */

/* if this is the last aggregate then process the */
            /* master aggregate last */
            if (processing_aggregate &&
                memcmp(prev_acct_nr,cust_info_list->acct_nr,10))
                cust_info_list = master_aggregate_ptr;

} /* if build_market_call_list */
        else
            {
            error_handler("bill_test",UNKNOWN,
                            "building market call list");
            error = TRUE;
            } /* else build_market_call_list error */

/* update the number of prorated days
        if (update_nr_prorated_days(cust_info_list->cust_nr))
            {
            error_handler("bill_test",UNKNOWN,
                            "update nr prorated days");
            error = TRUE;
            } if update nr prorated days */ if((processing_aggregate) && ( cust_info_list->aggr != AGGREGATE_MASTER))
{
                /* call related charges */
                while (market_call_list !=
                            (struct market_call_struct *)NULL)
                    {
                    /* free the subordinate lists */
                    /* call list */
                    while (market_call_list->call_list !=
                            (struct call_struct *)NULL)
                        {
                        taxer->freeTaxList(
                        &market_call_list->call_list->air_tax);
                        taxer->freeTaxList(
                        &market_call_list->call_list->land_tax);
                        temp_list_start =
                            (char *)market_call_list->call_list->link;
                        free((char *)market_call_list->call_list);
                        market_call_list->call_list =
                            (struct call_struct *)temp_list_start;
```

-56-

```
        } /* while elements in list */

/* Free call taxes */
        taxer->freeTaxList(
        &market_call_list->call_totals.air_tax);
        taxer->freeTaxList(
        &market_call_list->call_totals.land_tax);

/* airtime totals */
    while (market_call_list->airtime_tot !=
            (struct airtime_totals *)NULL)
        {
        temp_list_start =
            (char *)market_call_list->airtime_tot->link;
        free((char *)market_call_list->airtime_tot);
        market_call_list->airtime_tot =
                (struct airtime_totals *)temp_list_start;
        } /* while elements in list */ temp_list_start = (char *)market_call_list->link;
    free((char *)market_call_list);
    market_call_list =
            (struct market_call_struct *)temp_list_start;
    } /* while elements in list */

/* Free taxable calls list */
while (taxable_calls !=
        (struct call_struct *)NULL)
    {
    taxer->freeTaxList(&taxable_calls->air_tax);
    taxer->freeTaxList(&taxable_calls->land_tax);
    temp_list_start =
        (char *)taxable_calls->link;
    delete taxable_calls;
    taxable_calls =
        (struct call_struct *)temp_list_start;
    } /* while elements in list */

/* recurring charges */
while (recur_list != (struct recur_struct *)NULL)
    {
    temp_list_start = (char *)recur_list->link;
    taxer->freeTaxList(&recur_list->tax);
    free((char *)recur_list);
    recur_list = (struct recur_struct *)temp_list_start;
    } /* while elements in list */

/* nonrecurring charges */
while (nonrecur_list != (struct non_recur_struct *)NULL)
    {
    temp_list_start = (char *)nonrecur_list->link;
    taxer->freeTaxList(&nonrecur_list->tax);
    free((char *)nonrecur_list);
    nonrecur_list =
        (struct non_recur_struct *)temp_list_start;
    } /* while elements in list */

} /* if processing_aggregate */

/* tax exemptions */
    if (exemption_list != (struct exemption_info *)NULL)
        {
        taxer->freeExemptionList(&exemption_list);
```

-57-

```
        }
    } while (!error && processing_aggregate);

/* build the AR report line */
    build_ar_rpt(&ar_rpt_struct,cust_info_list,
                 &bill_info_rec,&totals,
                 market_call_list);

/* build the customer detail report */

/* total market call and non call totals */
    total_totals(&total_non_call_totals,
                 &total_call_totals,
                 &total_roamer_totals,
                 &totals,
                 market_call_list);

/* add any unpaid charges or credit to the */
    /* current charge and update the billing table*/ if (bill_commit && update_current_charges(cust_info_list,
                 cur_charge_list,
                 &current_charge_totals,
                 bill_date.date_str,&collect_adj_list))
    {
    error_handler("bill_test",UNKNOWN,
                              "updating charge bill");
    error = TRUE;
    } /* if error update current charge */
    } /* if get current charges */

} /* if get_bill_info */
else
    {
    error_handler("bill_test",UNKNOWN,
                              "getting bill info");
    error = TRUE;
    } /* else get_bill_info error */ if (!bill_commit)
    {
    EXEC SQL ROLLBACK;
    }
else if (!error)
    {
    EXEC SQL COMMIT;
    }

/* free the customer associated linked lists */

-58-
```

```
/* Free aggregate totals list */
aggregate_totals = aggregate_totals_start;
while(aggregate_totals !=
        (struct aggregate_struct *)NULL)
    {
    taxer->freeTaxList(
    &aggregate_totals->aggregate_totals.noncall_tax);
    taxer->freeTaxList(
    &aggregate_totals->aggregate_totals.payment_adj_tax);
    taxer->freeTaxList(
    &aggregate_totals->aggregate_totals.home_adj_tax);
    taxer->freeTaxList(
    &aggregate_totals->aggregate_totals.foreign_adj_tax);

taxer->freeTaxList(
    &aggregate_totals->aggregate_call_totals.air_tax);
    taxer->freeTaxList(
    &aggregate_totals->aggregate_call_totals.land_tax);

aggregate_totals_start = aggregate_totals->link;
    free((char *)aggregate_totals);
    aggregate_totals = aggregate_totals_start;
    }/* while aggregate struct nodes */

/* free rate plan taxes */
    taxer->freeTaxList(&customer_rate_plan.tax);

/* Free taxable calls list */
    while (taxable_calls !=
        (struct call_struct *)NULL)
        {
        taxer->freeTaxList(&taxable_calls->air_tax);
        taxer->freeTaxList(&taxable_calls->land_tax);
        temp_list_start =
            (char *)taxable_calls->link;
        delete taxable_calls;
        taxable_calls =
            (struct call_struct *)temp_list_start;
        } /* while elements in list */

/* current charges */
while (cur_charge_list !=
        (struct cur_charge_struct *)NULL)
    {
    temp_list_start = (char *)cur_charge_list->link;
    free((char *)cur_charge_list);
    cur_charge_list =
    (struct cur_charge_struct *)temp_list_start;
    } /* while elements in list */

/* ar */
while (ar_list != (struct ar_struct *)NULL)
    {
    temp_list_start = (char *)ar_list->link;
    free((char *)ar_list);
    ar_list = (struct ar_struct *)temp_list_start;
    } /* while elements in list */

/* adjustment list copy */
while (collect_adj_list !=
            (struct collect_adj_struct *)NULL)
    {
    temp_list_start = (char *)collect_adj_list->link;
    free((char *)collect_adj_list);
    collect_adj_list =
```

-59-

```
                (struct collect_adj_struct *)temp_list_start;
    } /* while elements in list */

/* adjustments */
while (adjustment_list !=
            (struct adjustment_struct *)NULL)
    {
    temp_list_start = (char *)adjustment_list->link;
    taxer->freeTaxList(&adjustment_list->tax);
    free((char *)adjustment_list);
    adjustment_list =
            (struct adjustment_struct *)temp_list_start;
    } /* while elements in list */

/* recurring charges */
while (recur_list != (struct recur_struct *)NULL)
    {
    temp_list_start = (char *)recur_list->link;
    taxer->freeTaxList(&recur_list->tax);
    free((char *)recur_list);
    recur_list = (struct recur_struct *)temp_list_start;
    } /* while elements in list */

/* nonrecurring charges */
while (nonrecur_list != (struct non_recur_struct *)NULL)
    {
    temp_list_start = (char *)nonrecur_list->link;
    taxer->freeTaxList(&nonrecur_list->tax);
    free((char *)nonrecur_list);
    nonrecur_list =
            (struct non_recur_struct *)temp_list_start;
    } /* while elements in list */

/* call related charges */
while (market_call_list !=
            (struct market_call_struct *)NULL)
    {
    /* free the subordinate lists */
    /* call list */
    while (market_call_list->call_list !=
            (struct call_struct *)NULL)
        {
        taxer->freeTaxList(
            &market_call_list->call_list->air_tax);
        taxer->freeTaxList(
            &market_call_list->call_list->land_tax);
        temp_list_start =
            (char *)market_call_list->call_list->link;
        free((char *)market_call_list->call_list);
        market_call_list->call_list =
            (struct call_struct *)temp_list_start;
        } /* while elements in list */

/* Free call taxes */
    taxer->freeTaxList(
        &market_call_list->call_totals.air_tax);
    taxer->freeTaxList(
        &market_call_list->call_totals.land_tax);

/* airtime totals */
    while (market_call_list->airtime_tot !=
            (struct airtime_totals *)NULL)
        {
        temp_list_start =
            (char *)market_call_list->airtime_tot->link;
        free((char *)market_call_list->airtime_tot);
```

-60-

```c
                        market_call_list->airtime_tot =
                                (struct airtime_totals *)temp_list_start;
                        } /* while elements in list */ temp_list_start = (char *)market_call_list->link;
                    free((char *)market_call_list);
                    market_call_list =
                            (struct market_call_struct *)temp_list_start;
                    } /* while elements in list */

/* if aggregate account free all members of the */
                    /* account */
                    do
                    {
                    memcpy(prev_acct_nr,cust_info_list->acct_nr,10);
                    temp_list_start = (char *)cust_info_list->link;
                    free((char *)cust_info_list);
                    cust_info_list =
                            (struct cust_struct *)temp_list_start;
                    } while (cust_info_list != (cust_struct *)NULL &&
                            !memcmp(cust_info_list->acct_nr,
                                    prev_acct_nr,10));

mark_time(0,mark_time_arr,2);
                    memcpy(shmaddress,&seg_perf,
                    sizeof(struct seg_perf_struct));
                    } /* while cust_info_list */ if (!error)
                { if (!parallel)
                {
printf("BUILDING THE REPORTS\n");
                    /* add the totals to the accounts receivable report */
                    add_ar_totals(&ar_rpt_struct,
                                &total_non_call_totals,
                                &total_call_totals,
                                &total_roamer_totals);

/* build the airtime summary report */
                    build_as_rpt(&as_rpt,&as_rpt_struct,airtime_summary,
                                tod_desc_list);

/* build the toll airtime summary report */
                    build_tas_rpt(&tas_rpt,&tas_rpt_struct,
                                toll_airtime_list);

/* build the billing report */
                    build_bill_rpt(&billing_rpt,&billing_rpt_struct,
                                &total_non_call_totals,
                                &total_call_totals,
                                &total_roamer_totals);

/* build the journal summary report */
                build_js_rpt(&js_rpt,&js_rpt_struct,journal_list,
                            &total_non_call_totals,&total_call_totals,
                            &total_roamer_totals,super);

/* build phone sales report */
                build_ps_rpt(&ps_rpt,&ps_rpt_struct,phone_sales_list);
                build_ps_rpt(&ps_rpt,&ps_rpt_struct,phone_sales_list_header);
```

```
                    /* build the tax register report */
                    build_tr_rpt(&tr_rpt,&tr_rpt_struct,tax_register);

/* add commission waivers totals */
                    add_comm_totals(&comm_rpt,&comm_rpt_struct,
                                    comm_amt_totals,comm_fed_totals,
                                    comm_state_totals,comm_county_totals,
                                    comm_loc_totals);

} /* if (parallel */
                else
                {
mark_time(13,mark_time_arr,1);
/******************************************************/
    rpt_data_struct rds;
    rds.segment = segment;
    rds.bill_date = bill_date.date_str;
    rds.market = market;
    rds.total_call_totals = &total_call_totals;
    rds.total_non_call_totals = &total_non_call_totals;
    rds.total_roamer_totals = &total_roamer_totals;
    rds.airtime_summary = airtime_summary;
    rds.tod_desc_list = tod_desc_list;
    rds.toll_airtime_list = toll_airtime_list;
    rds.journal_list = journal_list;
    rds.phone_sales_list = phone_sales_list_header;
    rds.tax_register = tax_register;
    rds.rev_list = rev_list;
    rds.comm_list = comm_list;
    rds.comm_amt_totals = comm_amt_totals;
    rds.comm_fed_totals = comm_fed_totals;
    rds.comm_state_totals = comm_state_totals;
    rds.comm_county_totals = comm_county_totals;
    rds.comm_loc_totals = comm_loc_totals;
    rds.dunning_exception_list = dunning_exception_list;
    rds.zero_bill_list = zero_bill_list;
    rds.discount_plans = &plan;
/******************************************************/
                                    error = ins_rpt_data(&rds);

if(error)
                    {
                    error_handler("bill_test",UNKNOWN,
                    "Report data insert had error(s).");
                    }
```

-62-

```
mark_time(13,mark_time_arr,2);
                    }/* Insert report stuff into database */
                  } /* if !error */
                  else
                  {
                  error_handler("bill_test",UNKNOWN,
              "WARN: Report data will not be inserted due to previous error.");
                  error = TRUE;
                  }
                  } /* if build toll airtime list */
                else
                {
                error_handler("bill_test",UNKNOWN,
                                       "building toll airtime list");
                error = TRUE;
                } /* else get_cust_list error */

} /* if fopen report files */
            else
              {
              error_handler("bill_test",FILEOPEN,"report files");
              error = TRUE;
              } /* else fopen report files error */

} /* if get_cust_list */
          else
            {
            error_handler("bill_test",UNKNOWN,"getting customer list");
            error = TRUE;
            } /* else get_cust_list error */
          } /* if get_print_cat */
        else
          {
          error_handler("bill_test",UNKNOWN,"getting print category list");
          error = TRUE;
          } /* else error getting print_cat info */
        } /* if get_tod_desc_list */
      else
        {
        error_handler("bill_test",UNKNOWN,"getting tod description list");
        error = TRUE;
        } /* else get_tod_desc_list error */

} /* if get_date_values */
    else
      {
      error_handler("bill_test",UNKNOWN,"getting date values");
      error = TRUE;
      } /* else get_date_values error */
    } /* if get_rate_list */
  else
    {
    error_handler("bill_test",UNKNOWN,"getting rate list data");
    error = TRUE;
    } /* else get_rate_list error */

} /* if get leeway amount */
else
  {
```

-63-

```c
        error_handler("bill_test",UNKNOWN,"getting leeway amount");
        error = TRUE;
        } /* else get_rate_list error */
        } /* if get due date list*/ else
        {
        error_handler("bill_test",UNKNOWN,"getting due date list");
        error = TRUE;
        } /* else get_due_list error */

} /* if get_market */
    else
        {
        error_handler("bill_test",UNKNOWN,"getting market information");
        error = TRUE;
        } /* else error getting market information */

} /* if fopen */
    else
        {
        error_handler("bill_test",FILEOPEN,argv[2]);
        error = TRUE;
        } /* else fopen error */

} /* if log on */
else
    {
    printf("\ncan't log on to Oracle\n");
    error = TRUE;
    } /* else - logon */

/* get the last bill date and update the market table */
/* with the current bill date */
if (bill_commit)
    {
    printf("UPDATED BILL DATE\n");
    update_bill_date(&bill_date,&offset_display_date,&due_date,market);
    } if (((!parallel) && (!error))
    {
    /* print the automatic reports */

/* print the accounts receivable report
    print_report(ar_rpt,&ar_rpt_struct); */

/* print the airtime summary report */
    print_report(as_rpt,&as_rpt_struct);

/* print the toll and airtime summary report */
    print_report(tas_rpt,&tas_rpt_struct);

/* print the billing report */
    print_report(billing_rpt,&billing_rpt_struct);

/* print the jorunal summary report */
    print_report(js_rpt,&js_rpt_struct);

/* print the phone sales report */
    print_report(ps_rpt,&ps_rpt_struct);

/* print the tax register report */
    print_report(tr_rpt,&tr_rpt_struct);

/* print the charge detail report */
```

-64-

```
/* print the commission waivers report */
print_report(comm_rpt,&comm_rpt_struct);

/* -------------------------------------- */
/*     - Report all data the was collected */
/* during the call discounting processing  */
/* -------------------------------------- */
if(discountReporting(&plan,market,bill_date.date_str) == -1)
{
   error_handler("Call Discounting",UNKNOWN,"Could not create report");
}

} /* if !parallel print reports */ if (error || !bill_commit)
{
error=FALSE;
printf("ROLLBACK\n");
EXEC SQL ROLLBACK WORK;
if (sqlca.sqlcode != NOT_SQL_ERROR)
   {
   error = TRUE;
   error_handler("rollback",ORACLESELECT,sqlca.sqlerrm.sqlerrmc);
   } /* if sql error */
} /* if error */ insert_dunning_activity(&market_rec,&bill_date,&due_date,&dunning_stats_hdr,
                        dunning_stats,segment);
EXEC SQL COMMIT WORK RELEASE;
if (sqlca.sqlcode != NOT_SQL_ERROR)
   {
   error = TRUE;
   error_handler("commit",ORACLESELECT,sqlca.sqlerrm.sqlerrmc);
   } /* if sql error */

/*******************************************************/
mark_time(5,mark_time_arr,2);
memcpy(shmaddress,&seg_perf,(sizeof(struct seg_perf_struct)));

sprintf(sxcp_file,"sxcp.rpt");
       sprintf(dxcp_file,"dxcp.rpt");
       sprintf(zero_file,"zero.rpt");
               if((!error) && (!parallel)
                  && ((sxcp_rpt_struct.rpt_file =
                       fopen(sxcp_file,"w+")) != NULL)
                  && ((zero_rpt_struct.rpt_file =
                       fopen(zero_file,"w+")) != NULL)
                  && ((dxcp_rpt_struct.rpt_file =
                       fopen(dxcp_file,"w+")) != NULL))
               {
               build_rev_rpt(rev_list,rev_rpt_struct.rpt_file,
                             bill_date.date_str,market,super);

/* Build dunning exception rpt */
               if(dunning_exception_list !=
                  (struct collections_info *)NULL)
               build_exception_rpt(sxcp_rpt_struct.rpt_file,
                                   dxcp_rpt_struct.rpt_file,
                                   &dunning_exception_list,market,
                                   bill_date.date_str,
                                   temp_bill_params);
```

```
/* Build zero activity (no bill) rpt */
              if(zero_bill_list !=
                  (struct zero_bill_struct *)NULL)
                  build_zero_rpt(zero_rpt_struct.rpt_file,
                                 &zero_bill_list,market,
                                 bill_date.date_str,
                                 temp_bill_params);
              }/* Build reports if not aborting */

// free airtime_summary list
while (airtime_summary != (struct airtime_summary_struct *)NULL)
{
  // free airtime_totals list
  while (airtime_summary->airtime_tot != (struct airtime_totals *)NULL)
  {
    temp_list_start = (char *)airtime_summary->airtime_tot->link;
//FCHECK(airtime_totals);
    free((char *)airtime_summary->airtime_tot);
    airtime_summary->airtime_tot =
      (struct airtime_totals *)temp_list_start;
  } /* while elements in list */ temp_list_start = (char *)airtime_summary->link;
//FCHECK(airtime_summary_struct);
  free((char *)airtime_summary);
  airtime_summary =
    (struct airtime_summary_struct *)temp_list_start;
} /* while elements in list */

// free bill detail sort code lookup table
get_sort_info(-1,"FREE");

// free memory used by tax interface and dump cache statistics
delete taxer;

/* close reallocated stdout */
if(!parallel)
{
fclose(as_rpt_struct.rpt_file);
fclose(tas_rpt_struct.rpt_file);
fclose(js_rpt_struct.rpt_file);
fclose(ps_rpt_struct.rpt_file);
fclose(tr_rpt_struct.rpt_file);
fclose(rev_rpt_struct.rpt_file);
fclose(billing_rpt_struct.rpt_file);
}/* if not parallel mode, close sequential report files opened */

// fclose(sxcp_rpt_struct.rpt_file);
fclose(zero_rpt_struct.rpt_file);
// fclose(dxcp_rpt_struct.rpt_file);
fclose(ar_rpt_struct.rpt_file);
fclose(comm_rpt_struct.rpt_file);
fclose(fpstd);
fclose(fpstde);
fclose(pfp);
fclose(bdfp);

/* for reporting exit status to parallel manager */
if(error) exit(1);
else exit(0);

} /* bill test */
```

-66-

```
void mark_time(int remark_nr,mark_struct *time_array,int mark_number)
// int    remark_nr; /* the remark number */
// struct mark_struct time_array[];
// int    mark_number;
  {
  time_t  curtime; /* time in seconds */
  struct tm *loc_time;
  static char last_account_nr[11] = "xxxxxxxxxx";
/*
  struct timeval tp; /* pointer to timeval struct in sys/time.h */
  struct timezone tzp; /* pointer to timezone struct in sys/time.h */
*/
  /* set the minutes west of Greenwich and timezone treatment */
  /* tzp.tz_minuteswest = 240; /* 4 hours west */
  tzp.tz_dsttime = 1; /* daylight savings applies appropriately */
*/
  if (curtime = time(0)) /* ptx change */
  /* if (!gettimeofday(&tp,&tzp)) */
    {
    loc_time = localtime(&curtime);
    /* determine the elapsed time since the last mark */
    if (mark_number == 1)
      {
      /* printf("%s %s",time_array[remark_nr].remark,ctime(&tp.tv_sec)); */
      printf("%s %s",time_array[remark_nr].remark,asctime(loc_time));
      }
    if (mark_number == 2)
      {
      printf("%s - time elasped since last mark: secs %f\n",
       time_array[remark_nr].remark,
       (float)((float)curtime - (float)time_array[remark_nr].seconds));

/* Multi-threaded segment performance statistics */
    if(remark_nr != 5)
      {
      seg_perf.last_cust_time = curtime - time_array[remark_nr].seconds;

if(memcmp(seg_perf.last_account,last_account_nr,10) == 0)
        {
        seg_perf.last_acct_time += seg_perf.last_cust_time;
        }
      else
        {
        memcpy(last_account_nr,seg_perf.last_account,10);
        seg_perf.last_acct_time = seg_perf.last_cust_time;
        } if(seg_perf.slow_time < seg_perf.last_cust_time)
        {
        seg_perf.slow_time = seg_perf.last_cust_time;
        }
      else if(seg_perf.fast_time > seg_perf.last_cust_time)
        {
        seg_perf.fast_time = seg_perf.last_cust_time;
        }
      seg_perf.elapsed_time += seg_perf.last_cust_time;
      }
    else
      {
      seg_perf.total_time = curtime - time_array[remark_nr].seconds;
      seg_perf.running = 0;
      seg_perf.complete = 1;
      }
    /* ptx conversion */
    }
    time_array[remark_nr].seconds = curtime; /* ptx conversion */
```

-67-

What is claimed is:

1. A method for processing a plurality of discrete events in a processing system having at least one processor, each discrete event comprising a plurality of independent sub-events, said method comprising the steps of:

distributing each discrete event into one of a plurality of segments, each segment comprising a sequence of at least one discrete event to be processed;

initiating each of said plurality of segments to execute concurrently on said at least one processor;

for each segment, processing each discrete event contained within said segment sequentially; and for each discrete event, processing each independent sub-event of said discrete event sequentially and then storing the results of said processing;

wherein said step of distributing said discrete events comprises the steps of:

determining a number of processors designated for processing said discrete events;

setting the number of segments to equal the number of processors designated if a user override is not set;

setting the number of segments to equal a user selected number of segments if a user override is set; and determining the number of discrete events to be processed;

allocating each of the discrete events into a segment; and wherein said step of allocating said discrete events comprises the steps of:

dividing said number of discrete events by said number of segments to determine a segment size and a remainder;

selecting a number of segments equal to the remainder;

incrementing the segment size of each selected segment; and distributing sequentially into each segment a number of discrete events equal to the segment size for each segment.

2. The method of claim 1 wherein said discrete event is a customer account and wherein said step of processing each discrete event comprises determining billing information for each said customer account.

3. The method of claim 1 wherein said discrete event is a customer account, wherein said independent sub-events comprise customer service information and customer calls, and wherein said step of processing each discrete event comprises determining billing information for each customer account.

4. The method of claim 1 further comprising the steps of:

monitoring each of said segments to detect a failure; and deactivating each of said segments when a failure is detected.

5. The method of claim 4 further comprising the steps of:

re-initializing each of said deactivated segments; and re-initiating each of said deactivated segments.

6. The method of claim 1 wherein said discrete events comprise individual events, master events and child events, each master event having a plurality of child events associated therewith, and wherein said step of distributing said discrete events comprises the step of distributing each child event and the master event associated therewith into the same segment.

7. The method of claim 1 wherein said discrete events comprise either individual events, master events or child events, each master event having a plurality of child events associated therewith and sequentially subsequent to said master event and further comprising the steps of:

i) ordering the segments from a first segment to a last segment;

ii) selecting the first segment to be the current segment;

iii) distributing sequentially into the current segment a number of discrete events equal to the segment size for the current segment;

iii) adding discrete events to the current segment if the last discrete event in the current segment is a child event and the next discrete event to be distributed is also a child event;

iv) subtracting the number of discrete events added to the current segment from the segment size of the next segment in the segment order; and v) selecting the next segment to be the current segment unless the current segment is the last segment.

8. The method of claim 1 wherein said step of storing the results of said processing is accomplished by writing the results of said processing to secondary storage.

9. The method of claim 1 wherein said steps of processing are performed using a symmetrical multiprocessing system.

10. The method of claim 1 wherein said steps of processing are performed using a massively parallel processing system.

11. The method of claim 1 wherein said steps of processing are performed using a loosely coupled distributed processing system.

12. A system for processing a plurality of discrete events, each discrete event comprising a plurality of independent sub-events to be processed, comprising:

distributing means for distributing said plurality of discrete events into one of a plurality of segments, each segment comprising a sequence of at least one discrete event to be processed, said distributing means comprising:

means for determining the number of processors designated and available for processing the discrete events;

means for setting a number of segments to equal the number of processors if a user override is not set;

means for setting the number of segments to equal a user selected number of segments if a user override is set;

means for determining the number of discrete events to be processed; and means for distributing each of said discrete events into one of said segments;

initiating means for initiating each of said plurality of segments at least one processor;

at least one processor for processing said plurality of discrete events by processing each discrete event with each segment sequentially and by processing each independent sub-event within each discrete event sequentially;

memory means for storing the processed discrete events; and wherein said distributing means further comprises:

means for dividing said number of discrete events by said number of segments to determine a segment size for each segment and a remainder;

means for selecting a number of segments equal to said remainder;

means for incrementing the segment size of each selected segment; and means for distributing sequentially into each segment a number of discrete events equal to the segment size for each segment.

13. The system of claim 12 wherein said discrete event is a customer account and wherein each of said plurality of processors determines billing information for each customer account.

14. The system of claim 12 wherein said discrete event is a customer account and wherein said independent sub-events comprise customer information and customer calls.

15. The system of claim 12 further comprising:
monitoring means for detecting failures in each segment; and
deactivating means for deactivating each of said segments when a failure is detected.

16. The system of claim 15 further comprising:
re-initializing means for re-initializing said system; and
re-initiating means for re-initiating said forking means.

17. The system of claim 12 wherein said discrete events comprise either individual events, master events or child events, each master event having a plurality of child events associated therewith and wherein said grouping means groups each child event and the master event associated therewith into the same segment.

18. The system of claim 12 wherein said discrete events comprise either individual events, master events or child events, each master event having a plurality of child events associated therewith and sequentially subsequent to said master event, and wherein said distributing means further comprises:
means for ordering the segments from a first segment to a last segment;
means for selecting the first segment to be the current segment;
means for distributing sequentially a number of discrete events equal to the segment size for the current segment into the current segment;
means for adding discrete events to the current segment if the last discrete event in the current segment is a child event and the next discrete event to be distributed is also a child event;
means for subtracting the number of discrete events added to the current segment from the segment size of the next segment in the segment order; and
means for selecting the next segment to be the current segment unless the current segment is the last segment.

19. The system of claim 12 wherein said at least one processor comprises a symmetrical multiprocessing system.

20. The system of claim 12 wherein said at least one processor comprises a massively parallel processing system.

21. The system of claim 12 wherein said at least one processor comprises a loosely coupled distributed system.

* * * * *